US012581035B2

(12) United States Patent
Ostap et al.

(10) Patent No.: US 12,581,035 B2
(45) Date of Patent: Mar. 17, 2026

(54) VIDEO CONFERENCE WITH SUBTILING

(71) Applicant: Logitech Europe S.A., Lausanne (CH)

(72) Inventors: Oleg Ostap, Camas, WA (US); Henry Levak, San Mateo, CA (US); Kostiantyn Verhun, Ternopil (UA); Ihor Dutchak, Skalat (UA); Sergii Naumov, Frywald (PL); Pawel Wrobel, Marcinowice (PL); Miguel Angel Maestre Trueba, Portland, OR (US); Anurag Bansal, Seattle, WA (US); Volodymyr Ostap, Camas, WA (US); Kristopher Glenn Perry, Camas, WA (US)

(73) Assignee: Logitech Europe S.A., Lausanne (CH)

( * ) Notice: Subject to any disclaimer, the term of this patent is extended or adjusted under 35 U.S.C. 154(b) by 233 days.

(21) Appl. No.: 18/430,404

(22) Filed: Feb. 1, 2024

(65) Prior Publication Data

US 2024/0422285 A1 Dec. 19, 2024

Related U.S. Application Data

(60) Provisional application No. 63/472,800, filed on Jun. 13, 2023.

(51) Int. Cl.
H04N 7/15 (2006.01)
G06T 7/11 (2017.01)
(Continued)

(52) U.S. Cl.
CPC ................ H04N 7/15 (2013.01); G06T 7/11 (2017.01); G06V 20/49 (2022.01); H04N 5/2628 (2013.01);
(Continued)

(58) Field of Classification Search
CPC ......... H04N 5/2628; H04N 7/15; H04N 5/278
See application file for complete search history.

(56) References Cited

U.S. PATENT DOCUMENTS 10,904,446 B1 1/2021 Ostap et al.
10,951,858 B1 3/2021 Ostap et al.
(Continued)

OTHER PUBLICATIONS

U.S. Appl. No. 17/993,710, filed Nov. 23, 2022.
U.S. Appl. No. 18/222,315, filed Jul. 14, 2023.

*Primary Examiner* — Amal S Zenati
(74) *Attorney, Agent, or Firm* — Patterson + Sheridan, LLP

(57) ABSTRACT

In one or more embodiments a computer implemented method includes generating, by a sensor, a video stream that comprises a series of frames that include a plurality of objects positioned within an environment, determining the objects captured within at least one frame of the video stream, determining one or more croppings for each of the objects in the at least one frame, determining a ranking of the one or more croppings based on a determined total combined loss value for each the one or more croppings, determining each subtiling combination for each of the one or more croppings, each subtiling combination comprising at least one subtile that includes at least one object; determining a total subtiling penalty value (TSPV) for each subtiling combination, and determining a preferred subtiled combination based on the total combined loss value of each the one or more croppings and the TSPV of each subtiling combination.

20 Claims, 30 Drawing Sheets

(51) Int. Cl.
*G06V 20/40* (2022.01)
*H04N 5/262* (2006.01)
*H04N 5/278* (2006.01)

(52) U.S. Cl.
CPC ... *H04N 5/278* (2013.01); *G06T 2207/20132*
(2013.01)

(56) References Cited

U.S. PATENT DOCUMENTS

| | | | |
|---|---|---|---|
| 10,965,908 B1 | 3/2021 | Ostap et al. | |
| 10,972,655 B1 | 4/2021 | Ostap et al. | |
| 11,336,817 B2 | 5/2022 | Ostap et al. | |
| 11,350,029 B1 | 5/2022 | Ostap et al. | |
| 11,800,213 B2 | 10/2023 | Ostap et al. | |
| 11,880,983 B2 | 1/2024 | Ostap et al. | |
| 2021/0365707 A1* | 11/2021 | Mao ........................ | G06V 10/62 |
| 2023/0351727 A1* | 11/2023 | Balavalikar Krishnamurthy ........ | |
| | | | G06V 10/761 |
| 2024/0031529 A1 | 1/2024 | Ostap et al. | |
| 2024/0054655 A1 | 2/2024 | Ostap et al. | |
| 2025/0022136 A1* | 1/2025 | Zeng ........................ | G06N 3/08 |
| 2025/0063138 A1* | 2/2025 | Suzuki ................... | G06V 20/40 |

* cited by examiner

1400

1402 — Determine all possible combinations of croppings based on detected objects 1404 — Determine each possible subtiling combination for each of the remaining croppings 1406 — Prune the subtiling combinations 1408 — Determine the total subtiling penalty value for each remaining valid subtiling combination 1410 — Determine the grouping including the subjectively preferred subtiled croppings 1412 — Send the grouping including the subjectively preferred subtiled croppings is to the video conferencing software application

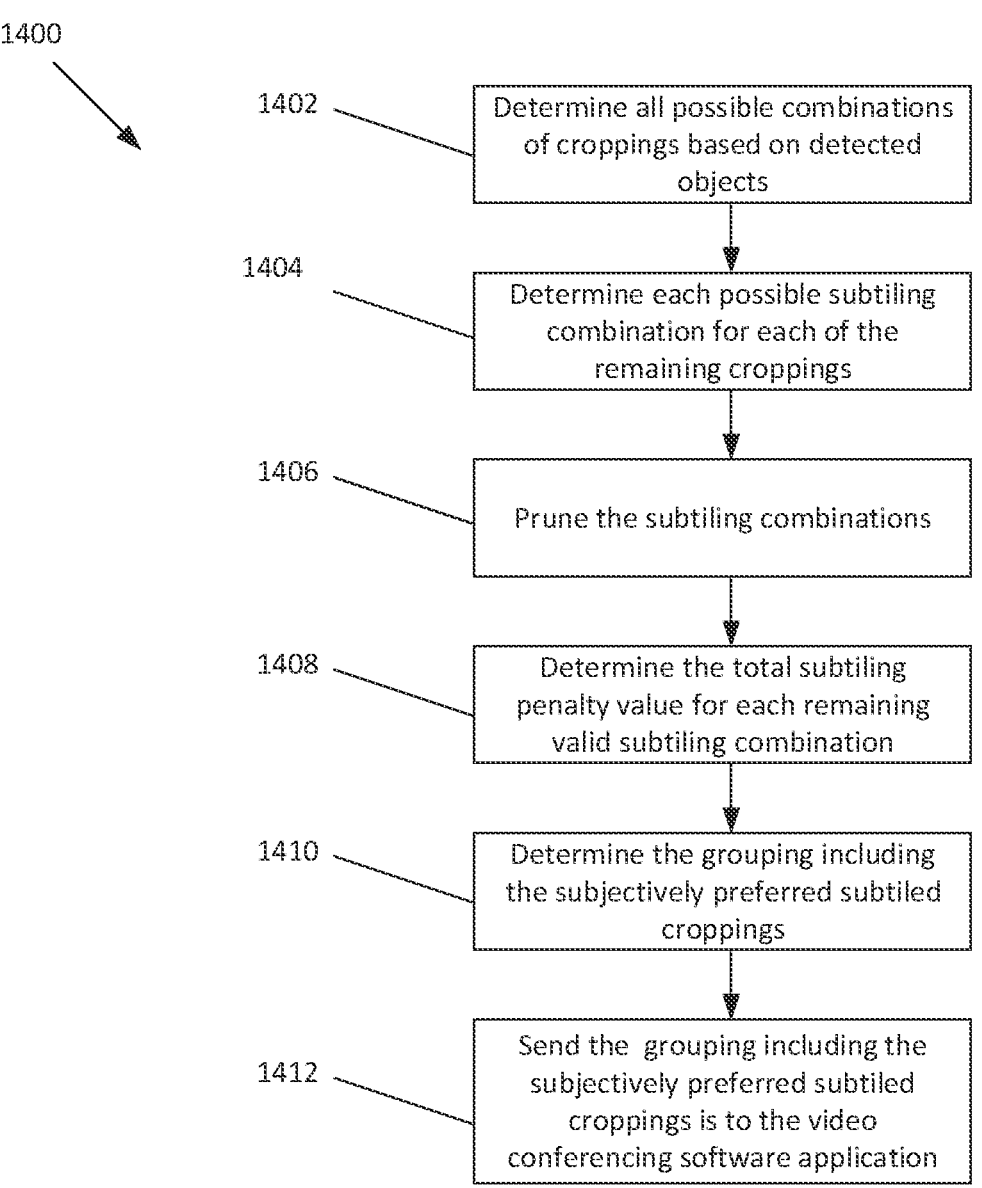

FIG. 14

VIDEO CONFERENCE WITH SUBTILING

CROSS-REFERENCE TO RELATED APPLICATIONS

This patent application claims the benefit of U.S. Provisional Patent Application No. 63/472,800, filed Jun. 13, 2023, which is incorporated by reference herein.

BACKGROUND

Field

Embodiments of the present disclosure generally relate to a video conferencing systems and related video conferencing methods.

Description of the Related Art

Typically, video-conferencing systems are suitable to allow one or groups of participants to visually conference in different spaces located at different geographical locations. In recent years, video-conferencing has been increasing in popularity due to improvements in high-speed internet, declining costs of video conferencing equipment, and a global need for remote collaboration. As the popularity of video-conferencing has increased, so has the demand for sophisticated video-conferencing systems. Users are now expecting sophisticated video-conferencing systems that are costly, and therefore, found in designated conference areas to be cheaper, available, flexible, and easily installed in any environment used for video conferencing.

Video-conferencing systems have an auto-framing feature that is generally used to detect activity in a video-conferencing environment and adjust the boundaries of the field-of-view (FOV) displayed to remote participants. For example, a video-conferencing system may be able to detect an initial number of users and ensure all the users are clearly in the frame displayed to remote users. Then as the location and/or quantity of users change, the video conferencing system can adjust the FOV of a camera.

Unfortunately, current auto-cropping technologies, used to detect and single out individuals positioned within a FOV of a video conferencing system camera (e.g., auto-framed FOV) for presentation within a video conference, require strict rules or definitions to detect and single out an individual within the camera's FOV. Moreover, current auto-cropping technologies are commonly performed in a sequential manner, which reduces the speed with which the auto-cropping process is performed and creates competing auto-cropping rules or decision factors. For example, first the video-conferencing device may change the FOV of the camera to capture someone outside of the frame first, and then change the FOV to center the users in the FOV. However, fixing an initial problem (i.e., a person is outside of the frame) may lead to another problem. For example, there is no guarantee that in the second step when the users are centered in the FOV will not cause a user to be partially (or fully outside of the frame). Stated differently as each issue in the auto-cropping process is sequentially fixed, a new problem may arise which creates a new iteration of adjustments.

Accordingly, there is a need in the art for methods and a system that allow video-conferencing to auto-crop based on needs indicated by a user, and that solves the other problems highlighted above.

SUMMARY

According to one or more embodiments, a computer implemented method includes generating, by a sensor, a video stream that comprises a series of frames that each include a plurality of objects positioned within an environment; determining the objects captured within at least one frame of the video stream; determining one or more croppings for each of the objects in the at least one frame of the video stream; determining a ranking of the determined one or more croppings based on a determined total combined loss value for each the one or more croppings; determining each subtiling combination for each of the one or more croppings, each subtiling combination comprising at least one subtile that includes at least one object; determining a total subtiling penalty value (TSPV) for each subtiling combination; and determining a preferred subtiled combination based on the total combined loss value of each the one or more croppings and the TSPV of each subtiling combination.

According to one or more embodiments, a video conferencing system includes a sensor configured to generate a video stream that comprises a series of frames; and a controller that comprises a processor and instructions stored in memory, the instructions, when executed by the processor causes the controller to perform a method comprising generating, by the sensor, a video stream that comprises a series of frames that each include a plurality of objects positioned within a conference environment; determining the objects captured within at least one frame of the video stream; determining one or more croppings for each of the objects in the at least one frame of the video stream; determining each combination of groupings of objects within the at least one frame of the series of frames; determining a total combined grouping loss value for each of the combination of groupings; determining each subtiling combination for each combination of groupings, each subtiling combination comprising at least one subtile; determining a total subtiling penalty value (TSPV) for each subtiling combination; adjusting each subtiling combination based on the TSPV of each subtiling combinations; and determining a preferred subtiled grouping combination based on the total combined grouping loss value of each combination of groupings and the TSPV of each subtiling combination.

According to one or more embodiments, a method includes determining a quantity of objects in a field of view (FOV) of a sensor; determining each combination of croppings for objects and object groups in the FOV of the sensor; determining each combination of groupings for the objects and object groups in the FOV of the sensor; determining each subtiling combination for each combination of croppings; pruning at least one subtiling combination, wherein pruning at least one subtiling combination comprises removing subtiling combinations that comprise at least one subtile that does not have a fractional aspect ratio of an aspect ratio of a corresponding cropping, subtiling combinations that comprise at least one subtile that extends outside of the at least one frame, or subtiling combinations that comprise at least one subtile that includes a quantity of objects that is greater than a maximum quantity of objects; adjusting each reaming subtiling combinations based on subtiling penalty values determined based on attributes of each subtiling combination; and determining a preferred subtiled grouping combination based on a total combined grouping loss value corresponding to each grouping of the combination of groupings and the subtiling penalty values.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 14 is a diagram illustrating a method 1400 according to one or more embodiments, for partially cropping (i.e., subtitling) each of the potential croppings of the to-be-transmitted view (display view) of the video stream of the conference environment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein generally relate to video-conferencing systems, and more particularly a method and system for optimally grouping and auto-cropping one or more portions of a field of view (FOV) of a video-conferencing environment based on predefined preferences, such as preferences determined by a user and/or a host video conferencing software program. Generally, embodiments of the disclosure provided herein include a video-conferencing system that is configured to determine optimal croppings of participants within a video conference so that the croppings can be used in the presentation of the participants within a video conference hosted by a video conferencing software application. The video-conferencing system disclosed herein is configured to update the presentation of participants within a video conference so that the optimal presentation of the participants is determine at any given moment in time based on predetermined preferences, while mitigating defects and related unwanted distractions typically generated in the video conference presentation due to the changes provided in the updates. Embodiments of the disclosure allow the predetermined preferences to each be given an importance level rating so as to allow the presentation of the participants to be optimally provided without making unnecessary and/or distracting updates to the video conference presentation, and also help resolve conflicting or competing attributes of related preferences.

Video-Conferencing System

Figure 1A:
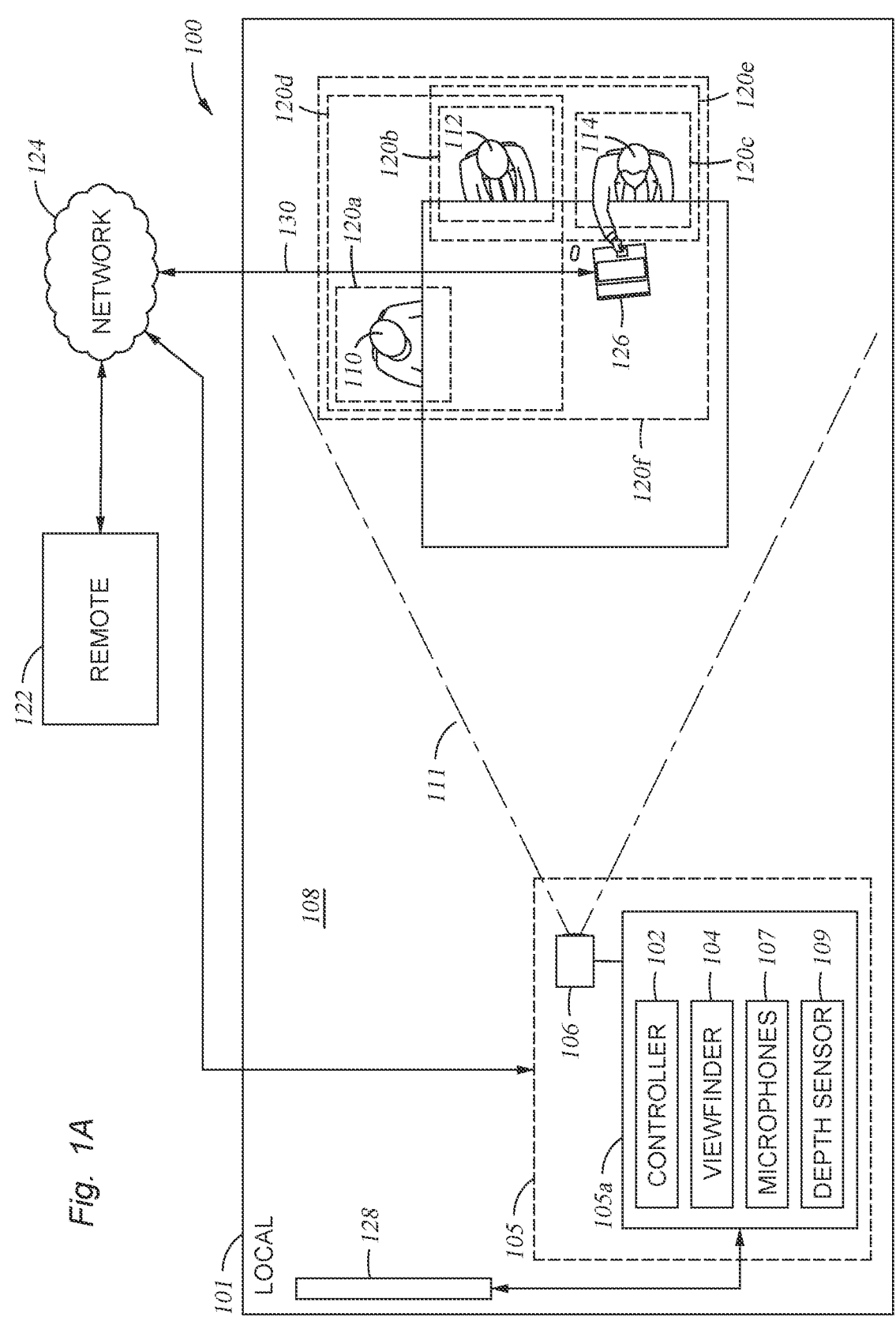
FIG. 1A is a schematic representation of a video conferencing system disposed within a video conferencing environment, determining a combination of croppings, according to one or more embodiments.

FIG. 1A is a schematic representation of a video conferencing system 100 disposed within a video conferencing environment, according to one or more embodiments. As illustrated in FIG. 1A, a video conferencing environment, such as a local conference endpoint 101, is linked to one or more remote conference endpoints, such as the remote endpoint 122, over a network 124 that facilitates communication therebetween. As shown, the local conference endpoint 101 is located in a conference environment 108, such as a designated meeting room, having an area large enough to accommodate multiple conference room presentation objects or combinations of conference room presentation objects. For example, the objects or combinations of objects may include a first participant 110, a second participant 112, and a third participant 114. In some embodiments, the conference environment 108 may include at least one hitchhiker. A hitchhiker may be defined herein as a portion of an object included in a cropping without having the entire width of the object in the cropping. A hitchhiker may also be defined as an unwanted or unintended object entirely included in a cropping. For example, if the shoulder of the third participant 114 is included in cropping 120b, the third participant 114 may be considered a hitchhiker with respect to cropping 120b. In some embodiments, objects within a video conferencing environment can include conference room participants and non-human objects, such as a whiteboard, which are each part of the generated presentation of the conference room environment. Here, the local conference endpoint 101 includes a video conferencing system 105 that includes a video conference processing section 105a and at least one camera device 106 for capturing a video stream of the conference environment 108, a user device 126 for transmitting the video stream to the remote endpoint 122 and receiving a video stream therefrom, and a display device 128 for displaying the received video stream. The video stream will include a series of frames 118 (FIGS. 3A-8). The terms "camera" and "sensor" are generally used interchangeably throughout the disclosure provided herein, and neither term is intended to be limiting as to the scope of the disclosure provided herein since, in either case, these terms are intended to generally describe a device that is at least able to generate a stream of visual images (e.g., frames 118) based on a field-of-view (FOV) of one or more optical components (e.g., lenses), and an image sensor (e.g., CCD, CMOS sensor, etc.) disposed within the "camera" or "sensor." In some examples, the cameras or sensors are capable of delivering video at a 720p, 2K video resolution, or UHD (2160 p) video resolution, or DCI 4K (i.e., 4K) video resolution, or 8K or greater video resolution.

The network 124 generally represents any data communications network suitable for the transmission of video and audio data (e.g., the Internet). A communication link 130 is used to support the transmission of video conference feeds that include audio and video streams between the local conference endpoint 101, the network 124, and/or the remote endpoint 122. The communication link 130 may be formed on a network that is connected to a Local Area Network (LAN) present in each video conference location and/or across multiple video conference locations on a Wide Area Network (WAN).

In one embodiment, the communication link 130 utilizes a wired or wireless communication technique to transmit data between the video conferencing locations. Wireless communication techniques can include but are not limited to a cellular phone network, WiFi network, satellite communication network, or other useful wireless communication techniques. Wired communication techniques may include but are not limited to fiber, cable, or DSL type data transmission methods/technologies.

The video conferencing system 105 includes a camera device 106, one or more microphones 107, and a system controller 102. In some embodiments, the video conferencing system 105 also includes a viewfinder device 104 that is used by the system controller 102 to monitor activity in the conference environment 108, e.g., to detect the locations of conference object(s) within the conference environment 108. The viewfinder device 104 may be equipped with a lens and an image sensor to provide an image for processing to the system controller 102. The camera device 106 is used by the system controller 102 to frame a desired field of view (FOV) 111 of camera device 106 based on the detected locations and/or activities of the objects and capture a video stream of the desired view for display at the remote endpoint 122. In some embodiments, the output from the camera device 106 (e.g., video stream) is used by the system controller 102 to monitor activity in the conference environment 108, such as to detect the locations of conference object(s) within the conference environment 108.

Figure 1B:
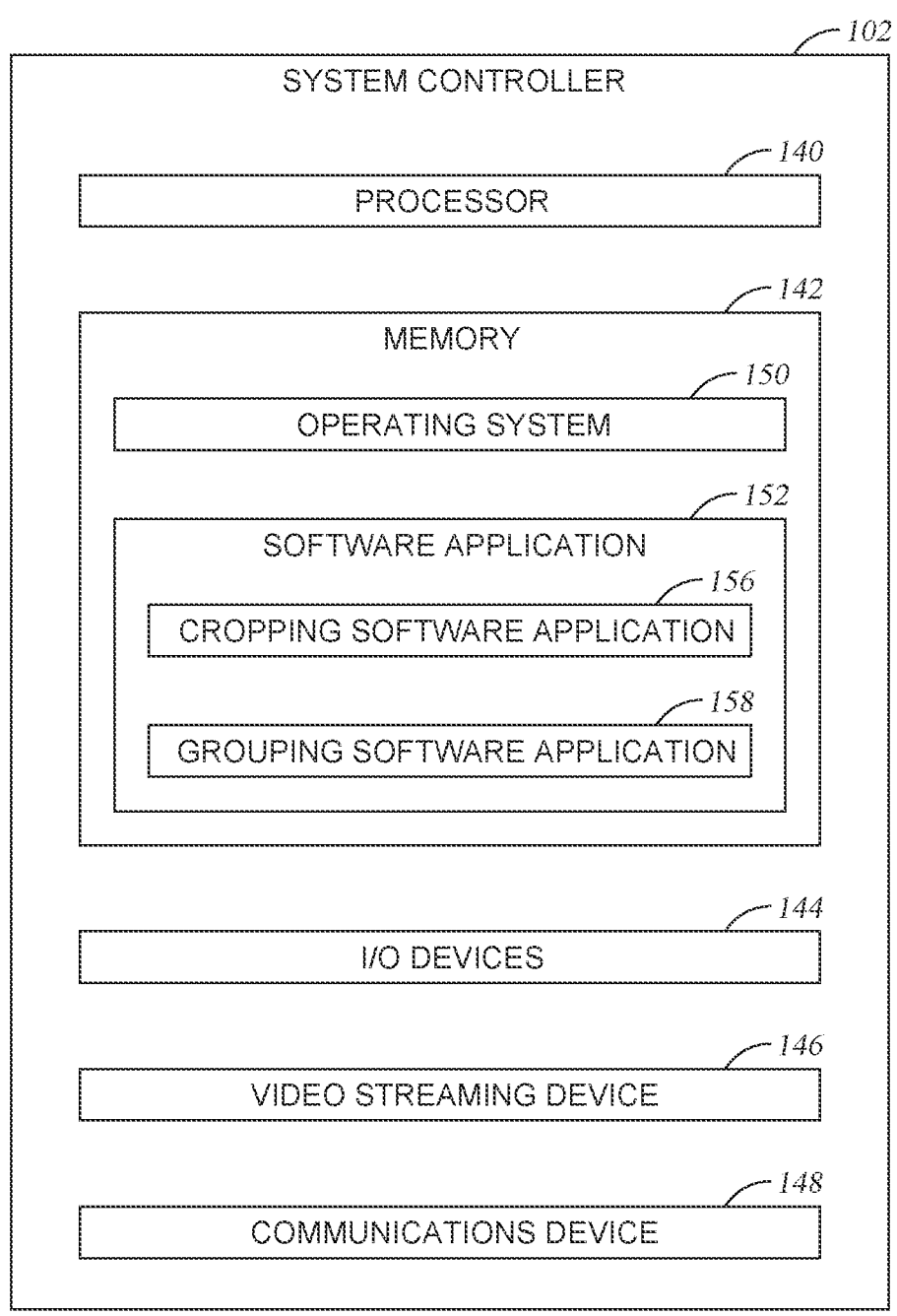
FIG. 1B is a schematic representation of a system controller of the video conferencing system depicted in FIG. 1A, according to one or more embodiments.

FIG. 1B illustrates is a schematic representation of a system controller 102 of the video conferencing system 105 depicted in FIG. 1A, according to one or more embodiments.

In various embodiments, the system controller 102 includes a processor 140, memory 142, input/output (I/O) devices 144, a video streaming device 146, and a communications device 148, which are operably coupled to one another using one or more support circuits (not shown). In some embodiments, a combination of two or more of the processor 140, memory 142, I/O devices 144, video streaming device 146, and the communications device 148 are integrally formed with one another on a single substrate, e.g., to form a system on a chip (SOC) device.

The processor 140 may be any one or combination of a programmable central processing unit (CPU), a graphics processing unit (GPU), a digital signal processor (DSP), an image signal processor (ISP) that is a specialized DSP used for image processing, a programmable gate array (FPGA), an application-specific integrated circuit (ASIC), a neural network coprocessor, or other hardware implementation(s) suitable for performing the methods set forth herein, or portions thereof. The memory 142, coupled to the processor 140, is non-transitory and represents any non-volatile type of memory of a size suitable for storing one or a combination of an operating system 150 and one or more software applications 152.

Examples of suitable memory that may be used as the memory 142 include readily available memory devices, such as random access memory (RAM), flash memory, a hard disk, or a combination of different hardware devices configured to store data. In some embodiments, memory 142 includes memory devices external to the system controller 102 and in communication therewith. In some embodiments, at least one of the one or more software applications 152 are executable by the processor 140 to perform one or more of the methods set forth herein. The one or more software applications may include a cropping software application 156 and a grouping software application 158 that are configured to be executed by the processor 140.

As described above, conventionally, auto-cropping portions of the FOV 111 of the camera device is done sequentially, which is computationally intensive, and often leads to the process of providing a desired presentation of the video conferencing environment from one set of problems to a next set of problems. As discussed above, embodiments of the disclosure provided herein, include a video conferencing system 105 that is configured to determine an optimal presentation of the video conferencing environment by at least adjusting the cropping and grouping of one or more objects or combinations of objects in the conference environment based on predetermined preferences that are stored in memory of the system controller 102. As described herein, the video conferencing system is configured to first execute the cropping software application to determine a combination of croppings, or defined portions of a video frame within a video stream (i.e., sequence of video frames) that includes one or more objects or object groups, to determine a preferred combination of croppings that are to-be used in a presentation of the video conference environment. Each cropping is a region of interest that corresponds to at least a portion of an object that is desired for inclusion into the to-be transmitted video stream that is used in the presentation of the video conferencing environment delivered locally and/or to one or more other video conferencing locations. For example, each cropping is illustrated as a rectangular box surrounding at least a portion of an object. However any desired shape may be used for each cropping and each cropping may be used to surround any desired portion of each object (i.e., participant).

The system controller 102 is configured to determine each potential combination of groupings and croppings for objects or combinations of objects in the conference environment 108. Each combination of croppings includes at least one cropping. Each of the objects are included in at least one cropping of the group of croppings. Each of the croppings includes at least one object. For example, one potential combination of croppings include croppings 120a-120c, as shown in FIG. 1A. A potential combination of croppings includes croppings 120a and 120e. A potential combination of croppings includes croppings 120c and 120d. A potential combination of croppings includes cropping 120f. The system controller 102 determines every possible combination of croppings, and thus the number of combinations of croppings can exceed the four combinations discussed above. After determining each cropping, the system controller 102 adjusts the each of the croppings to determine a preferred cropping based on a cropping formula, which is described further below. Schematic representations of a method for determining the preferred cropping are illustrated in FIGS. 2-7.

After determining the preferred cropping, the system controller 102 determines a preferred grouping of the objects in the conferencing environment based on a grouping formula and a maximum quantity of groups. Schematic representations of a method for determining the preferred grouping are illustrated in FIGS. 7-14.

Figure 7:
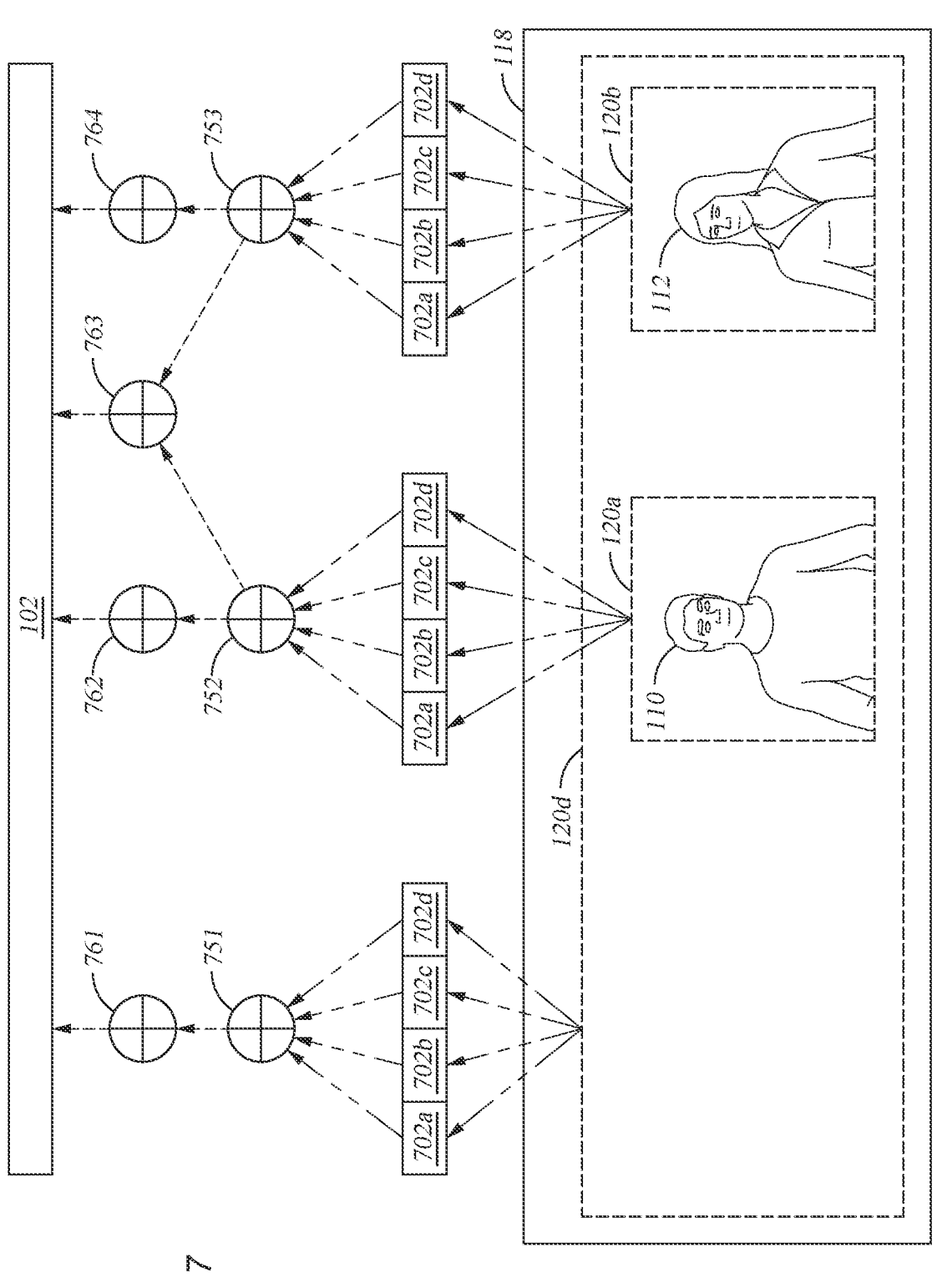
FIG. 7 is a schematic representation of a process of determining a total combined cropping loss value according to one or more embodiments.
Figure 8:
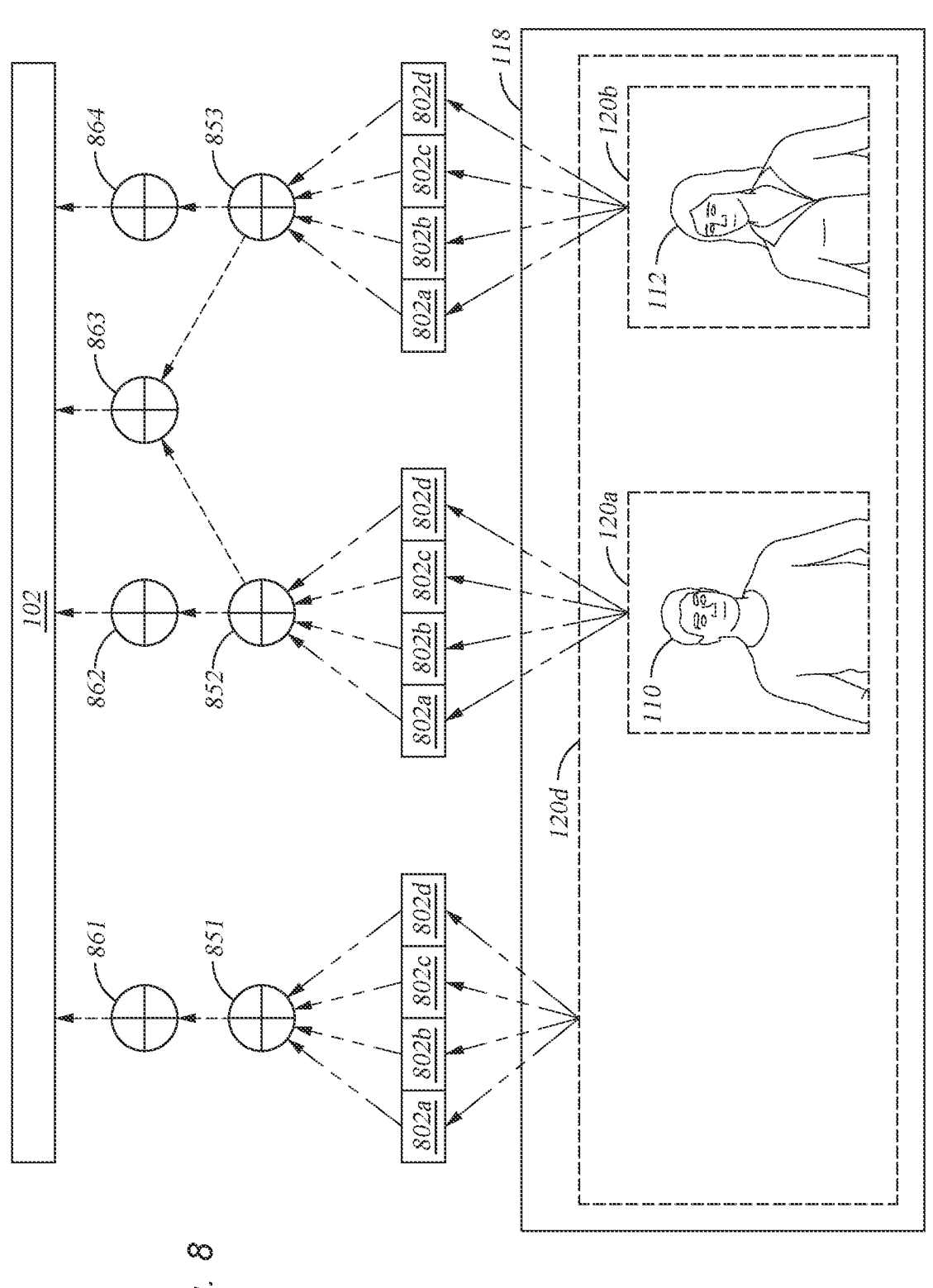
FIG. 8 is an example schematic representation of a process of determining a total determining a total combined grouping loss value that is based on the determination of individual grouping loss values according to one or more embodiments.

As will be discussed further below, FIG. 7 is an example schematic representation of a process of determining total combined cropping loss values 761-764 that is based on the determination of weighted individual cropping loss values 751, 752, and 753, according to one or more embodiments. FIG. 8 is an example schematic representation of a process of determining a total combined grouping loss value that is based on the determination of individual grouping loss values 851, 852, and 853, according to one or more embodiments.

Video Conferencing Methods

Figure 2:
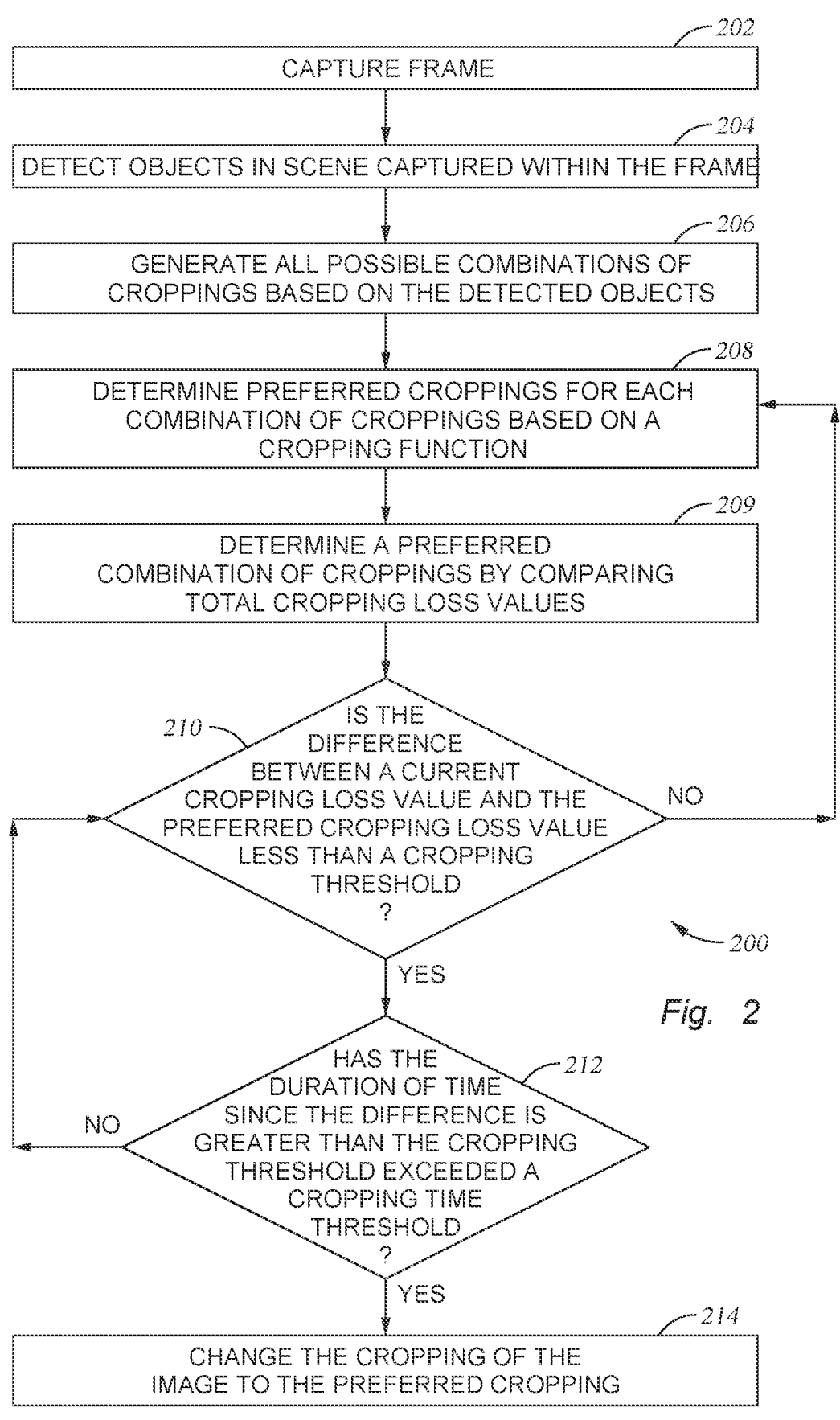
FIG. 2 is a diagram illustrating a method, according to one or more embodiments, for adjusting a to-be-transmitted view (display view) of a video stream of a conference environment.

FIG. 2 is a diagram illustrating a method 200 according to one or more embodiments, for adjusting a to-be-transmitted view (display view) of a video stream of a conference environment 108 based on a state of the conference environment 108, e.g., the number and locations of objects detected therein. The method 200 may be performed using the video conferencing system 105 described above or any other suitable video conferencing system where automatic grouping and framing of more than one region of interest is desired. Aspects of the method 200 are schematically illustrated in FIGS. 3-7.

In general, the method 200 is performed using one or more instructions which are executed by use of the processor 140 and resides in the memory 142 of the system controller 102. In some embodiments, a software application running on the system controller is configured to perform each of the activities performed during the completion of method 200.

At activity 202, the method 200 begins by capturing a frame. In one example, the frame is based on a plurality of survey frames. In various embodiments, capturing a frame includes initiating a video conference session by surveying the conference environment 108 by acquiring a plurality of video frames within the generated video stream. These initial video frames are often referred to herein as survey frames. In some embodiments, the video stream is generated using the camera device 106. Typically, the survey frames are analyzed at the beginning of the video-conferencing session to detect objects, such as conference participants 110-114, and periodically throughout the video-conferencing session to detect changes in the video-conferencing session, such as participants leaving, participants changing location, new participants joining, changes in participant activity (changes in who is speaking) and shifting participant engagement levels. Analysis of the survey frames generates survey data which is analyzed by the system controller 102.

At activity 204, the system controller 102 detects each of the objects in the scene captured within the frame (i.e., within the FOV 111). In one example, the objects are participants in the video conference. For example, as shown in FIG. 1A, the system controller 102 determines the first participant 110, the second participant 112, and the third participant 114 are captured within the FOV 111 of the camera device 106. In some embodiments, the system controller 102 utilizes a participant detection algorithm that is used to detect an object and define a cropping around for each object (e.g., participant) based detecting known or regular shapes of a portion of the object (e.g., participant's head, participant's shoulders, etc.) that is desired for inclusion in the to-be-transmitted video stream (conference video). In some embodiments, the system controller 102 further comprises a thermal sensor (not shown), such as an IR sensor used to detect a thermal signature of a participant. In those embodiments, the participant detection process may comprise determining the visible higher temperature portion(s) corresponding to the conference participants.

At activity 206, the system controller 102 generates all possible combinations of croppings based on the detected objects and all possible crop aspect ratios for subtle cropping, which will be discussed further below. As discussed above, a cropping includes defined portions of a video frame within a video stream (i.e., sequence of video frames) that includes one or more objects. Therefore, based on the number of objects determined in activity 204, the total number of possible combinations of croppings will generally be equal to $2^N$-1 possibilities multiplied by a number of possible subtile fractional aspect ratios: 1, ⅔, ½, ¾, ⅓, ¼, where N is equal to the number of objects. However, the useful and/or desired number of croppings can be less than the total number of possible combinations of croppings, since croppings that are formed between two objects that include an intervening object are generally not useful for determining the optimal croppings due to at least redundancy with other determined croppings. For example, a cropping including the first participant 110 and the third participant 114 must include the second participant 112, which will be covered by a cropping that includes all three participants (e.g., cropping 102d in FIG. 1A). Each object or groups of objects are included in at least one cropping of each combination of croppings. Each of the croppings includes at least one participant, or at least one object of interest, which in some cases can include non-human objects, such as a whiteboard within the video conference room. Stated differently, each participant or object of interest is included in one cropping in each combination of croppings. Each cropping is a region of interest that corresponds to a portion of an object that is desired for inclusion into the to-be transmitted video stream for use in the presentation of at least a portion of the video conferencing environment. For example, each cropping is illustrated as a rectangular box surrounding the upper body portion of each participant. However, any desired shape may be used for each cropping and each cropping may be used to surround any desired portion of each object of interest or participant, such as only the head and shoulders of the participant. For example, as illustrated in FIG. 1, each of the croppings include at least one of the first participant 110, the second participant 112, and the third participant 114. The attributes of each of the croppings applied to the objects or groups of objects can be initially set by use of initial cropping attributes stored in memory. The attributes of each cropping that are defined by the initial cropping attributes can include, but are not limited to, the size, shape, aspect ratio and alignment of the cropping relative to the object or objects.

At activity 208, the system controller 102 determines preferred croppings for each combination of croppings based on a cropping loss function. In various embodiments, the attributes of each of the croppings is adjusted until a preferred set of attributes (e.g., size and position) for each cropping is determined. Each combination of croppings is adjusted based on a cropping loss function that includes a plurality of cropping attributes. As will be described in more detail below, the preferred configuration of a cropping is the combination of cropping attributes that minimize the value of the cropping loss function.

The cropping loss function is used to generate a total combined cropping loss value for each combination of croppings. The total combined cropping loss value for each combination of croppings is determined by determining a set of individual cropping loss values, which are also referred to herein as individual cropping losses, for each possible cropping in each combination of croppings based on a defined set of cropping attributes. For example, a set of individual cropping loss values may be determined for croppings 120a-120f, which are illustrated in FIG. 1A. Each set of individual cropping loss values include individual cropping loss values that are determined by use of defined cropping attributes and their associated cropping weights. As will be discussed further below, examples of cropping attributes include, but are not limited to, asymmetry of objects captured in each cropping, FOV restriction, the use of free space, whether each cropping is larger than the optimal cropping size, and hitchhiker presence. The discussions related to examples of possible cropping attributes, such as the cropping attributes relating to FIGS. 3A-3B, 4A-4C, 5A-5B and 6A-6C, is provided below.

In some embodiments, and for ease of discussion, each individual cropping loss value for each of the cropping attributes is determined in the negative. Stated differently, the higher the cropping loss value the less desirable a defined attribute of a cropping is versus a lower cropping loss value. Moreover, the higher an individual cropping loss value, the worse the cropping is with respect to the corresponding cropping attribute. For example, the more off-center (e.g., asymmetrical) participant(s) are in a cropping, the higher the individual cropping loss value corresponding to asymmetry of objects. In one example, each individual cropping loss value for each cropping attribute may range from a value between 0 and 100 with 0 indicating zero penalty and 100 indicating a maximum penalty. In some embodiments, the range of values of the cropping loss value between the minimum and maximum values is defined by a linear scale. In other embodiments, the maximum penalty that can be achieved is not limited. Examples of how each of these cropping attributes are determined are illustrated in FIGS. 3-6. While the discussion provided herein primarily utilizes a negative scale for the cropping loss value comparisons one skilled in the art would understand that a positive scale (e.g., higher cropping loss value is more desirable) could alternately be used to achieve the same determination of a preferred cropping within a group of croppings.

Figure 3A:
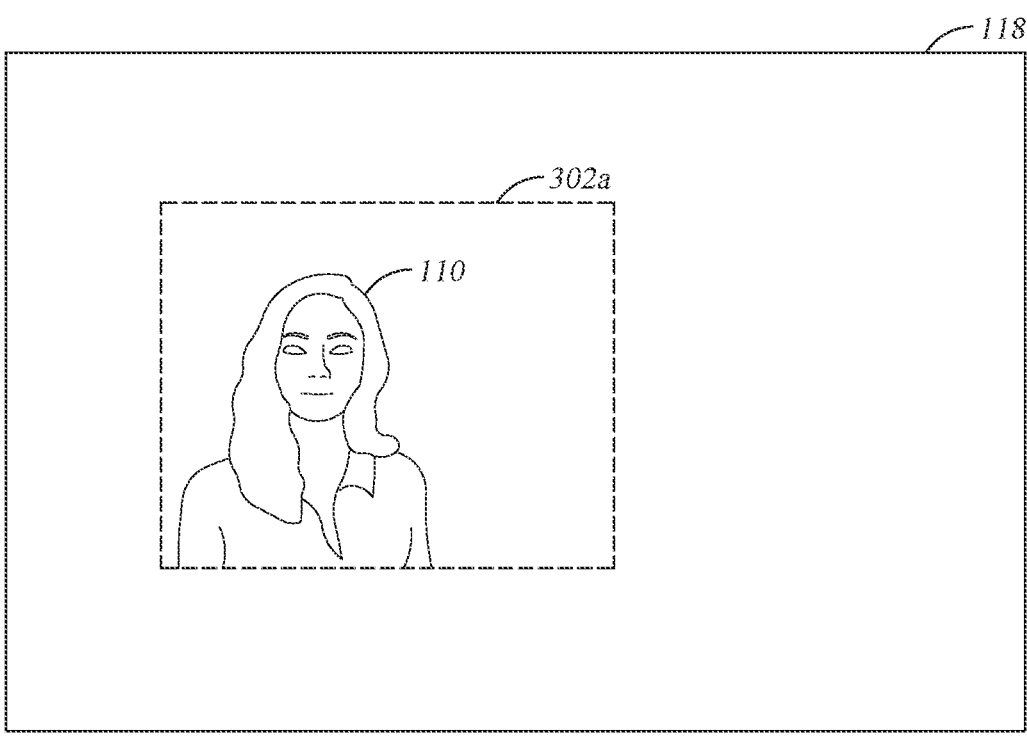
FIGS. 3A-3B are schematic representations of croppings that illustrate how individual cropping loss values can vary due to the asymmetry of objects in a cropping, according to one or more embodiments.
Figure 3B:
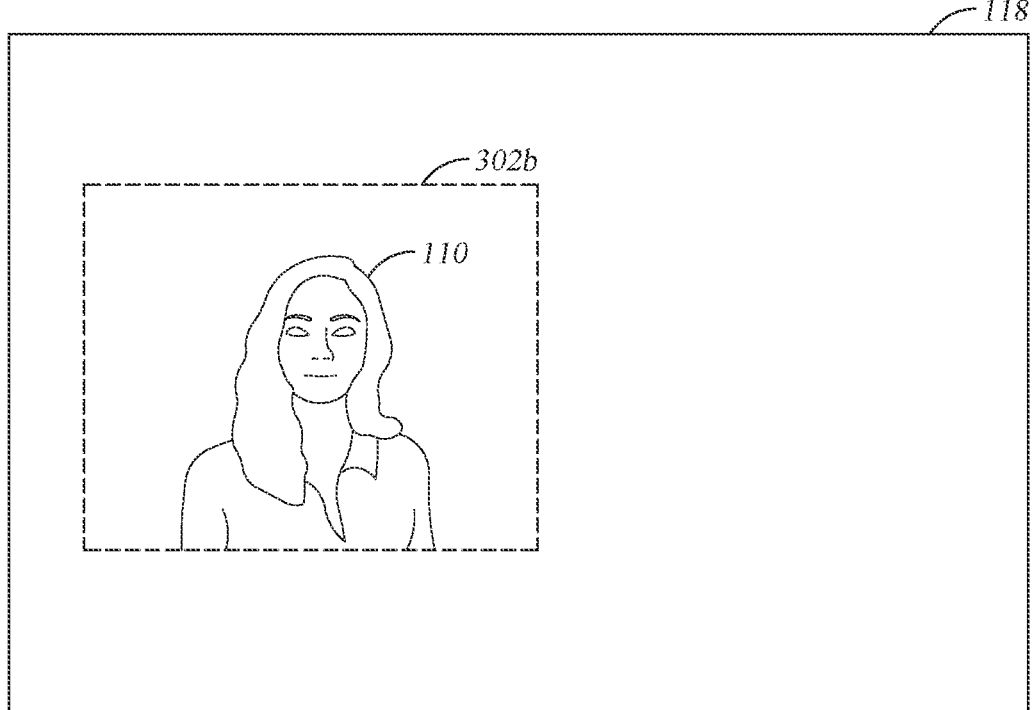

FIGS. 3A-3B are example schematic representations of different examples that can be used to determine an individual cropping loss value corresponding to asymmetry of objects according to one or more embodiments. Typically, the more off-center, or asymmetrical, objects or a group of objects (participant(s)) are within the initially determined cropping (e.g., activity 206) or adjusted cropping (e.g., activity 208), the less desirable the cropping, so a higher penalty (e.g., higher loss value) should be assessed. Therefore, the more centered participant(s) are within a cropping, the lower the individual cropping loss value corresponding to asymmetry of objects. Referring to FIGS. 3A-3B, in frame 118 within a video stream includes the first participant 110 within cropping 302a is off-center relative to the border or edge (e.g., dashed lines) of the cropping 302a, whereas in cropping 302b, the first participant 110 is perfectly centered within the border or edge. For ease and clarity of discussion, in the examples provided herein the frame 118 relates to the FOV 111 of the camera device 106. Therefore, the individual cropping loss value corresponding to asymmetry of objects for cropping 302a is higher than the individual cropping loss value corresponding to asymmetry of objects for cropping 302b. In one example, the individual cropping loss value for the cropping 302a may have a value of 70 versus the individual cropping loss value for the cropping 302b may have a value of zero or 1.

Figures 4A, 4B, 4C:
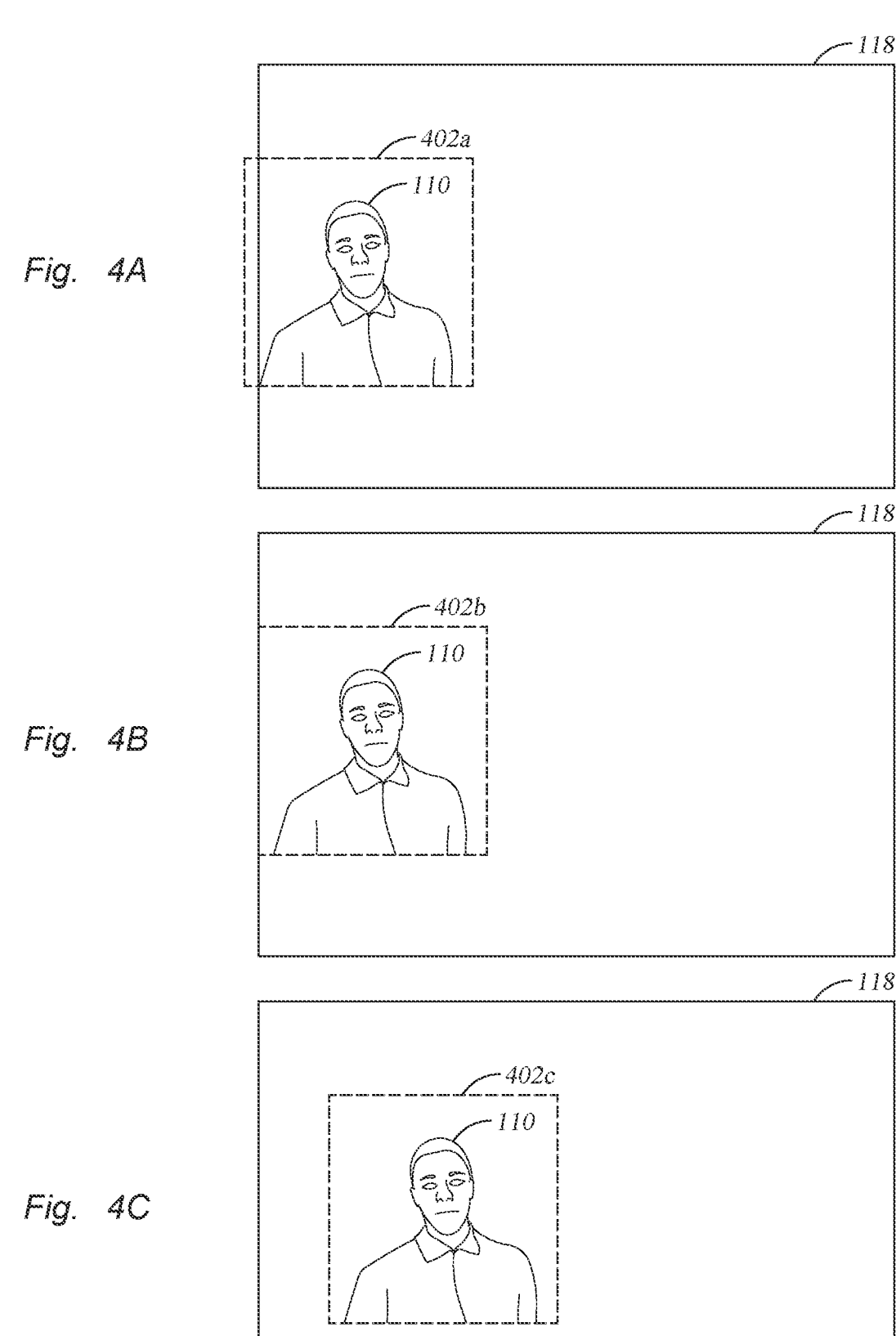
FIGS. 4A-4C are schematic representations of croppings that illustrate how individual cropping loss values can vary due to field-of-view (FOV) restriction in a cropping, according to one or more embodiments.

FIGS. 4A-4C are schematic representations of different examples that can be used to determine an individual cropping loss value corresponding to FOV restriction according to one or more embodiments. FOV restriction is based on whether an assigned cropping is close to the edge or exceeds the edge of the frame 118. For example, cropping 402a exceeds the edge of frame 118, cropping 402b touches the edge of frame 118, and cropping 402c is completely within frame 118. In this example, the closer a cropping is to the edge of the frame 118, the less desirable the cropping. Furthermore, it is impossible to crop outside of the frame 118, since in this example the frame 118 is defined by the FOV 111 of the camera device 106. Therefore, the individual cropping loss value corresponding to FOV restriction increases the closer the cropping is to the edge of the frame 118, then rapidly increases once the cropping exceeds the edge of the frame 118. For example, the individual cropping loss value corresponding to FOV restriction for cropping 402a is higher than the individual cropping loss value corresponding to FOV restriction for cropping 402b, which is higher than the individual cropping loss value corresponding to FOV restriction for cropping 402c. Because the individual cropping loss value corresponding to FOV restriction rapidly increases once a cropping exceeds the frame 118, differences between the individual cropping loss value corresponding to FOV restriction between cropping 402a and cropping 402b is greater than the difference between cropping 402b and cropping 402c. In one example, the individual cropping loss value for the cropping 402a may have a value of 95 versus the individual cropping loss value for the cropping 402b may have a value of 85 versus the individual cropping loss value for the cropping 402c may have a value of 20.

Figure 5A:
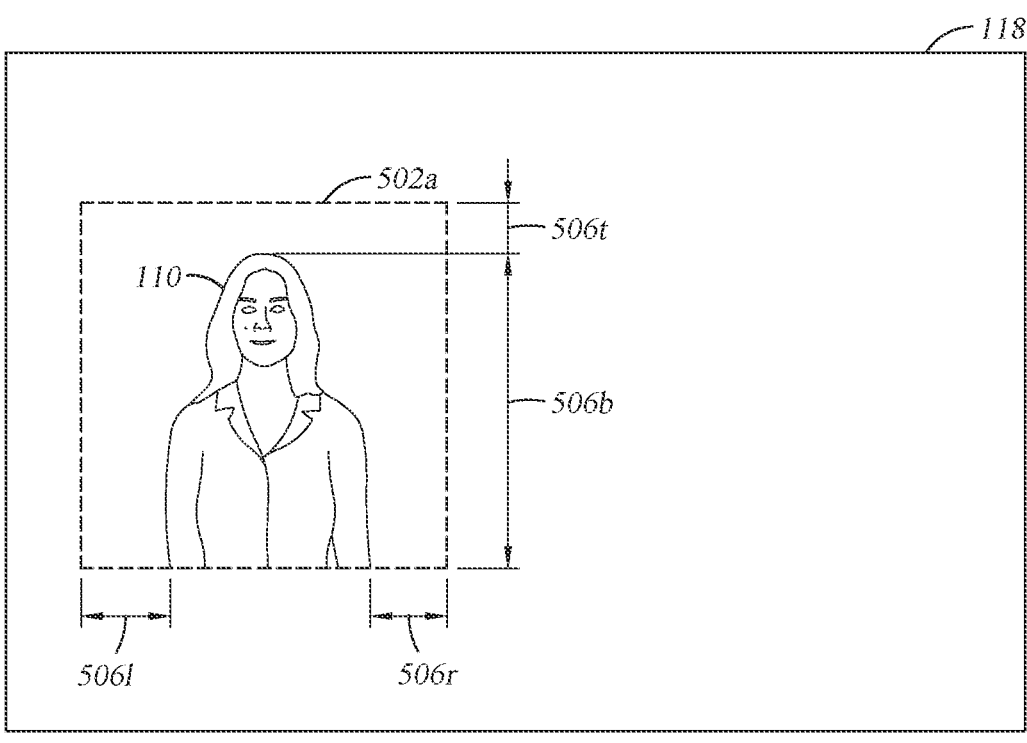
FIGS. 5A-5B are schematic representations of croppings that illustrate how individual cropping loss values can vary due to the free space in a cropping around object(s), according to one or more embodiments.
Figure 5B:
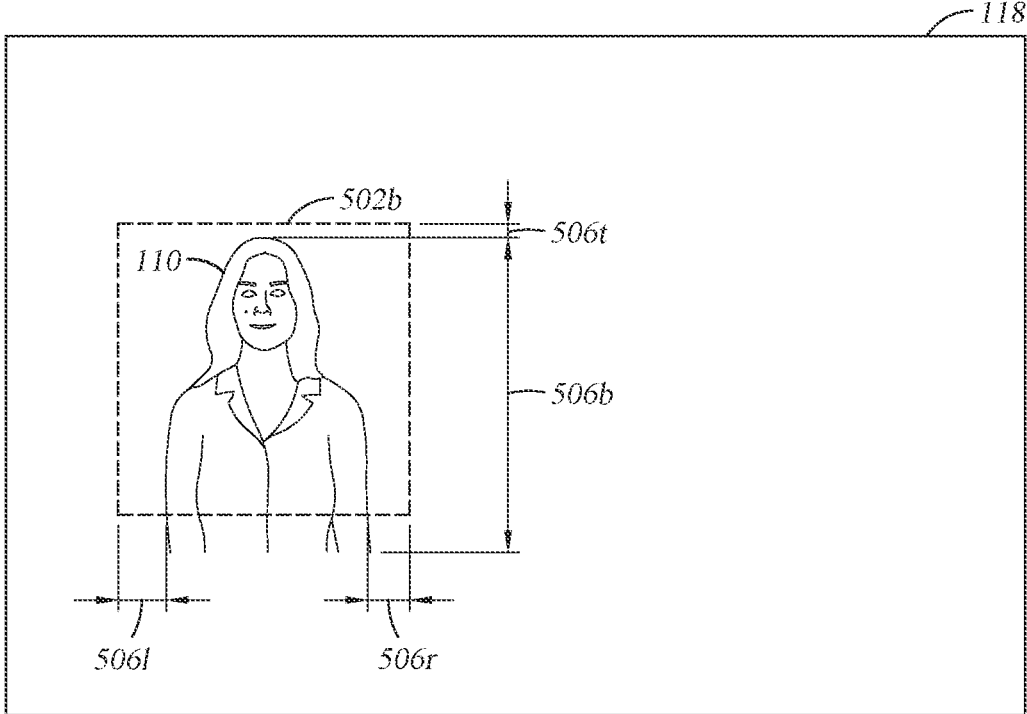

FIGS. 5A-5B are schematic representations of different examples that can be used to determine an individual cropping loss value corresponding to restriction of free space according to one or more embodiments. During the process of determining a preferred cropping within multiple croppings the system controller 102 will attempt to adjust the edge of the croppings so that they are as close to object(s) (participant(s)) as possible to minimize the effect of the determination of a preferred cropping configuration on other cropping attributes used to define an overall cropping loss value. In one example, it is more desirable to cut-off the bottom of a participant than the head or sides of a participant. Furthermore, it is more desirable to cut-off the sides of the participant than the head of the participant. Therefore, the individual cropping loss value corresponding to restriction of free space is greater for adjusting the edge of the croppings so that they are closer to the head of a participant than adjusting the edge of the croppings so that they are close to the sides of a participant, which is greater than adjusting the edge of the croppings relative to the bottom portion of a participant. The individual cropping loss value corresponding to restriction of free space is based on a distance between the top of a cropping and a participant's head, the distance between respective sides of a cropping and sides of a participant, and distance between the bottom of a cropping and the bottom of a participant. For example, as compared to cropping 502a, in cropping 502b the edges near the head, sides, and bottom of first participant 110 are adjusted so that they are closer to the respective portion of the participant.

For example, the head distance 506t, i.e., the distance between the head of first participant 110 and the top of a cropping, in cropping 502b is less than the head distance 506t in cropping 502a. Thus, there is a larger penalty assessed to the individual cropping loss value for cropping 502b due to the reduced head distance 506t. The left distance 506l, i.e., the distance between the left side of first participant 110 and the left side of a cropping, in cropping 502b is less than the left distance 506l in cropping 502a. Thus, there is a larger penalty assessed to the individual cropping loss value for cropping 502b due to the reduced left distance 506l. The right distance 506r, i.e., the distance between the right side of first participant 110 and the right side of a cropping, in cropping 502b is less than the right distance 506r in cropping 502a. Thus, there is a larger penalty assessed to the individual cropping loss value for cropping 502b due to the reduced right distance 506r. The bottom distance 506b, i.e., the distance between the bottom side of first participant 110 and the bottom of a cropping, in cropping 502b is less than the bottom distance 506b in cropping 502a. Thus, there is a larger penalty assessed to the individual cropping loss value for cropping 502b due to the reduced bottom distance 506b. Therefore, the top, bottom, and sides of cropping 502b are adjusted so that they are closer to the respective portion of the participant, resulting in cropping 502b having a higher individual cropping loss value corresponding to a restriction of free space. The adjustment of the top, bottom, and sides of the edge of the cropping each cause the cropping 502b to have a higher individual cropping loss value corresponding to restriction of free space than cropping 502a. However, the degree of penalization for adjusting the edge of the cropping closer to the head is greater than adjusting the edge of the cropping closer to the sides, which is greater than adjusting the edge of the cropping relative to the bottom of the cropping. In one example, the individual cropping loss value for the distance 506t of the cropping 502a may have a value of 10 versus the individual cropping loss value for the distance 506t of the cropping 502b which may have a value of 80, which means that the distance 506t of cropping 502a is preferred over the distance 506t configuration of cropping 502b. In another example, the individual cropping loss value for the distances 506b, 506l and 506r of the cropping 502a may each have a value of 10, 10, 10, respectively, versus the individual cropping loss value for the distances 506b, 506l and 506r of the cropping 502b may have a value of 50, 60, 55, respectively, which means that the distances 506b, 506l and 506r of cropping 502a are preferred over the distances 506b, 506l and 506r configuration of cropping 502b.

Furthermore, if an object is located on the edge of the frame 118, there is no penalty for adjusting the side of the cropping located on the edge. For example, if the first participant 110 is located on the left edge of the frame (e.g., cropping 402b in FIG. 4B), there would be no penalty assessed for adjusting the left side of the cropping to keep the cropping within the frame. In examples in which sub-tiling is used (described below) if an object is located on the edge of the frame 118, the object will be included in a subtile of a subtiling combination and the whole cropping (i.e., cropping 402b) may not be used. There is no penalty assessed because a cropping cannot be physically located outside of the frame 118. Advantageously, the scoring of free space restrictions forces the croppings to be even more symmetric and will manipulate the system controller 102 to cut-off croppings to the lower half of participant(s) so that participant's heads are not cut-off so remote participants can see their face/facial expressions.

Figure 6A:
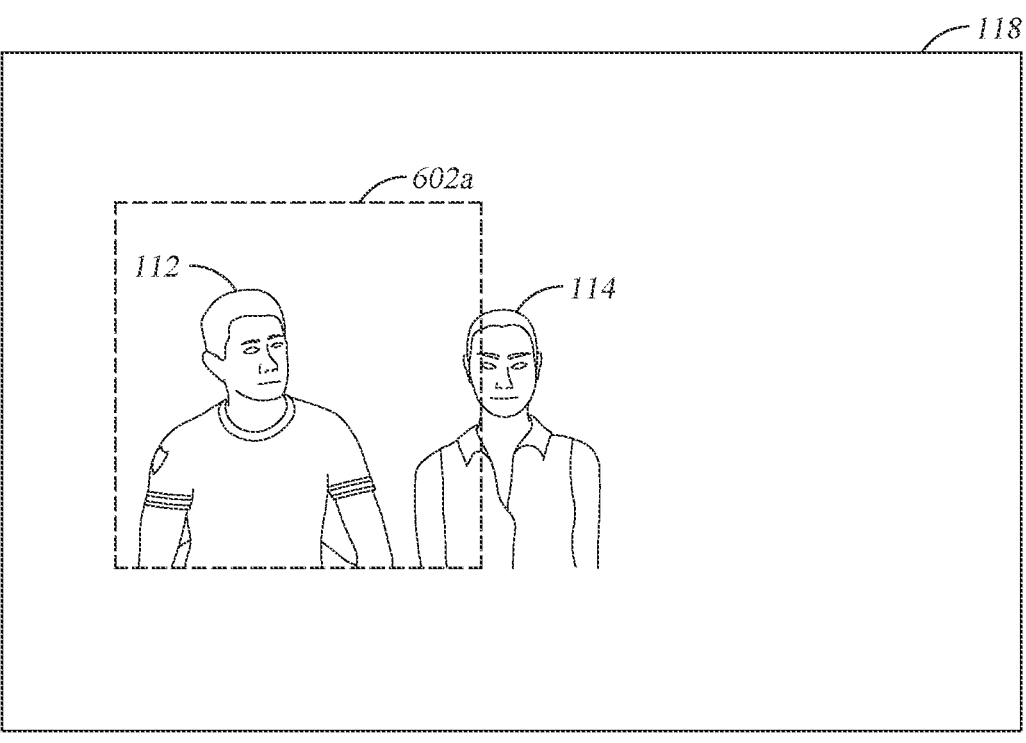
FIGS. 6A-6B are schematic representations of croppings that illustrate how individual cropping loss values can vary due to the full or partial presence of a hitchhiker in a cropping, according to one or more embodiments.
Figure 6B:
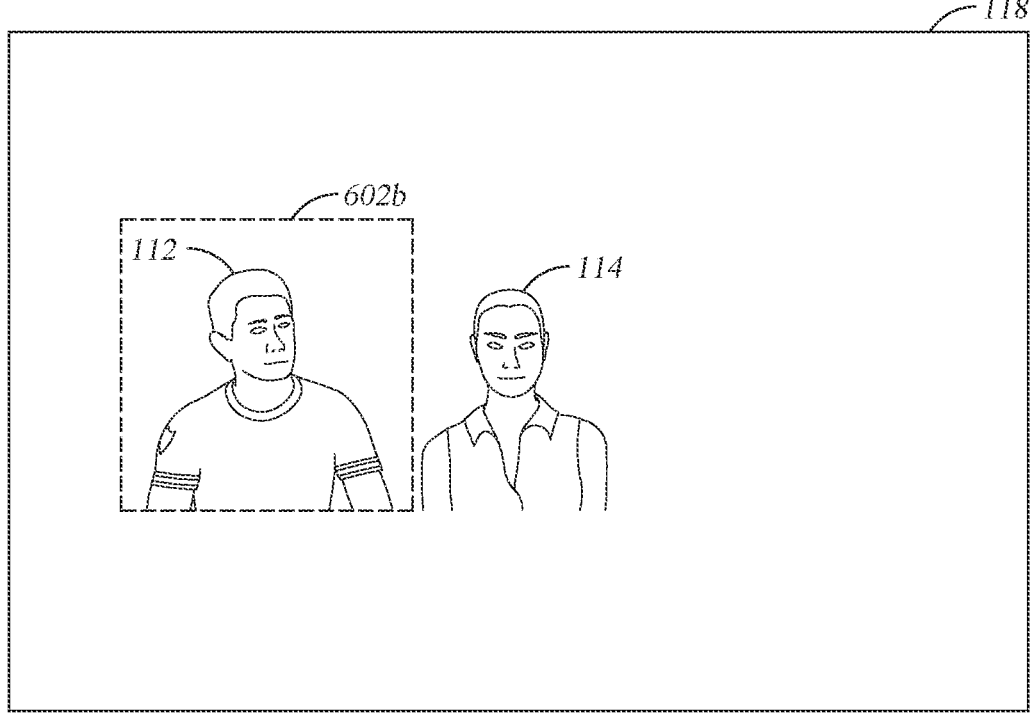

FIGS. 6A-6B are schematic representations of different examples that can be used to determine an individual cropping loss value corresponding to the presence of hitchhikers according to one or more embodiments. A hitchhiker may be defined herein as a portion of an object included in a cropping without having the entire width of the object in the cropping. Stated differently, a hitchhiker may be an unwanted portion of an object, such as a portion of a participant (e.g., shoulder of an additional participant), included in a cropping. A hitchhiker may also be defined as an unwanted or unintended object entirely included in a cropping. Therefore, croppings that include a hitchhiker are penalized. The more the hitchhiker is included in a cropping the higher the individual cropping loss value corresponding to the presence of hitchhikers. For example a cropping including 10% of a hitchhiker's body would have a lower individual cropping loss value corresponding to the presence of a hitchhiker than a cropping including 50% of a hitchhiker's body. For example, cropping 602a includes a portion of hitchhiker (e.g., the third participant 114) while cropping 602b does not include a hitchhiker, so cropping 602a has a higher individual cropping loss value corresponding to the presence of hitchhikers. In one example, the individual cropping loss value for the cropping 602a may have a value of 75 versus the individual cropping loss value for the cropping 602b may have a value of zero or 1. Although FIGS. 6A-6B described a cropping with a single hitchhiker, croppings may include a plurality of hitchhikers and be penalized accordingly.

Furthermore, an individual cropping loss value corresponding to whether the cropping is larger than the ideal cropping may be determined (not shown). Croppings that are larger than the ideal size may be penalized. The larger a cropping is than the ideal cropping size, the higher the penalty. In some examples, adjusting a cropping to minimize the other individual cropping loss values may cause the cropping to be greater than the ideal cropping size. The attributes of an ideal or preferred cropping size can be defined by attributes stored in memory. The attributes of a cropping that has an ideal or preferred size can be defined by attributes that include, but are not limited to, the area of the cropping (e.g., number of pixels within the edges of the cropping), shape, and aspect ratio of the cropping.

Although five individual cropping attributes are used to determine the cropping loss value for each cropping are discussed above, this is for example purposes only. Each set of individual cropping loss values may include any quantity of individual cropping loss values.

Each of the individual cropping loss values are then inputted into the cropping function to determine an overall cropping loss value for each cropping determined by the system controller 102. In various embodiments, the cropping function includes cropping weights, or cropping coefficients, that correspond to each cropping attribute. In one example, the cropping weights may range in value between 0 and 1. In some examples, a cropping weight may exceed 1. Each individual cropping loss value for each cropping attribute (e.g., FOV restriction, restriction of free space, etc.) is multiplied by its corresponding cropping weight to determine a weighted individual attribute loss value (WIALV), which are then added together to form a weighted individual cropping loss value (WICLV) for each of the croppings. Each of the WICLVs for each combination of croppings are added together generating a total grouping loss value for each combination of croppings.

FIG. 7 illustrates combinations of croppings including croppings 120a, 120b and 120d. Here, for the reasons described above, croppings 120a and 120b are a combination of croppings and cropping 120d is a combination of croppings. Although FIG. 7 includes croppings 120a, 120b and 120d, the process steps described herein during activity 208 are repeated for all of croppings, such as adjusting the configuration of each of the individual croppings, such as croppings 120a, 120b, 120c, 120d, 120e and 120f of FIG. 1A to determine the preferred configuration of each of the individual croppings 120a, 120b, 120c, 120d, 120e and 120f. The determination of the preferred configuration of each of the individual croppings is determined by use of the cropping function that is applied to each individual cropping to determine the preferred cropping attributes of each individual cropping that achieves the lowest overall individual cropping loss value. In various embodiments, after determining individual cropping loss values 702a, 702b, 702c and 702d for each individual cropping attribute, the individual cropping loss values 702a, 702b, 702c and 702d are multiplied by a corresponding cropping weight. An individual weighted individual cropping loss value (WICLV) is calculated based on the cropping loss function. In one example, the weighted individual cropping loss value (WICLV) 752 for the cropping 120a can determined by the equation $$WICLV = C1(702a) + C2(702b) + C3(702c) + C4(702d),$$

where C1, C2, C3 and C4 are the cropping weights, and 702a, 702b, 702c and 702d are the individual cropping loss values for each of the cropping attributes. Each cropping weight C1, C2, C3 and C4 correspond to a respective individual cropping loss value 702a, 702b, 702c and 702d. For example, different cropping weights C1, C2, C3 and C4 may be assigned to an asymmetry loss value 702a, FOV restriction loss value 702b, restriction of free space loss value 702c, and hitchhiker presence loss value 702d. In this example, the set of individual cropping attributes determined for croppings 120a, 120b and 120d include four cropping attributes, however, more or less cropping attributes may be used. This process is simultaneously done for all of the other combinations of croppings. The size and shape of each individual cropping is adjusted (i.e., changed) into every possible configuration.

Advantageously each individual cropping is adjusted based on the cropping weights of the cropping formula. This provides guidance for the system controller 102 on how to adjust each of the individual croppings based on user implemented trade-offs between each attribute. For example, if the cropping weight for asymmetry is 0.7 and the cropping weight for the restriction of free space is 0.2, the system controller 102 may prioritize symmetry over the restriction of free space to minimize the WICLVs. Activities 202 through 208 are repeated throughout the video conference.

At activity 209, the software running on the system controller 102 then determines the preferred combination of croppings that include all of the objects within the FOV 111. The preferred combination of croppings will include the one or more croppings formed during activity 208, which when combined together achieves a minimum total combined cropping loss value, such as total combined cropping loss values 761-764, illustrated in FIG. 7. During activity 209 the software running on the system controller 102 will compare each of the weighted individual cropping loss values (WICLVs) (e.g., items 751-753 in FIG. 7) for each of the croppings to determine the group of croppings that includes all of the objects and achieves the lowest total combined cropping loss value. Referring to FIG. 1A, by way of example, if it is determined at a first time that cropping 120*a* has a WICLV of 55, cropping 120*b* has a WICLV of 57, cropping 120*c* has a WICLV of 25, cropping 120*d* has a WICLV of 50, cropping 120*e* has a WICLV of 60, and cropping 120*f* has a WICLV of 80, a preferred combination of croppings that includes all of the objects would be the croppings 120*c* and 120*d*. In this example, cropping 120*c* is favored over croppings 120*a*, 120*b*, 102*e* and 120*f*, since cropping 120*c* has a WICLV of 25 which is less than the WICLV of 120*a*, 120*b*, 102*e*, and 120*f*, which are 55, 57, 60, and 80, respectively. Similarly, cropping 120*d* is favored over croppings 120*e* and 120*f*, since cropping 102*d* has a WICLV of 50 which is less than the WICLV of 120*e* and 120*f*, which are 60 and 80, respectively. Additionally, cropping 120*d* is favored over the grouping that includes separate croppings 120*a* and 120*b*, since cropping 120*d* has a WICLV of 50 which is less than the combination of WICLV of the separate croppings 120*a* and 120*b*, which is 107. However, if it is determined at a second time that the cropping 120*a* has a WICLV of 25, cropping 120*b* has a WICLV of 20, cropping 120*c* has a WICLV of 30, cropping 120*d* has a WICLV of 50, cropping 120*e* has a WICLV of 60, and cropping 120*f* has a WICLV of 80, a preferred combination of croppings that includes all of the objects would be the croppings 120*a*, 120*b* and 120*c*, since each of the three croppings has a WICLV that is below the WICLV of the other croppings 120*d*, 120*e* and 120*f*, the combination of WICLV for the two separate croppings 120*a* and 120*b* is less than the WICLV of cropping 120*d*, the combination of WICLV for the two separate croppings 120*b* and 120*c* is less than the WICLV of cropping 120*e*, and the of WICLV for the three separate croppings 120*a*, 120*b* and 120*c* is less than the WICLV of the cropping 120*f*. However, if it is determined at a third time that cropping 120*f* has a WICLV of 10, while the WICLV of the other croppings remain the same, the preferred combination of croppings that includes all of the objects would be cropping 120*f* by itself. The total combined cropping loss value of the determined preferred combination of croppings is the preferred cropping loss value.

At activity 210, the system controller 102 determines whether a difference between the preferred cropping loss value and also the total combined cropping loss value of the currently used cropping combination (the current cropping loss value) is less than a cropping threshold. Adjusting the attributes of the croppings and/or combination of croppings interferes with the viewing experience of a remote user. Therefore, in some instances it is not worth interrupting the viewing experience for only insignificant improvements. However, for example, if a new participant enters the conference environment 108 the number of objects, the grouping of the objects and/or the frame 118 may need to be adjusted. For example, the cropping threshold may be a value configured to ensure the preferred cropping loss value is at least 50% less (i.e. better) than the current cropping loss value, or at least 40% less (i.e. better) than the current cropping loss value, or at least 30% less (i.e. better) than the current cropping loss value, or at least 20% less (i.e. better) than the current cropping loss value, or at least 10% less (i.e. better) than the current cropping loss value.

If the difference between the preferred cropping loss value and the current cropping loss value is greater than the cropping threshold value, it is not worth interrupting the remote user's viewing experience and the method returns to activity 208. If the difference between a preferred cropping loss value and the current cropping loss value is less than the cropping threshold, the method 200 will proceed to activity 210 and the system controller 102 determines whether the preferred cropping is stable.

At activity 210, the system controller 102 determines whether the duration of time elapsed since the difference between the preferred cropping loss value and the current cropping loss value exceeded a cropping time threshold. For example, as a new participant enters the meeting, the total combined cropping loss value for each combination of croppings will continuously change until the new participant settles into the meeting and takes a seat, causing the preferred cropping to continuously change until the new participant settles in. The system controller 102 is configured not to continuously update the current cropping until the new participant settles in, preventing multiple interruptions to a remote user's viewing experience. Therefore, if the duration of time elapsed does not exceed the cropping time threshold, the method returns to activity 210. If the duration of time elapsed does exceed the cropping time threshold, the method proceeds to activity 214 and the current cropping combination is changed to the preferred cropping.

The WICLVs are constantly changing as frames are continuously surveyed and the croppings are continuously adjusted during a video conference. The greater the improvement of the preferred cropping as the WICLVs are changing, the quicker the cropping should be changed to maximize the viewing experience of a remote user. In various embodiments, to account for this as the difference between the preferred cropping loss value and the cropping threshold increases, the cropping time threshold decreases. Stated differently, the greater the improvement provided by a preferred cropping, the faster it is selected.

After determining all of the possible groupings in activity 209, when the determined number of groupings exceeds the maximum quantity of groupings rule the system controller determines a preferred grouping based on a grouping formula. Schematic representations of a method for determining the preferred grouping are illustrated in FIGS. 8-14.

FIG. 8 is a schematic representation of an example of a process of determining a total combined grouping loss value according to one or more embodiments. A combination of groupings as defined herein, is a combination of croppings having a quantity of croppings that is based on a maximum quantity of groupings rule. In various embodiments, each combination of groupings is limited to the maximum quantity of groupings. In one example, the maximum quantity of groupings may be indicated by a user or determined by hardware limitations of the video conferencing system 105 or supporting network.

Each combination of groupings includes at least one cropping, and each object or groups of objects are included in at least one cropping that make-up a combination of groupings. For example, referring to FIG. 1A, if the maximum quantity of groupings is two, the combinations of groupings may include, but are not limited to, 120*a* and 120*e*, 120*c* and 120*e*, 120*f*, or more generally any combination of groupings that include each object of interest within two or less croppings. Then, based on grouping attributes, and a grouping function including grouping weights, a preferred combination of groupings may be selected in a similar manner in which the preferred combination of croppings is selected. This will be described in more detail below.

Figure 9:
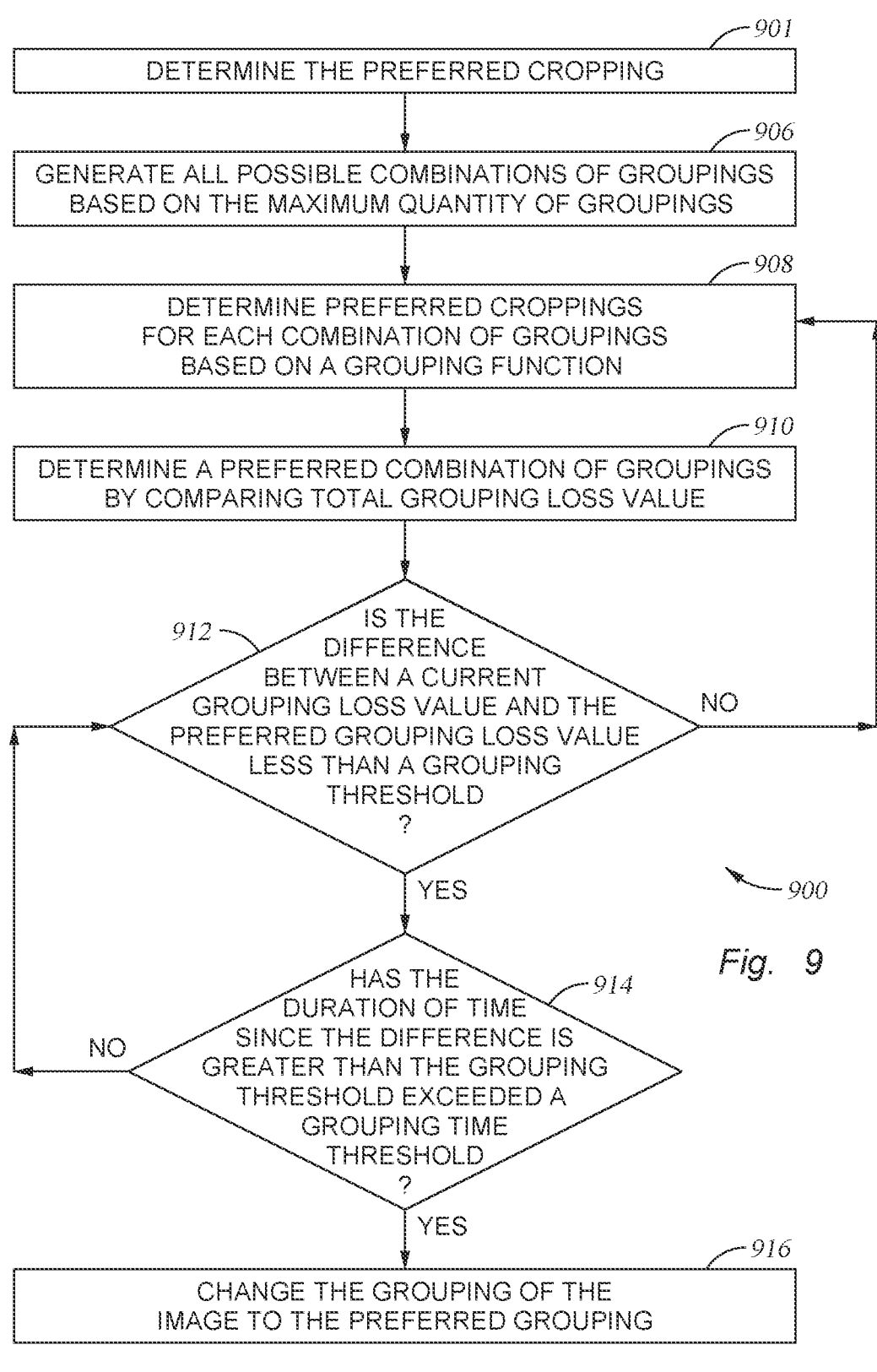
FIG. 9 is a diagram illustrating a method according to one or more embodiments, for adjusting a to-be-transmitted view (display view) of a video stream of a conference environment based on a state of the conference environment 108.

FIG. 9 is a diagram illustrating a method 900 according to one or more embodiments, for adjusting a to-be-transmitted view (display view) of a video stream of a conference environment 108 based on a state of the conference environment 108, for example, the number and locations of objects detected therein. The method 900 may be performed using the video conferencing system 105 described above or any other suitable video conferencing system where automatic grouping and framing of more than one region of interest is desired. Aspects of the method 900 are schematically illustrated in FIGS. 8 and 10-14.

In general, the method 900 is performed using one or more instructions which are executed by use of the processor 140 and resides in the memory 142 of the system controller 102.

At activity 901, the activities performed in method 200 are performed and the preferred combination of croppings are determined in the manner described in relation to FIG. 2 above.

At activity 906, the system controller 102 determines all of the possible combinations of groupings based on a maximum quantity of groupings rule. Stated differently the system controller 102 determines every combination of groupings including a quantity of croppings less than or equal to the maximum quantity of groupings. For example if the maximum quantity of groupings is two, each combination of groupings includes two or less croppings.

Each object or groups of objects are included in at least one cropping of each combination of groupings. Each of the croppings includes at least one object. Stated differently, each participant is included in at least one cropping in each combination of groupings.

At activity 908, the system controller 102 determines preferred croppings for each combination of groupings based on a grouping function. The attributes of each of the croppings is adjusted until a preferred set of attributes for each cropping is determined. Each combination of groupings is adjusted based on a grouping loss function that includes a plurality of grouping attributes. As will be described in more detail below, the preferred configuration of a grouping is the combination of grouping attributes that minimize the value of the grouping function.

The grouping function is used to generate a total combined grouping loss value for each combination of groupings. The total combined grouping loss value is determined by determining a set of individual grouping loss values for each combination of groupings. A set of individual grouping loss values are determined for each cropping in each combination of groupings. For example, a set of individual grouping loss values may be determined for croppings 120a-120f, which are illustrated in FIG. 1A. Each set of individual grouping loss values include individual grouping loss values that correspond to a grouping attribute. Examples of grouping attributes include, but are not limited to, vertical distance, space restriction, people distance, vertical shift, and whether a cropping is missing, and each of the attributes described with respect to cropping. The discussions related to examples of possible grouping attributes, such as the cropping attributes relating to FIGS. 10A-10B, 11A-11B and 12A-12B, and 13A-13B are provided below.

In some embodiments, and for ease of discussion, each individual grouping loss value for each of the grouping attributes is determined in the negative. Stated differently, the higher the grouping loss value the less desirable a defined attribute of a grouping is versus a lower grouping loss value. Moreover, the higher an individual grouping loss value, the worse the grouping is with respect to the corresponding grouping attribute. For example, the greater the horizontal distance between participants are in a cropping, the higher the individual grouping loss value. In one example, each individual grouping loss value for each grouping attribute may range from a value between 0 and 100 with 0 indicating zero penalty and 100 indicating a maximum penalty. In some embodiments, the range of values of the grouping loss value between the minimum and maximum values is defined by a linear scale. Examples of how each of these grouping attributes are determined are illustrated in FIGS. 10-14. While the discussion provided herein primarily utilizes a negative scale for the grouping loss value comparisons, one skilled in the art would understand that a positive scale (e.g., higher grouping loss value is more desirable) could alternately be used to achieve the same determination of a preferred grouping within a group of groupings.

Figure 10A:
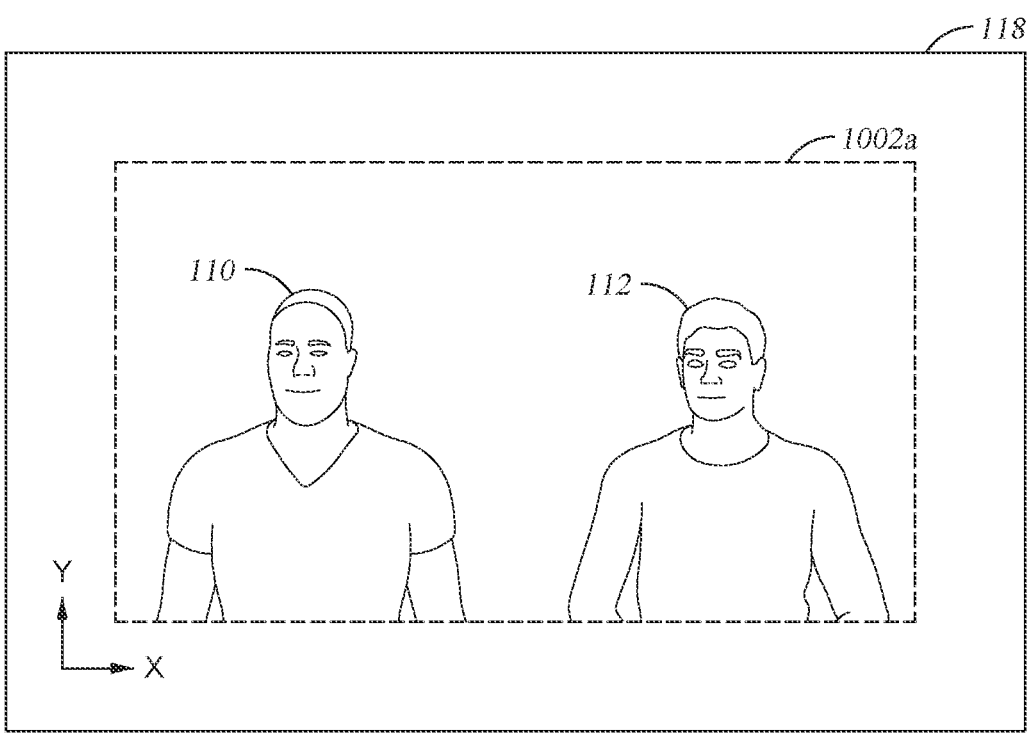
FIGS. 10A-10B are schematic representations of croppings that illustrate how individual grouping loss value can vary due to the distance between objects within the cropping, according to one or more embodiments.
Figure 10B:
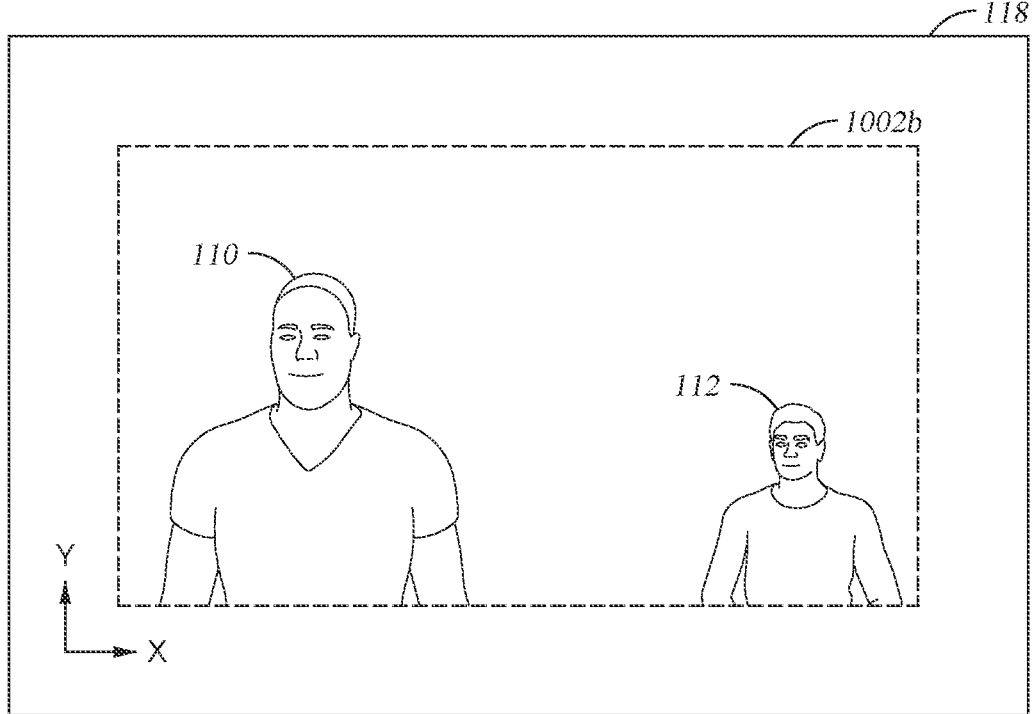

FIGS. 10A-10B are schematic representations of examples of a process of determining an individual grouping loss value corresponding to the distance between objects according to one or more embodiments. In various embodiments, it is preferable to form a cropping with a lower distance between objects. A distance between objects may be defined as the difference between a target location of each object and a top or bottom border of the cropping. The target location may include, but is not limited to, a center of mass of an object, the top of an object, the bottom of an object, or the like. For example, as shown in cropping 1002a (FIG. 10A) and cropping 1002b (FIG. 10B) a distance 1004a may be defined as the distance between the center of mass of the first participant 110 and the bottom of both croppings, and a distance 1004b may be defined as the distance between the center of mass of the second participant 112 and the bottom of both croppings. In another example, a distance between objects may be defined as the difference in head sizes between the first participant 110 and the second participant 112. The greater the magnitude of the difference between distance 1004a and distance 1004b, the higher the individual grouping loss value corresponding to distance between objects. For example in cropping 1002a, the difference between distances 1004a and 1004b is less than the difference between distances 1004a and 1004b in cropping 1002b. Therefore, the individual grouping loss value corresponding to the distance between objects for cropping 1002a is lower than the individual grouping loss value corresponding to the distance between objects for cropping 1002b. In one example, the individual grouping loss value for the cropping 1002a may have a value of 10 versus the individual cropping loss value for the cropping 1002b may have a value of 70.

Figure 11A:
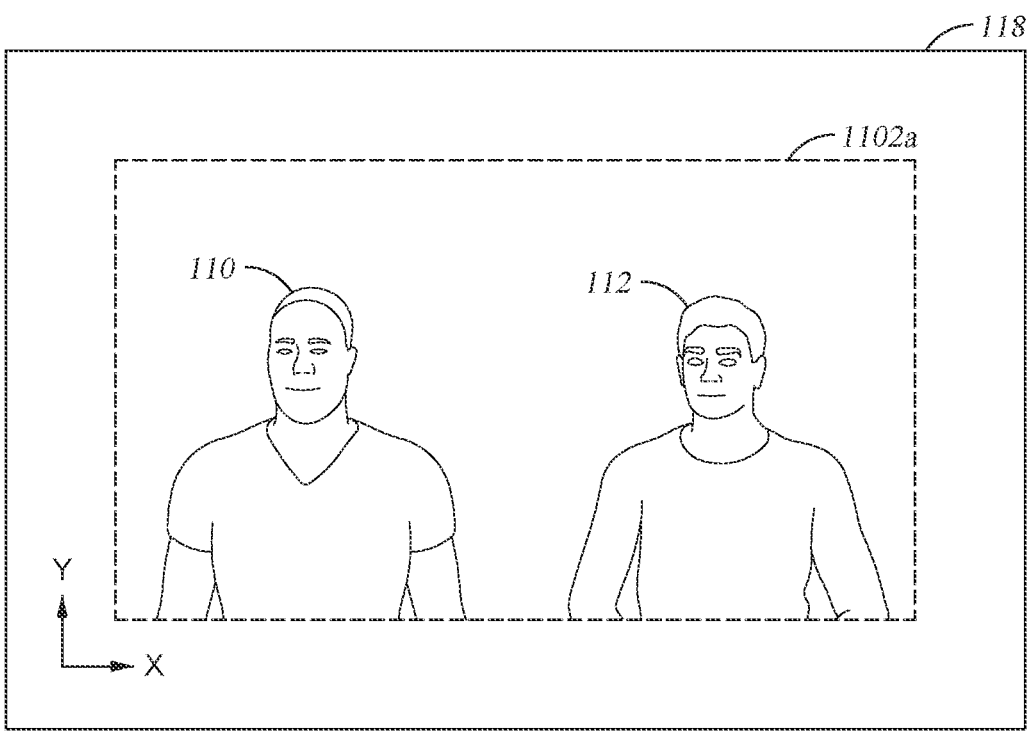
FIGS. 11A-11B are schematic representations of croppings that illustrate how individual grouping loss value can vary due to space restriction within the cropping, according to one or more embodiments.
Figure 11B:
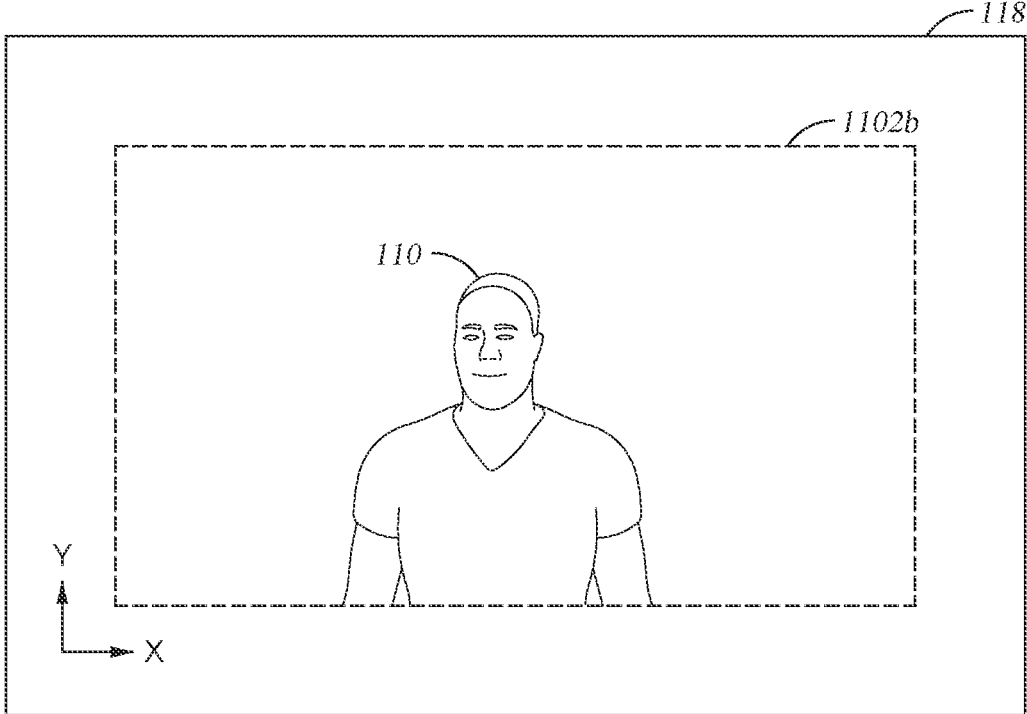

FIGS. 11A-11B are schematic representations of examples of a process of determining an individual grouping loss value corresponding to space restriction according to one or more embodiments. In various embodiments, it is generally preferable to form a cropping with less free space around the objects in the cropping. Therefore, in one example, the more free space in a cropping, the higher the individual grouping loss value corresponding to space restriction. For example, in FIGS. 11A-11B croppings 1102a and 1102b are positioned within croppings that are the same size. However, cropping 1102a includes the first participant 110 and the second participant 112 while cropping 1102b includes only the first participant 110. Therefore, there is more free space in cropping 1102b because two participants take up more space in the cropping than a single participant. Therefore, the individual grouping loss value corresponding to space restriction for cropping 1102a is lower than that of cropping 1102b because cropping 1102b includes more free space. In one example, the individual grouping loss value for the cropping 1102a may have a value of 12 versus the individual cropping loss value for the cropping 1002b may have a value of 65.

Figure 12A:
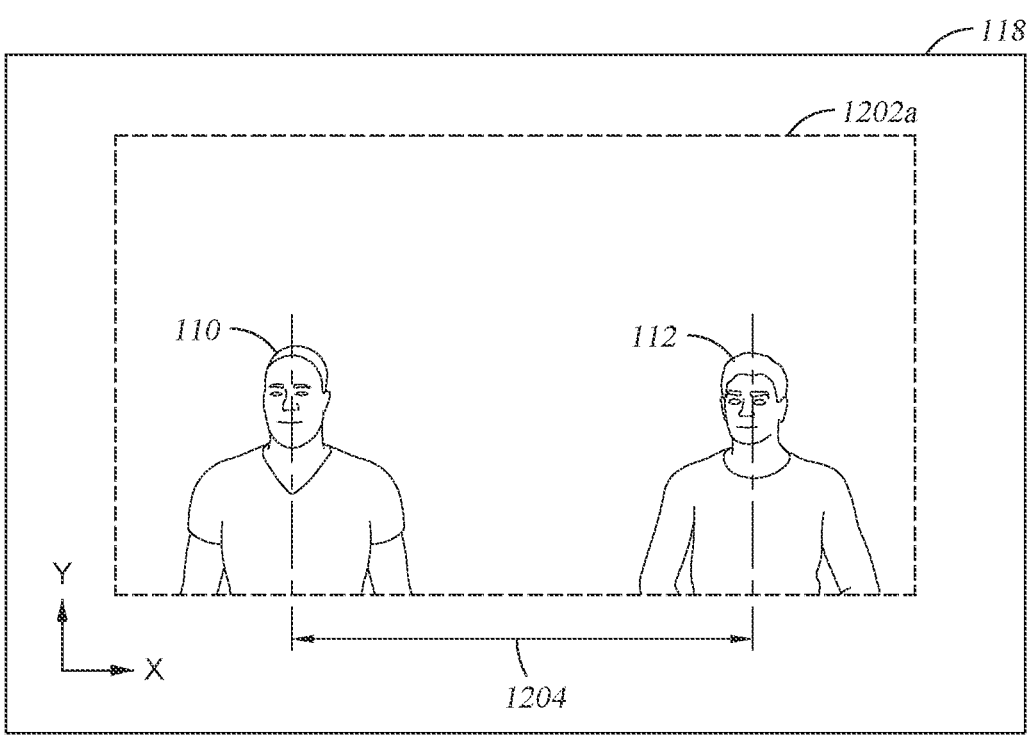
FIGS. 12A-12B are schematic representations of croppings that illustrate how individual grouping loss value can vary due to a horizontal distance between objects in the cropping, according to one or more embodiments.
Figure 12B:
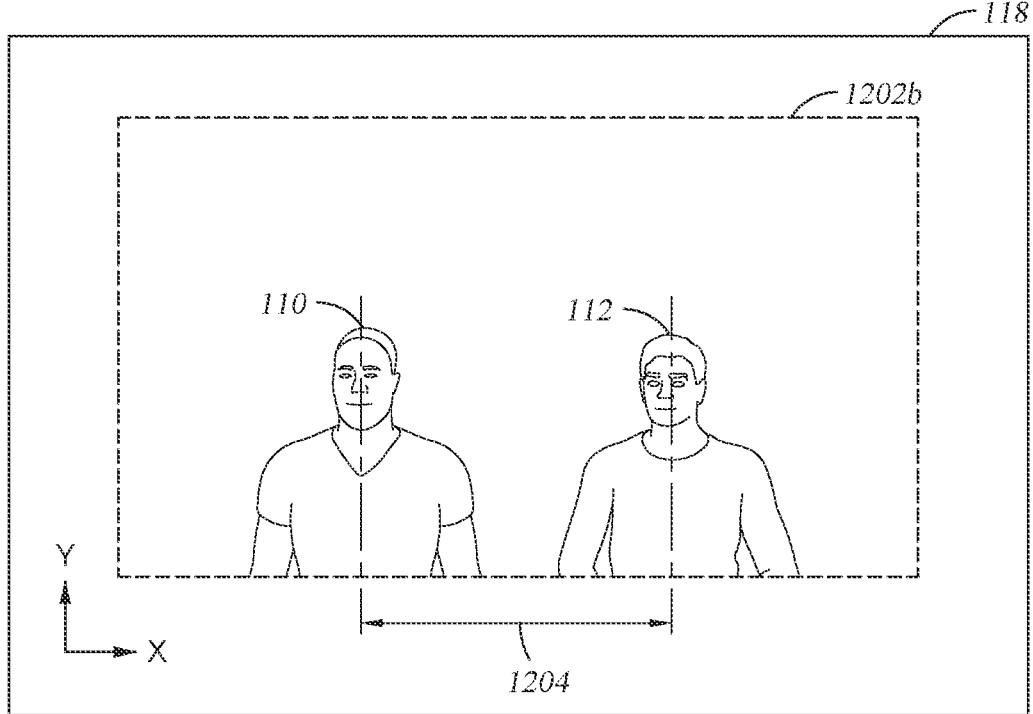

FIGS. 12A-12B are schematic representations of examples of a process of determining an individual grouping loss value corresponding to a horizontal distance between objects according to one or more embodiments. In various embodiments, it is preferable to form a cropping with lower horizontal distance between objects. A horizontal distance between objects may be defined as the horizontal distance 1204 along the x-axis between target locations of objects. For example, the horizontal distance between objects may be the horizontal distance 1204 between the center of mass of the first participant 110 and the second participant 112. In another example, the horizontal distance between objects may be defined as the horizontal distance between the sides of the participants, e.g., the horizontal distance between the left side of the first participant 110 and the right side of the second participant 112. The greater the distance between objects, the higher the individual grouping loss value corresponding to distance between objects. For example, cropping 1202a includes a greater horizontal distance 1204 (i.e., the distance between the first participant 110 and the second participant 112) than cropping 1202b. Therefore, the individual grouping loss value corresponding to the horizontal distance between objects for cropping 1202a is higher than that of cropping 1102b because cropping 1202a has a greater horizontal distance 1204. In one example, the individual grouping loss value for the cropping 1202a may have a value of 68 versus the individual cropping loss value for the cropping 1202b may have a value of 12.

Figure 13A:
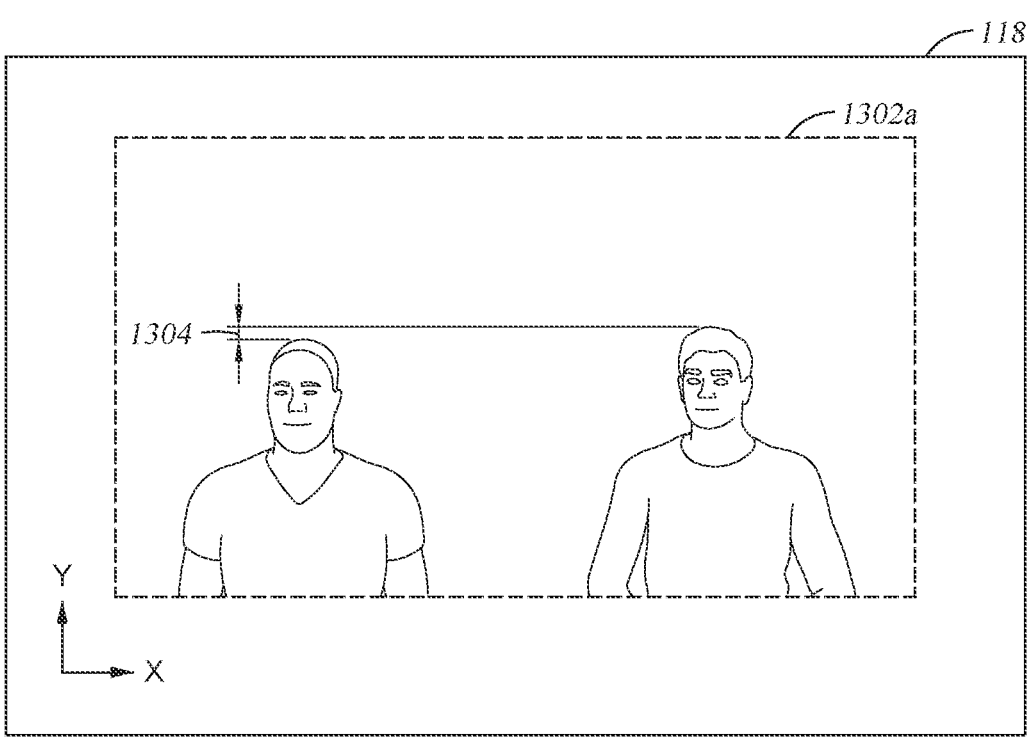
FIGS. 13A-13B are schematic representations of croppings that illustrate how individual grouping loss value can vary due to a vertical shift between objects within the cropping, according to one or more embodiments.
Figure 13B:
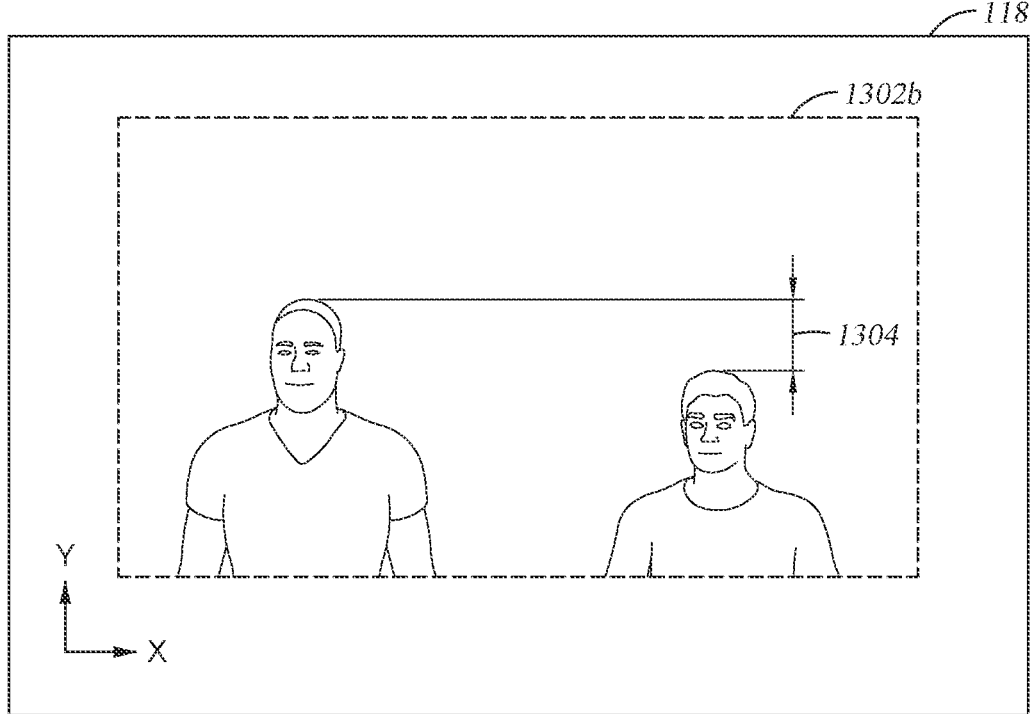

FIGS. 13A-13B are schematic representations of examples of a process of determining an individual grouping loss value corresponding to a vertical shift between objects according to one or more embodiments. In various embodiments, it is preferable to form croppings with a lower vertical shift between objects. A vertical shift between objects may be defined as the vertical distance along the y-axis between target locations of objects. For example, the vertical distance between objects may be the vertical distance 1304 between the heads of the first participant 110 and the second participant 112. In another example, the vertical shift between objects may be defined as the vertical distance between the center of mass of the first participant 110 and the second participant 112. The greater the vertical shift, the higher the individual grouping loss value corresponding to the vertical shift. For example, cropping 1302a includes a lower vertical distance 1304 than cropping 1302b. Therefore the individual grouping loss value corresponding to the vertical shift for cropping 1302a is lower than that of cropping 1302b. In one example, the individual grouping loss value for the cropping 1302a may have a value of 10 versus the individual cropping loss value for the cropping 1302b may have a value of 70.

Each of the individual grouping loss values are then inputted into the grouping function to determine an overall grouping loss value for each cropping in each combination of groupings determined by the system controller 102. In various embodiments, the grouping function includes grouping weights, or grouping coefficients, that correspond to each grouping attribute. In one example, the grouping weights may range in value between 0 and 1. In some examples, a grouping weight may exceed 1. Each individual grouping loss value for each grouping attribute (e.g., distance between objects, space restriction, vertical shift between objects, etc.) is multiplied by its corresponding grouping weight to determine an individual weighted grouping attribute loss values (IWGALVs), which are then added together to form individual weighted grouping loss values (IWGLVs) for each of the croppings. Each of the IWGLVs for each combination of groupings are added together generating a total grouping loss value for each combination of groupings.

FIG. 8 illustrates combinations of croppings including croppings 120a, 120b and 120d. Here, for the reasons described above, croppings 120a and 120b are a combination of groupings and cropping 120d is a combination of groupings. Although FIG. 8 includes croppings 120a, 120b and 120d, the process steps described herein during activity 908 are repeated for all of groupings, such as adjusting the configuration of each of the individual croppings, such as croppings 120a, 120b, 120c, 120d, 120e and 120f of FIG. 1A to determine the preferred configuration of each of the individual croppings 120a, 120b, 120c, 120d, 120e and 120f. The determination of the preferred configuration of each of the individual croppings is determined by use of the grouping function that is applied to each individual cropping to determine the preferred grouping attributes of each individual cropping that achieves the lowest overall individual grouping loss value. In various embodiments, after determining individual grouping loss values 802a, 802b, 802c and 802d for each individual grouping attribute, the individual grouping loss values 802a, 802b, 802c and 802d are multiplied by a corresponding grouping weight. Each grouping weight may correspond to a grouping attribute. For example, different grouping weights may be assigned to distances between objects, vertical shift, horizontal distance between objects, and the like. For example, the set of grouping attributes determined for croppings 120a, 120b, and 120c may include four grouping attributes. Individual weighted grouping loss values (IWGLV) is calculated based on the grouping function. In one example, the IWGLV 852 for the cropping 120a can determined by the equation $$IWGLV = G1(802a) + G2(802b) + G3(802c) + G4(802d),$$

where G1, G2, G3 and G4 are the grouping weights, and 802a, 802b, 802c and 802d are the individual grouping loss values for each of the grouping attributes. Each grouping weight G1, G2, G3 and G4 correspond to a respective individual grouping loss value 802a, 802b, 802c and 802d. For example, different grouping weights G1, G2, G3 and G4 may be assigned to a distances between objects grouping attribute 802a, a space restriction grouping attribute 802b, a vertical shift grouping attribute 802c, and a horizontal distance between objects grouping attribute 802d, respectively.

Although the quantity of grouping attributes determined is four, this is for example purposes only, any quantity of grouping attributes could be used. The quantity of grouping attributes can be greater than or less than four. The same four grouping attributes may be evaluated for each of the possible groupings determined by the software running on the system controller 102. This process is simultaneously done for all of the other combinations of groupings. The size and shape of each individual cropping is adjusted (i.e., changed) into every possible configuration based on the maximum grouping rule.

Advantageously, each individual grouping is adjusted based on the grouping weights of the grouping formula provided by a user. Advantageously, this provides guidance for the system controller 102 on how to adjust each of the individual groupings. For example if the grouping weight (G1) for a vertical shift is assigned a weight of 0.7 and the grouping weight (G2) for horizontal distance between groupings loss is assigned a weight of 0.2, the system controller 102 will tend to prioritize vertical shift over the horizontal distance between groupings since the weighting tends to minimize the total combined grouping loss values.

At activity 910, the software running on the system controller 102 then determines the preferred combination of groupings that include all of the objects within the FOV 111. The preferred combination of groupings will include the one or more croppings formed during activity 908, which when combined together achieves a minimum total combined grouping loss value, such as total combined grouping loss values 861-864, illustrated in FIG. 8. During activity 909 the software running on the system controller 102 will compare each of the IWGLVs (e.g., items 851-853 in FIG. 8) for each of the croppings to determine the group of croppings that includes all of the objects and achieves the lowest total combined grouping loss value. Referring to FIG. 1A, by way of example, if it is determined at a first time that cropping 120a has a IWGLV of 55, cropping 120b has a IWGLV of 57, cropping 120c has a IWGLV of 25, cropping 120d has a IWGLV of 50, cropping 120e has a IWGLV of 60, and cropping 120f has a IWGLV of 80, a preferred combination of groupings that includes all of the objects while remaining less than or equal the maximum quantity of groupings would be the croppings 120c and 120d. In this example, cropping 120c is favored over croppings 120a, 120b, 120e and 120f, since cropping 120c has an IWGLV of 25 which is less than the IWGLV of 120a, 120b, 120e, and 120f, which are 55, 57, 60, and 80, respectively. Similarly, cropping 120d is favored over croppings 120e and 120f, since cropping 120d has an IWGLV of 50 which is less than the IWGLV of 120e and 120f, which are 60 and 80, respectively. However, if it is determined at a second time that the cropping 120a has an IWGLV of 25, cropping 120b has an IWGLV of 20, cropping 120c has an IWGLV of 30, cropping 120d has an IWGLV of 50, cropping 120e has an IWGLV of 60, and cropping 120f has an IWGLV of 70, a preferred combination of groupings that includes all of the objects would be cropping 120f, since its IWGLV is the lowest IWGLV for each combination of groupings including a quantity of croppings less than the maximum amount of groupings. For example, a combination of groupings including croppings 120a and 120d would have an IWGLV equal to 85 and a combination of groupings including croppings 120c and 120d would have an IWGLV equal to 80, which are both greater than 70. The total combined grouping loss value of the determined preferred combination of groupings is the preferred grouping loss value. Activities 901 through 910 (and optionally 909) are repeated throughout the video conference.

At activity 912, the system controller 102 determines whether a difference between the preferred grouping loss value and also the total combined grouping loss value of the currently used grouping combination (the current grouping loss value) is less than a grouping threshold. Adjusting the attributes of the croppings and/or combination of groupings interferes with the viewing experience of a remote user. Therefore, in some instances it is not worth interrupting the viewing experience for only insignificant improvements. However, for example, if a new participant enters the conference environment 108 the number of objects, the grouping of the objects and/or the frame 118 may need to be adjusted. For example, the grouping threshold may be a value configured to ensure the preferred grouping loss value is at least 50% less (i.e. better) than the current cropping loss value, or at least 40% less (i.e. better) than the current cropping loss value, or at least 30% less (i.e. better) than the current cropping loss value, or at least 20% less (i.e. better) than the current cropping loss value, or at least 10% less (i.e. better) than the current cropping loss value.

If the difference between the preferred grouping loss value and the current grouping loss value is greater than the grouping threshold value, it is not worth interrupting the remote user's viewing experience and the method returns to activity 908. If the difference between a preferred grouping loss value and the current grouping loss value is less than the grouping threshold, the method 900 will proceed to activity 914 and the system controller 102 determines whether the preferred grouping is stable.

At activity 914, the system controller 102 determines whether the duration of time elapsed since the difference between the preferred grouping loss value and the current grouping loss value exceeded a grouping time threshold. For example, as a new participant enters the meeting, the total combined grouping loss value for each combination of grouping will continuously change until the new participant settles into the meeting and takes a seat, causing the preferred grouping to continuously change until the new participant settles in. The system controller 102 is configured not to continuously update the current grouping until the new participant settles in, preventing multiple interruptions to a remote user's viewing experience. Therefore, if the duration of time elapsed does not exceed the cropping time threshold the method returns to activity 912. If the duration of time elapsed does exceed the grouping time threshold, the method proceeds to activity 916 and the current grouping combination is changed to the preferred grouping.

The preferred grouping loss value is constantly changing as frames are continuously surveyed and the grouping are continuously adjusted during a video conference. The greater the improvement of the preferred grouping, the quicker the grouping should be changed to maximize the viewing experience of a remote user. In various embodiments, to account for this as the difference between the preferred grouping loss value and the grouping threshold increases, the grouping time threshold decreases. Stated differently, the greater the improvement provided by a preferred grouping the faster it is selected.

As described above, the maximum quantity of groupings can be indicated by a user. In some examples, the system controller 102 may be configured to form a maximum number of groupings that is greater than the maximum quantity of groupings indicated by the user. In this case, the system controller 102, based the grouping function, may determine that the viewing experience would improve if the user increased the indicated maximum quantity of groupings. In response, the system controller 102 may recommend the improved maximum quantity of groupings to the user in any suitable method such as a pop-up window. For example, if the user indicated a maximum quantity of groupings is 2, but the system controller 102 determines that a combination of groupings including 3 grouping has a lower total combined grouping loss value then the preferred grouping, the system controller 102 may recommend that the user increase the maximum quantity of groupings.

In various embodiments, to further improve a combination of groupings based on the grouping parameters, each cropping combination of each grouping may be subtiled. Each cropping could be subtiled into a combination of subtiles (subtiling combination) that includes one or more subtiles of equal or different sizes. Each cropping combination for each grouping may be simultaneously subtiled. Each subtiling combination of each cropping is adjusted to minimize subjective subtiling penalty values assigned to each subtiling combination based on attributes of each subtiling combination. After the subtiling penalty values are minimized the subtiling penalty values for each subtiling combination are added to generate total subtiling penalty values for each subtiling combination. Then total subtiling penalty values for each subtiling combination of each cropping combination of each grouping are added together and then are added to the corresponding total combined grouping values (i.e., 861-864) to determine the grouping including the subjectively preferred subtiled croppings. The grouping including the subjectively preferred subtiled croppings may then be transmitted to the video conferencing software application being used.

Subtiling Process Examples

FIG. 14 is diagram illustrating a method 1400 according to one or more embodiments, for partially cropping (i.e., subtiling) each of the potential croppings of the to-be-transmitted view (display view) of the video stream of the conference environment. In one or more embodiments, the method 1400 is performed in parallel with the method 200 and the method 900. Aspects of the method 1400 are schematically illustrated in FIGS. 15-25B.

In general, the method 1400 is performed using one or more instructions which are executed by use of the processor 140 and resides in the memory 142 of the system controller 102. In some embodiments, a software application running on the system controller 102 is configured to perform each of the activities performed during the completion of method 1400.

Figure 15:
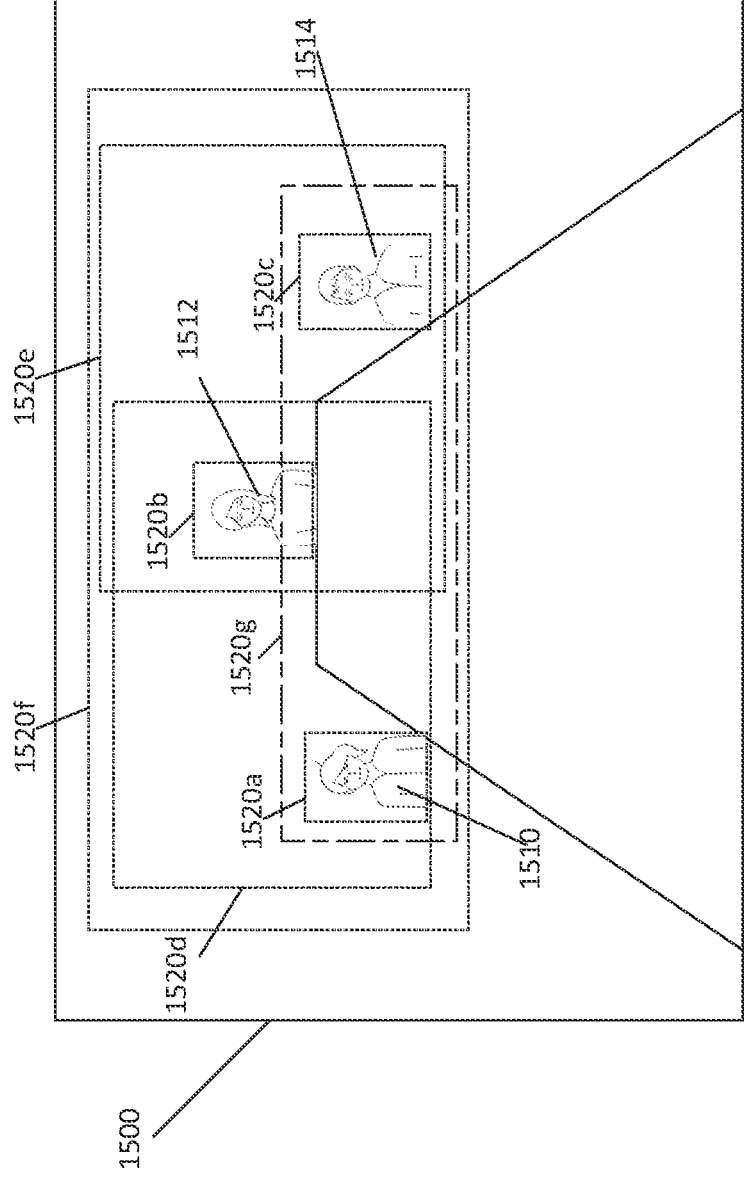
FIG. 15 is a schematic representation of a frame captured within a video conferencing environment, according to one or more embodiments.

At activity 1402, the system controller 102 generates all possible combinations of croppings (i.e., croppings) based on the detected objects. Activity 1402 may be performed in the same manner as activities 202-206 of FIG. 2. FIG. 15 is a schematic representation of a frame 1500 captured within a video stream of images generated in a video conferencing environment, according to one or more embodiments. For example, the system controller 102 generates all possible combinations of croppings based on each of the objects (participants) captured within a frame 1500 of FIG. 15. As described above, the frame 1500 is captured within the FOV 111 of the camera 106. In one example, the objects are participants in the video conference. For example, as shown in FIG. 15, the system controller 102 determines a first participant 1510, a second participant 1512, and a third participant 1514 are captured within the FOV 111 of the camera device 106. As described above, based on the number of objects determined the frame 1500, the total number of possible combinations of croppings can be determined (i.e., 2N-1 croppings are possible, where N is equal to the number of objects (participants)). For example, potential croppings include, but are not limited to, croppings 1520a-1520g. However, the useful and/or desired number of croppings can be less than the total number of possible combinations of croppings, since croppings that are formed between two objects that include an intervening object (hitchhiker) are generally not useful for determining the optimal croppings due to at least redundancy with other determined croppings. For example, the cropping 1520g includes the first participant 110 and the third participant 114 must include the second participant 112, which will be covered by a cropping 1520f that includes all three participants. Thus, the cropping 1520g is pruned (removed) from the list of possible combinations of croppings since it contains a "hitchhiker" (i.e., the second participant 1512).

At activity 1404 the system controller 102 determines all possible subtiling combinations for each determined cropping (i.e., cropping combination). For example, all the subtiling combinations for the croppings 1520a-1520f are determined. Stated differently, in order to improve the quality of each of the croppings and/or meet requirements of a video conference software application, each of the croppings can be divided into subtiles (i.e. sub-croppings formed within a cropping). Each subtile includes at least one object (i.e., participant). Additionally this allows objects (participants) to be cropped from different places on the frame 1500 to generate a preferred and improved view of participants within a video stream generated during a video conference.

The number of ways a cropping can be subtiled is unlimited. Therefore, to limit the amount of possible subtiling combinations to a number that can be handled by use of a conventional and non-cost prohibitive processor, the software running on the controller 102 can optionally perform an analysis of the possible combinations of fractional aspect ratio subtiles. The aspect ratio of a cropping and a subtile is defined as the ratio between the length and the width of the cropping and subtile, respectively. Stated differently, each cropping can be subtiled into subtiling combinations including at least one subtile having an aspect ratio that is proportional to the aspect ratio of the cropping. For example, subtiles can have the same aspect ratio of the cropping (a fractional aspect ratio of 1), an aspect ratio that is equal to half of the aspect ratio of the cropping (a fractional aspect ratio of one-half), an aspect ratio that is equal to one-third of the aspect ratio of the cropping (a fractional aspect ratio of one-third), and so on. Each cropping can be subtiled into subtiles having equal or unequal fractional aspect ratios.

Figure 16A:
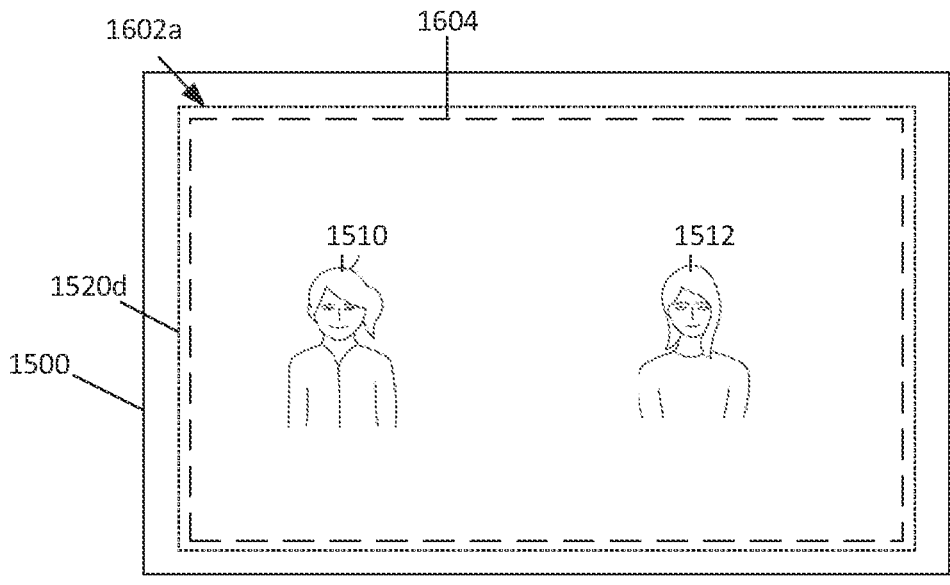
FIGS. 16A-16C illustrate examples of potential subtiling combinations of a cropping, according to one or more embodiments.
Figure 16B:
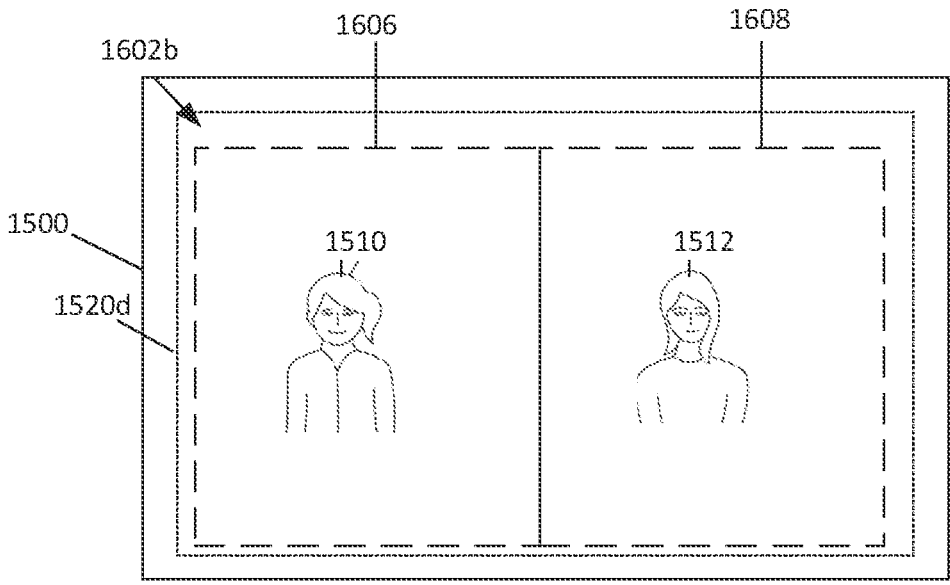
Figure 16C:
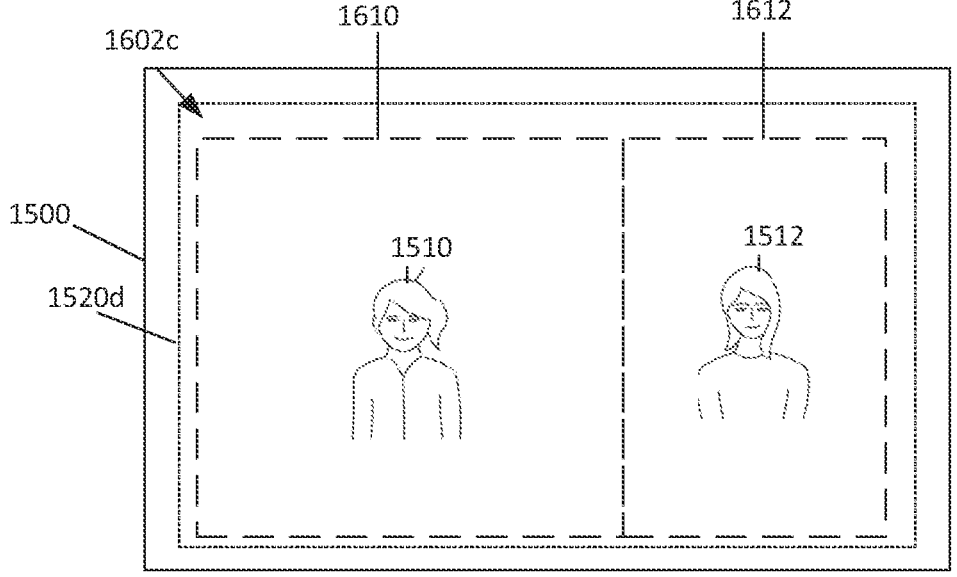

FIGS. 16A-16C illustrate examples of potential subtiling combinations of a cropping, according to one or more embodiments. For example, the cropping 1520d (FIG. 15) includes the first participant 1510 and the second participant 1512. Referring to FIG. 16A the cropping 1520d can be subtiled using a subtiling combination 1602a having a fractional aspect ratio of 1. Stated differently, the subtiling combination 1602a includes a single subtile 1604 that includes both the first participant 1510 and the second participant 1512 and has the same aspect ratio as the cropping 1520d.

Referring to FIG. 16B, the cropping 1520d can be subtiled using a subtiling combination 1602b including subtiles having equal fractional aspect ratios. For example, the subtiling combination 1602b includes a subtile 1606 that includes the first participant 1510 and a subtile 1608 that includes the second participant 1512 that each have aspect ratios that are equal to one-half of the aspect ratio of the cropping 1520d. Therefore, the subtile 1606 and the subtile 1608 each have a fractional aspect ratio of one-half.

Referring to FIG. 16C, the cropping 1520d can be subtiled using a subtiling combination 1602c including subtiles having unequal fractional aspect ratios. For example, the subtiling combination 1602c includes a subtile 1610 that includes the first participant 1510 and a subtile 1612 that includes the second participant 1512. In this example, the subtile 1610 can have an aspect ratio equal to two-thirds of the aspect ratio of the cropping 1520d. The subtile 1612 can have an aspect ratio equal to one-third of the aspect ratio of the cropping 1520d. Therefore, subtile 1610 has a fractional aspect ratio of two-thirds and the subtile 1612 has a fractional aspect ratio of one-third. Although only three subtiling combinations of the cropping 1520*d* are described, this is for example purposes only, and the cropping 1520*d* can be subtiled in any suitable manner.

In an effort to reduce or further reduce the number of possible subtiling combinations, at activity 1406, the system controller 102 prunes the possible subtiling combinations. Stated differently, undesired subtile combinations can be quickly eliminated from contention, further limiting the total number of subtiling combinations. Undesired subtiling combinations can be determined by use of a set of pruning rules that are defined in the software running on the system controller 102. In one example, pruning rules that can be used to determine undesired subtiling combinations can include, but are not limited to, subtiles that violate the horizontal order of the scene, have an aspect ratio that extends outside of the frame 1500, or subtiles that exceed a maximum amount of people (participants).

Figure 17A:
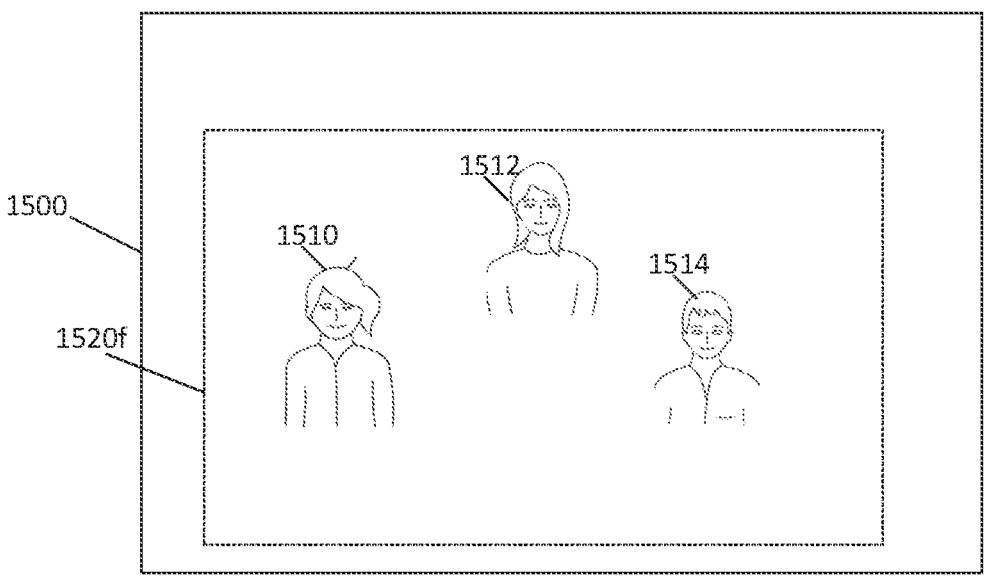
FIGS. 17A-17D illustrate examples for pruning subtiles, according to one or more embodiments.
Figure 17B:
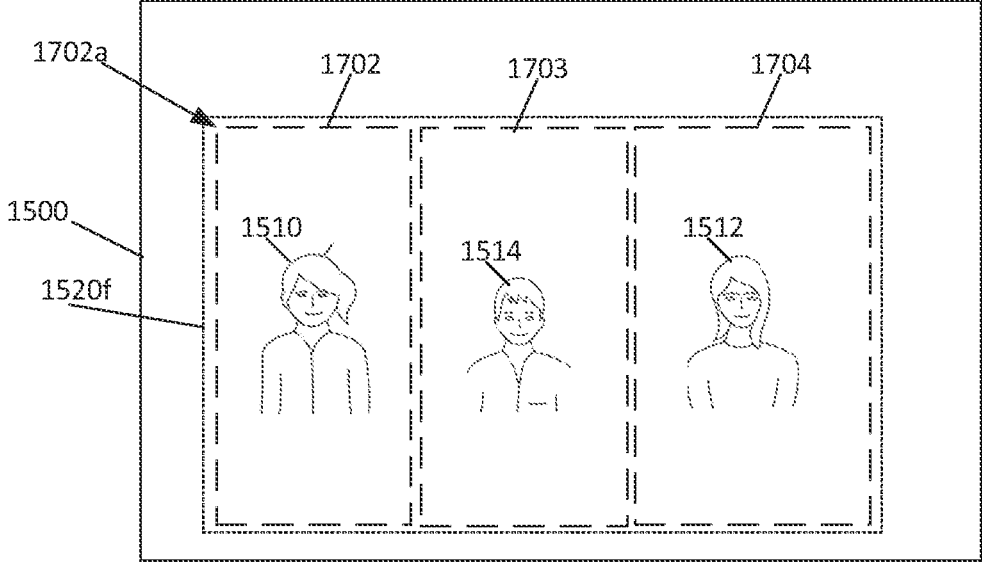

FIGS. 17A-17D illustrate examples of subtiling combinations that are analyzed to determine if one or more of the subtiling combinations can be pruned (i.e., removed from the list of possible subtiling combinations), according to one or more embodiments. FIGS. 17A-17B illustrate an example of pruning a subtiling combination for violating the horizontal of a scene (i.e., frame 1500). Referring to FIG. 17A the cropping 120*f* includes each of the participants 1510-1514 in the frame 1500. As shown in frame 1500, the order of participants in the horizontal direction from left to right is as follows: the first participant 1510, the second participant 1512, and the third participant 1514.

Referring to FIG. 17B, a subtiling combination 1702*a* of the cropping 1520*f* includes a subtile 1702, a subtile 1703, and a subtile 1704. The subtile 1702 includes the first participant 1510. The subtile 1703 includes the third participant 1514. The subtile 1704 includes the second participant 1512. The order of participants in the horizontal direction from left to right is now as follows in the subtiling combination 1702*a*: the first participant 1510, the third participant 1514, and the second participant 1512. Thus the horizontal order of the scene is violated, and the subtiling combination 1702*a* is pruned.

Figure 17C:
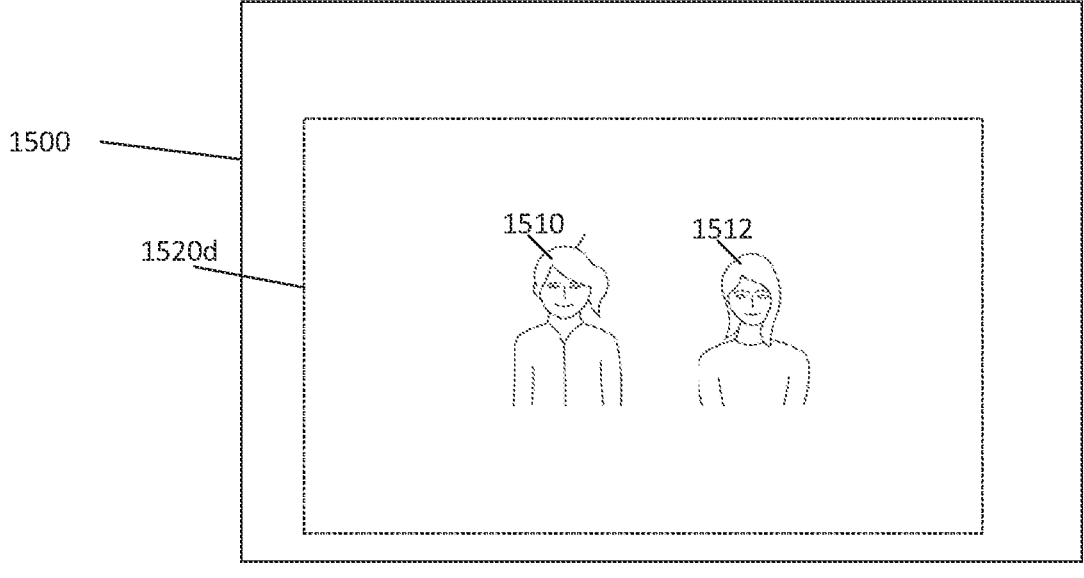
Figure 17D:
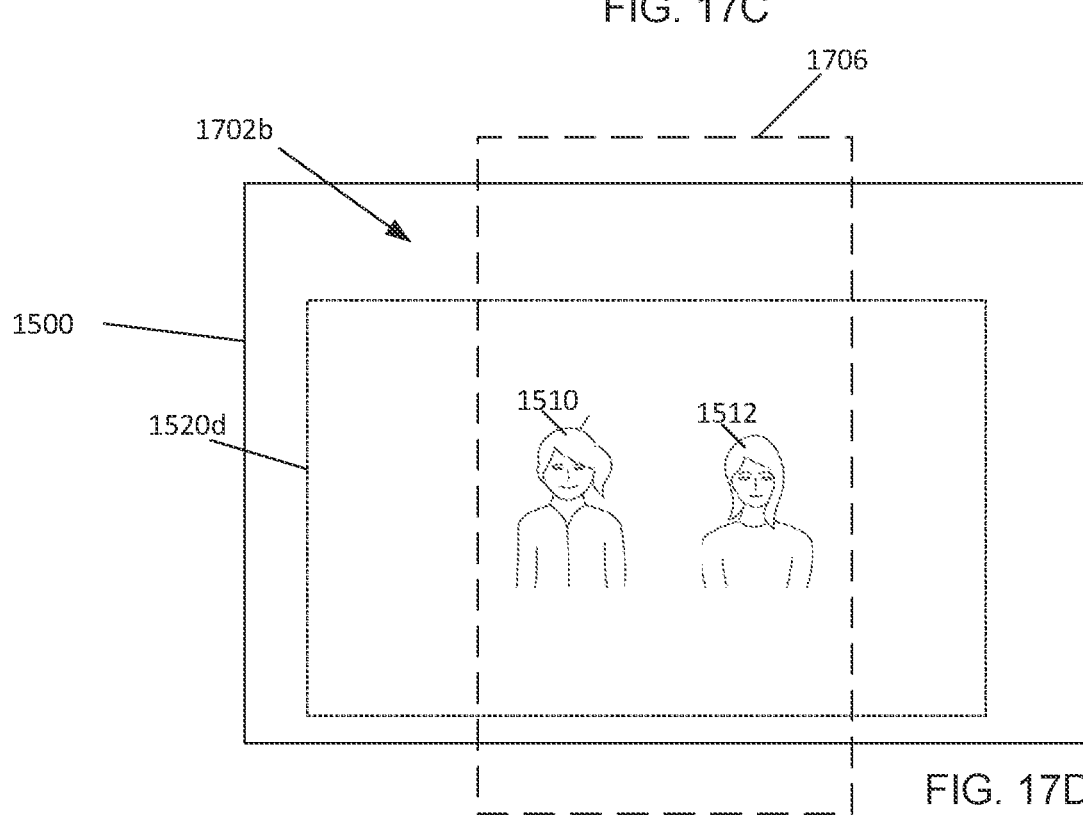

FIGS. 17C-17D illustrate eliminating a subtiling combination due a subtiling having an aspect ratio that extends outside of the frame 1500. Referring to FIG. 17C the cropping 1520*d* includes the first participant 1510 and the second participant 1512. Referring to FIG. 17D, a subtiling combination 1702*b* includes a subtile 1706. However, the subtile 1706 extends outside of the frame 1500. Therefore, the subtiling combination 1702*b* is pruned. Stated differently, even though the subtile 1706 has an aspect ratio that is equal to a fraction of the aspect ratio of the cropping 120*d*, it still extends outside of the frame 1500 and is pruned.

In another example, subtiling combinations may be pruned based on a maximum allowable quantity of people (participants) within a subtile restriction. The maximum allowable quantity of people within a subtile is prorated based on the number of participants in a scene. In some examples, the maximum allowable quantity of people of a subtile is based on a percentage of participants detected in a scene and a threshold maximum value of participants. The percentage of participants is a predetermined percentage that is subjectively set by the user or the video conferencing software application being used. The threshold maximum value of participants is a quantity of participants that is subjectively set by the user or the video conferencing software application and is based on the size of the subtile. In some examples, the larger the size of a subtile the higher the threshold maximum value of participants due to the increased space to the subtile. In one or more embodiments, the maximum allowable quantity of people is the larger value between the percentage of participants detected in a scene and the threshold maximum value of participants. For example, if there are 20 participants in a scene, the predetermined percentage is 20, and the threshold maximum value of participants is 10, the maximum allowable quantity of people is 10. Stated differently, because 20 percent of 20 participants is 4 participants and 10 participants (the maximum threshold value of participants) is greater than 4, the maximum allowable quantity of people is 10 participants. On the other hand, if the predetermined percentage is 80, then the maximum allowable quantity of people would be 16 participants. If any subtiling combination includes a subtile that exceeds the maximum allowable quantity of participants, the subtiling combination is pruned.

At activity 1408, a total subtiling penalty valve (TSPV) is determined for each of the remaining valid subtiling combinations by the system controller 102. The TSPV may be determined based on subtiling penalty values that are applied to each of the remaining valid (not pruned) subtiling combinations. In various embodiments, each subtile of each subtiling combination is adjusted by the system controller 102 based on the subtiling penalty values and/or algorithm presets to minimize the TSPV. Then a TSPV is determined (i.e., assigned to) each subtiling combination. In various embodiments, a subtiling penalty value is assigned to different subtile attributes of each subtiling combination. In one example, the subtiling penalty values are based on algorithm presets, the video conferencing system being used, or user preferences. The subtiling penalty values may be based on the quality of each subtiling combination and/or preferences of the video conferencing software application used to display the video stream (i.e., the cropping), algorithm presets, or end-user preferences. The less desirable a subtile attribute, the higher the corresponding subtiling penalty value. The subtiling penalty values of each subtiling combination may be initially set by use of initial subtiling penalty values stored in memory. The attributes of each subtiling combination defined by the initial subtile attributes can include, but are not limited to, the size, shape, aspect ratio and alignment of the subtiles of each subtiling combination relative to the object or objects within the cropping, the other subtiles in the subtiling combination, and the cropping itself.

In various embodiments, the attributes of each of the subtiles of each subtiling combination are adjusted until the TSPV for each subtiling combination is minimized as much as possible. Then, the minimized TSPV for each subtiling combination is assigned as the TSPV for each subtiling combination. The discussions related to examples of possible subtiling penalties, such as the subtiling penalties relating to FIGS. 18A-18B, 19A-19C, 20A-20B and 21A-21C, is provided below.

In some embodiments, and for ease of discussion, each subtiling penalty value is determined in the negative. Stated differently, the higher the subtiling penalty value, the less desirable a defined attribute of a subtile combination is versus a lower subtiling penalty value. Moreover, the higher a subtiling penalty value, the worse the subtile combination is with respect to the corresponding subtiling attribute. For example, the larger the difference in head-size of participants in a subtiling combination, the higher the subtiling penalty value corresponding to the difference in head-size of participants.

Each of the subtiling penalty values are multiplied by subtiling weights or subtiling coefficients and then are added to determine the TSPV by the system controller 102. In various embodiments, the subtiling coefficients each correspond to each subtiling attribute. In one example, the subtiling coefficients may range in value between 0 and 1. In some examples, a subtiling coefficient may exceed 1. Each subtiling penalty value for each subtiling combination is multiplied by its corresponding subtiling weight and are added together to determine the TSPV. In one example, the TSPV for each subtiling combination is determined using the following equation $$TSPV = S_1(P_1) + S_2(P_2) + S_3(P_3)$$

where S1, S2, and S3, are subtiling coefficients and P1, P2, and P3 are subtiling penalty values.

In one example, each subtiling penalty value and subtiling coefficients are subjectively adjusted and/or set by a user (i.e., are based on user preferences) and/or are based on the video conferencing software application used (i.e., preset algorithms). Each subtiling coefficient can be set such that some subtiling penalty values are emphasized (i.e., penalize a subtiling combination) more than others by individually setting each subtiling coefficient. The closer a subtiling coefficient is to 1, the more emphasis is placed on the corresponding subtiling penalty value. For example, the subtiling penalty value corresponding to the difference in head-size between participants illustrated in a video frame may be used to penalize a subtiling combination more than a subtiling penalty value corresponding to the single person penalty. Therefore, the subtiling coefficient corresponding to difference in head-size is closer to one than the subtiling coefficient corresponding to the single person penalty. Therefore, in this example, a subtiling combination can be penalized more for a difference in head-size than for a single person penalty (or vice versa).

In some embodiments, the range of values of the subtiling penalty values range between the minimum and maximum values is defined by a linear scale. In other embodiments, the maximum subtiling penalty value that can be achieved is not limited. Examples of how each of these subtiling penalty values are determined are illustrated in FIGS. 19-21. While the discussion provided herein primarily utilizes a negative scale for the subtiling penalty values, one skilled in the art would understand that a positive scale (e.g., higher penalty values is more desirable) could alternately be used to achieve the same determination.

Furthermore, algorithm presets may be used to subjectively set how much each subtiling attribute is penalized. The algorithm presets are based on different subjective preferences of the video conferencing software application used. In some examples, the algorithm presets are used to determine the subtiling coefficients, how the subtiling penalty values are assessed, and/or how the subtiling penalty values are emphasized (i.e., the difference between subtiling coefficients). Algorithm presets include, but are not limited to, preferring singular subtiles, optimize for a fixed composed grid (i.e., 2×2, 3×3), the maximum number of the most important people only, and separate people into separate streams algorithm presets. The discussions related to examples of algorithm presets, are provided in FIGS. 22A-22B, 23A-23D, and 24A-24D.

Figure 18A:
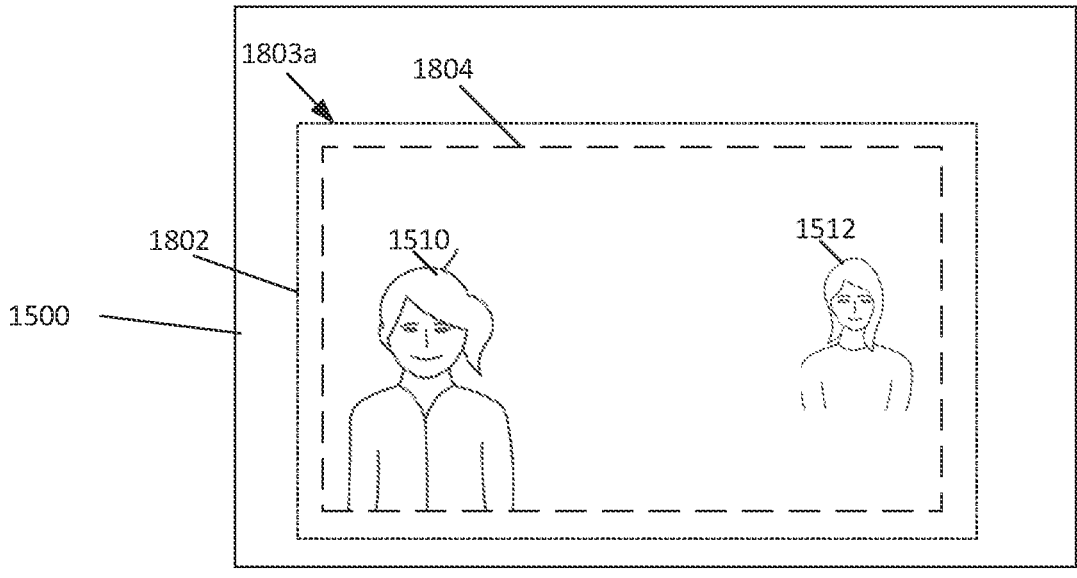
FIGS. 18A-18B are example schematic representations of different examples that can be used to determine the subtiling penalty value corresponding to the difference in head-size for a subtiling combination, according to one or more embodiments.
Figure 18B:
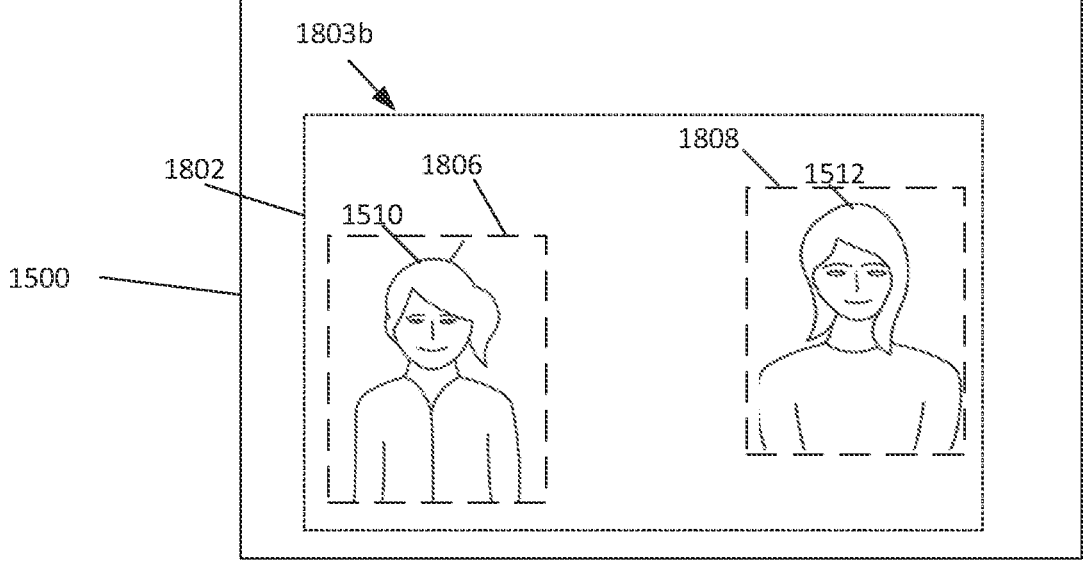

FIGS. 18A-18B are example schematic representations of different examples that can be used to determine the subtiling penalty value corresponding to the difference in head-size for a subtiling combination, according to one or more embodiments. Typically, the greater the difference in head-size of participants within subtile(s) of a subtiling combination, the less desirable the subtiling combination, so a higher subtiling penalty value should be assessed. Therefore, the closer the head-size of participants within subtiles of a subtiling combination, the lower the subtiling penalty value corresponding to the difference in head-size. Stated differently, if there are multiple participants within a subtile with significantly different head-sizes, it is assumed that the distances between the two participants are significant and the presentation of the participants will not look desirable on the video conference software application. Therefore, the greater the difference in head-size for subtile(s) within a subtile and subtiling combination, the greater the subtiling penalty value corresponding to the difference in head-size is for the subtiling combination.

Referring to FIGS. 18A-18B, in the frame 1500 within a video stream, cropping 1802 includes the first participant 1510 and the second participant 1512. The subtiling combination 1803a includes a single subtiling 1804 that includes both participants. On the other hand, the subtiling combination 1803b of cropping 1802 includes subtiling 1806 and 1808. The subtiling 1806 includes the first participant 1510 and the subtiling 1808 includes the second participant 1512. As shown in FIGS. 18A-18B the difference in head-sizes of the first participant 1510 and the second participant 1512 is smaller in the subtiling combination 1803b than in the subtiling combination 1803a. Stated differently, the difference in head-size in the subtiling combination 1803b is zero because the representation of the participants in the subtiling combination 1803b has been formed during the process of determining all of the possible subtiling combinations to include a subtiling combination where the first participant 1510 and the second participant 1512 are located in different subtiles. For ease and clarity of discussion, in the examples provided herein, the frame 1500 relates to the FOV 111 of the camera device 106. Therefore, the subtiling penalty value corresponding to the difference in head-size between participants for the subtiling combination 1803a is higher than the subtiling penalty value corresponding to the difference in head-size for the subtiling combination 1803b. In one example, the subtiling penalty value corresponding to the difference in head-size for the subtiling combination 1803a may have a value of 70 versus the subtiling penalty value corresponding to the difference in head-size for the subtiling combination 1803b may have a value of zero or 1. As noted above, whether and how the subtiling penalty value corresponding to the difference in head-size is assessed and/or weighted may be determined based on the video conferencing software application and/or the preset algorithms.

Figure 19A:
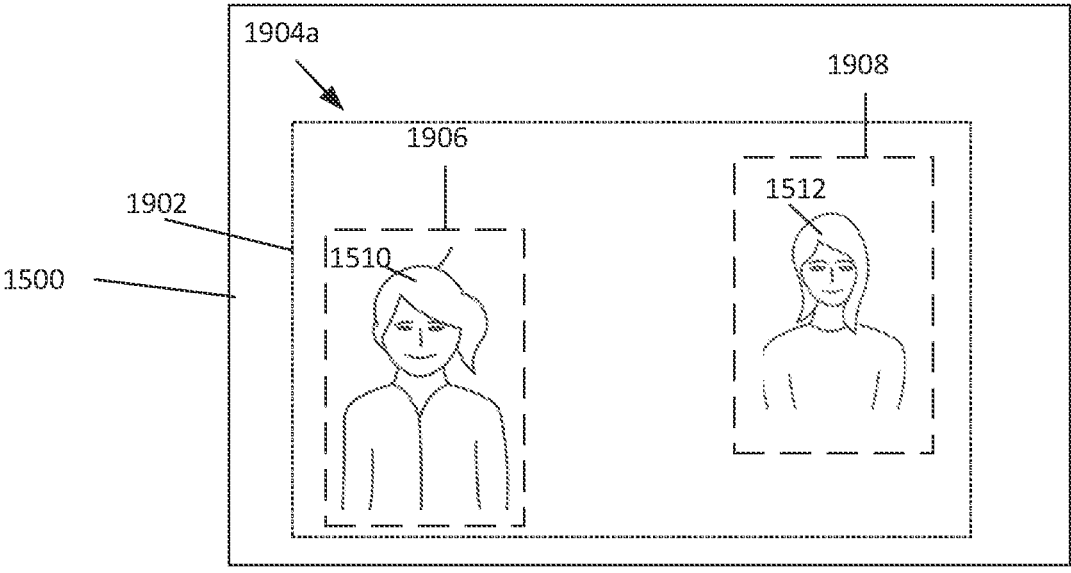
FIGS. 19A-19C are example schematic representations of different examples that can be used to determine the subtiling penalty value corresponding to a single person subtiling penalty, according to one or more embodiments.
Figure 19B:
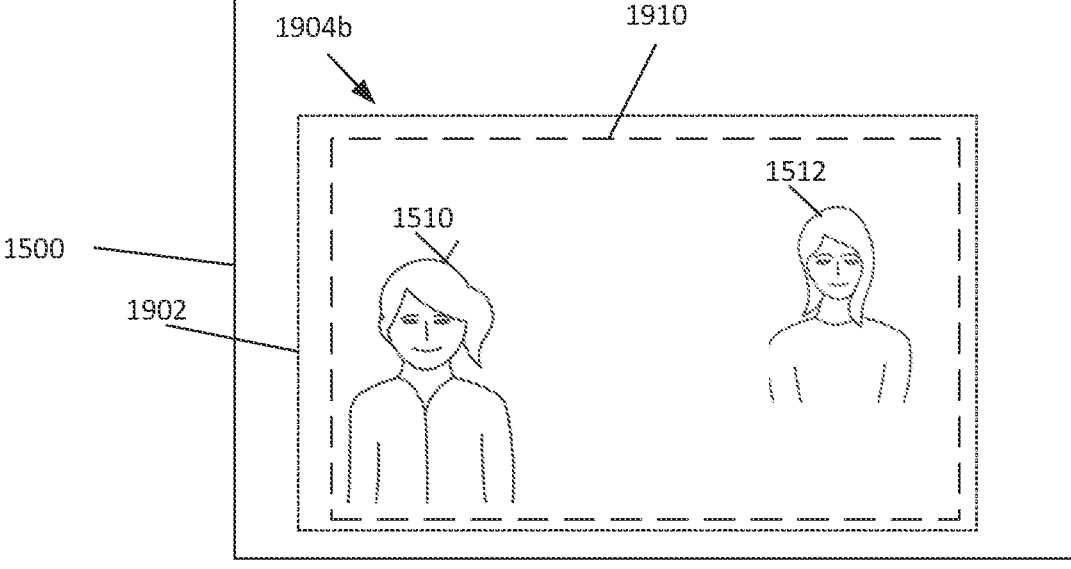
Figure 19C:
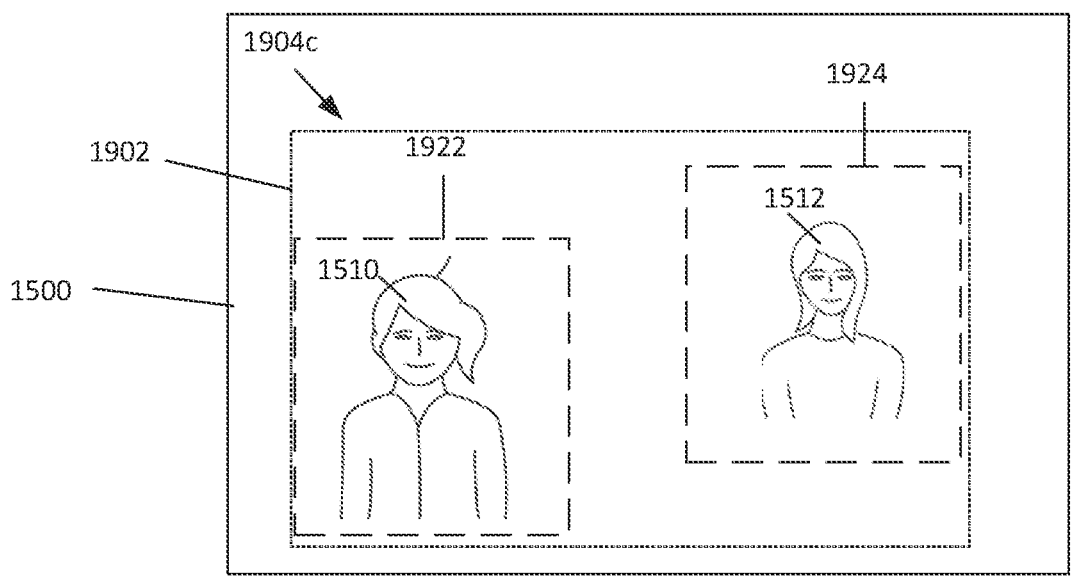

FIGS. 19A-19C are example schematic representations of different subtiling combinations that illustrate a way to determine the subtiling penalty value corresponding to a single person subtiling penalty, according to one or more embodiments. The subtiling penalty value corresponding to the single person penalty penalizes a subtile combination for including subtiles that include a single participant. In one or more examples, the subtiling penalty value corresponding to the single person subtiling penalty may also be based on the width of the subtiles of subtiling combinations that include a single participant. In one example, the subtiling penalty value for a subtile including a single person is higher if the subtile of the subtiling combination is narrow. For example, if the video conferencing software application, and/or algorithm preset prefers subtiles closer to the aspect ratio of the cropping, then a subtiling combination including narrower single person (participant) subtile(s) are penalized more than a subtiling combination including wider single person subtile(s). On the other hand, if the video conferencing software application and/or preset algorithms prefers that participants should be packed into a cropping as close as possible, subtiling combinations including wider single person subtile(s) are given a higher penalty. In one or more examples, the subtiling penalty value corresponding to a single person subtiling penalty allows for the changing of personal (subjective preferences) of the user and/or video conferencing software application by penalizing subtiling combinations that include a single person (participant) and penalizing different aspect ratios of subtiles (subtiles of different widths) that include a single person.

Referring to FIGS. 19A-19C, in the frame 1500 within a video stream a cropping 1902 includes the first participant 1510 and the second participant 1512. The subtiling combination 1904*a* includes a subtile 1906 and a subtile 1908. The subtile 1906 includes the first participant 1510 and the subtile 1908 includes the second participant 1512. The subtiling combination 1904*b* includes a single subtile 1910 that includes both participants. The subtiling combination 1904*c* includes a subtile 1922 and a subtile 1924. The subtile 1922 includes the first participant 1510 and the subtile 1924 includes the second participant 1512. As shown in FIGS. 19A and 19C the difference between the subtiling combination 1904*a* and the subtiling combination 1904*c* is that the subtiles 1906 and 1908 are narrower in width than the subtiles 1922 and 1924.

Therefore, the subtiling penalty value corresponding to a single person penalty is less for the subtiling combination 1904*b* than the subtiling penalty value applied to the subtiling combination 1904*a* and the subtiling combination 1904*c* because the subtile 1910 includes both participants. In one example, if wider subtiles are preferred, then the subtiling penalty value corresponding to the single person penalty applied to the subtiling combination 1904*c* is less than the subtiling penalty value applied to the subtiling combination 1904*a*. For example, the subtiling penalty value corresponding to the single person penalty for the subtiling combination 1904*a* may have a value of 70, while the subtiling penalty value applied to the subtiling combination 1904*c* may have a value of 40, and the subtiling penalty value applied to the subtiling combination 1904*b* may have a value of zero or 1.

On the other hand if narrower subtiles are preferred then the subtiling penalty value corresponding to the single person penalty for the subtiling combination 1904*a* is less than the subtiling penalty value applied to the subtiling combination 1904*c*. For example, the subtiling penalty value corresponding to the single person penalty for the subtiling combination 1904*c* may have a value of 70, while the subtiling penalty value applied to the subtiling combination 1904*a* may have a value of 40, and the subtiling penalty value applied to the subtiling combination 1904*b* may have a value of zero or 1. As noted above, whether and how the subtiling penalty value corresponding to the single person penalty is assessed and/or weighted may be determined based on the video conferencing software application and/or the preset algorithms.

Figure 20A:
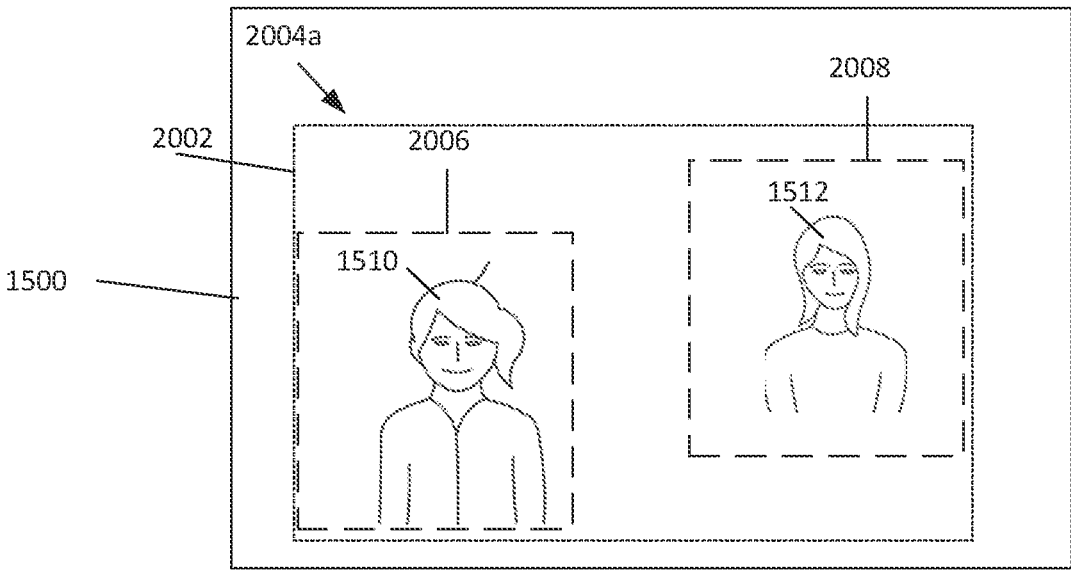
FIGS. 20A-20B are example schematic representations of different examples that can be used to determine the subtiling penalty value corresponding to a multi-person subtiling penalty, according to one or more embodiments.
Figure 20B:
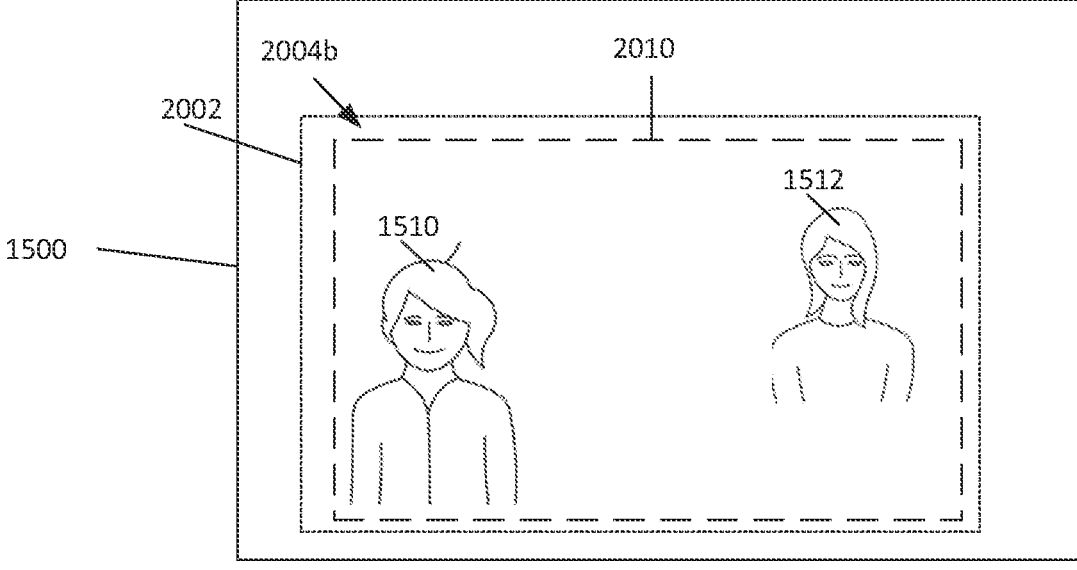

Alternatively, based on the video conferencing software application and/or the preset algorithms, a subtiling penalty value corresponding to multi-person penalty may be applied to each subtiling combination. For example, the software application may prefer to spread participants over multiple subtiles. FIGS. 20A-20B are example schematic representations of different examples that can be used to determine the subtiling penalty value corresponding to a multi-person subtiling penalty, according to one or more embodiments. In one or more examples, the subtiling penalty value corresponding to a multi-person subtiling penalty allows for the changing of personal (subjective preferences) of the user and/or video conferencing software application by penalizing subtiling combinations that include a multiple people (participant). For example, the subtiling penalty value corresponding to a multi-person subtiling penalty places a preference on subtiling combinations that spread people over a scene.

Referring to FIGS. 20A-20B, in the frame 1500 within a video stream a cropping 2002 includes the first participant 1510 and the second participant 1512. The subtiling combination 2004*a* includes a subtile 2006 and a subtile 2008. The subtile 2006 includes the first participant 1510 and the subtile 2008 includes the second participant 1512. The subtiling combination 2004*b* includes a single subtile 2010 that includes both participants. Therefore, the subtiling penalty value corresponding to the multi-person penalty is less for the subtiling combination 2004*a* than the subtiling penalty value assessed to the subtiling combination 2004*b* because the subtile 2010 includes multiple people (i.e., both participants). For example, the subtiling penalty value corresponding to the multi-person penalty for the subtiling combination 2004*b* may have a value of 70 while the subtiling penalty value applied to the subtiling combination 2004*a* may have a value of zero or 1. As noted above, whether and how the subtiling penalty value corresponding to the multi-person penalty is assessed and/or weighted may be determined based on the video conferencing software application and/or the preset algorithms.

Figure 21A:
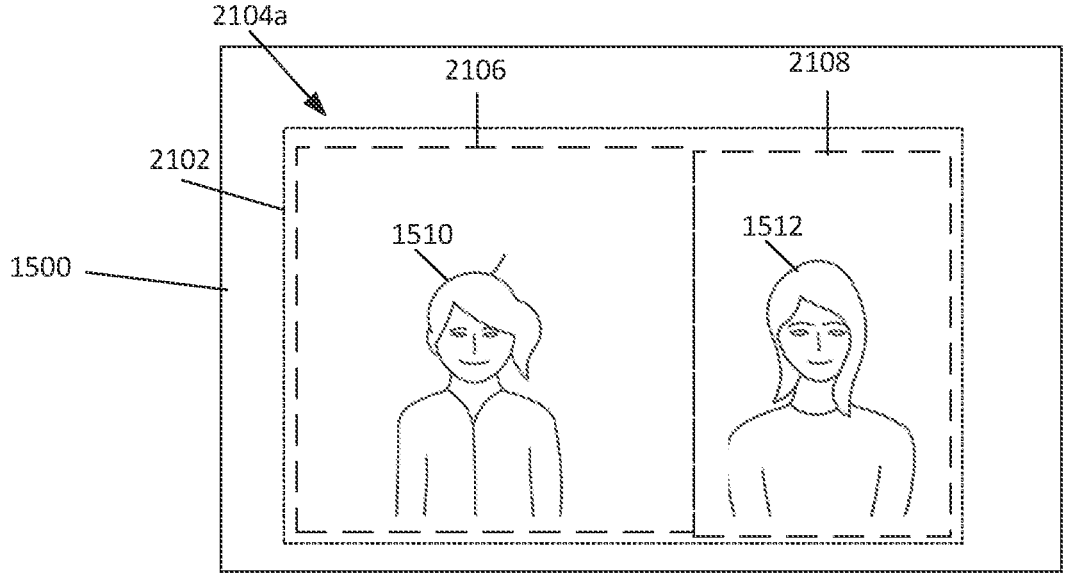
FIGS. 21A-21C are example schematic representations of different examples that can be used to determine the subtiling penalty value corresponding to asymmetric subtiles, according to one or more embodiments.
Figure 21B:
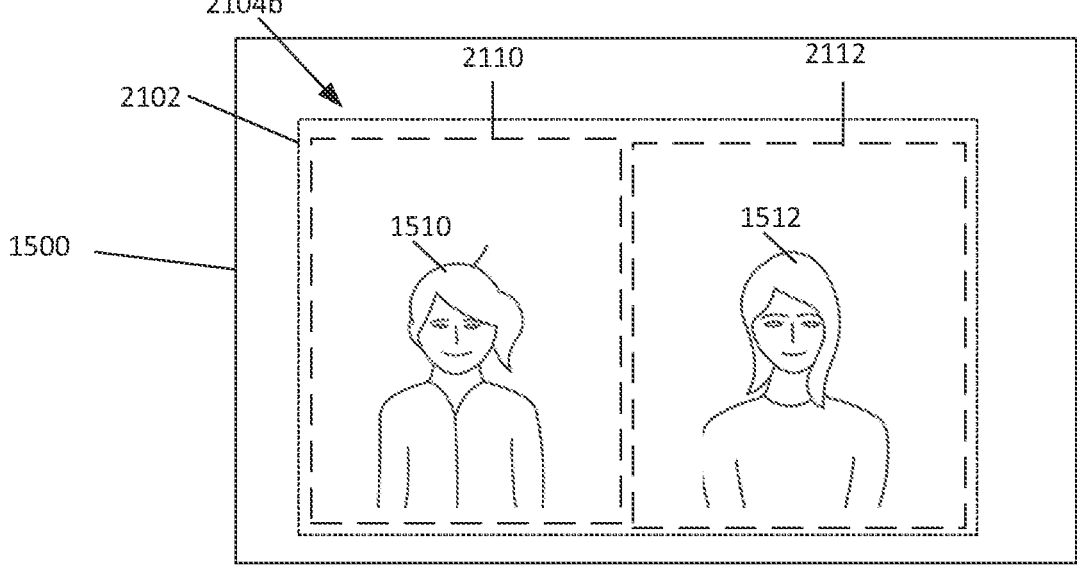
Figure 21C:
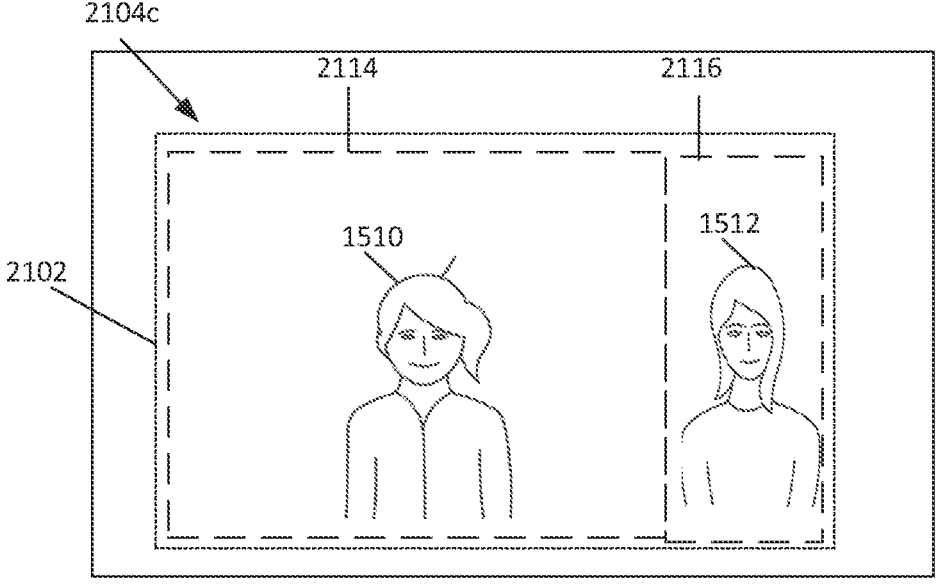

FIGS. 21A-21C are example schematic representations of different examples that can be used to determine the subtiling penalty value corresponding to asymmetric subtiles, according to one or more embodiments. The subtiling penalty value corresponding to asymmetric subtiles penalizes a subtiling combination for including subtiles that are asymmetric with respect to each other. In one example, the greater the difference of the fractional aspect ratios between subtiles (i.e., the more asymmetric the subtiles are) the greater the subtiling penalty value corresponding to asymmetric subtiles.

Referring to FIGS. 21A-21C, in the frame 1500 within a video stream a cropping 2102 includes the first participant 1510 and the second participant 1512. The subtiling combination 2104*a* includes a subtile 2106 and a subtile 2108. The subtile 2106 includes the first participant 1510. The subtile 2108 includes the second participant 1512. In one example, due to a subtiling formation rule used during the process of determining all of the possible subtiling combinations, the subtile 2106 was formed with an aspect ratio equal to two-thirds of the aspect ratio of cropping 2102 (i.e., has a fractional aspect ratio of two-thirds) and the subtile 2108 was formed with an aspect ratio equal to one-third of the aspect ratio of cropping 2102 (i.e., has a fractional aspect ratio of one-third). Thus, the subtile 2106 and the subtile 2108 are asymmetric. In this example, due to a subtiling formation rule used during the process of determining all of the possible subtiling combinations, the subtiling combination 2104*b* includes the subtile 2110 and the subtile 2112. The subtile 2110 includes the first participant 1510. The subtile 2112 includes the second participant 1512. The subtile 2110 and the subtile 2112 are equal in size and have aspect ratios equal to half of the aspect ratio of the cropping 2102 (i.e., have fractional aspect ratios equal to one-half). Thus, the subtile 2110 and the subtile 2112 are symmetric.

Also, in this example, due to a subtiling formation rule used during the process of determining all of the possible subtiling combinations, the subtiling combination 2104c includes the subtile 2114 and the subtile 2116. The subtile 2114 includes the first participant 1510. The subtile 2116 includes the second participant 1512. The subtile 2114 has an aspect ratio equal three-fourths of the aspect ratio of the cropping 2102 (i.e., has a fractional aspect ratio of three-fourths) and the subtile 2108 has an aspect ratio equal to one-fourth of the aspect ratio of the cropping 2102 (i.e., has a fractional aspect ratio of one-fourth). Thus, the subtiling 2106 and the subtiling 2112 are asymmetric. In one or more examples, the subtiling penalty value corresponding to asymmetric subtiles allows for the changing of personal (subjective preferences) of the user and/or video conferencing software application to penalize subtiling combinations that are asymmetric. For example, the user and/or video conferencing software may prefer each subtile to occupy an equal (or as close to equal as possible) so each participant occupies and equal (or close to equal) portion of the cropping so the cropping looks subjectively better.

Furthermore, because the difference of fractional aspect ratios between the subtiling 2114 and the subtiling 2116 is greater than the difference of fractional aspect ratios between the subtiling 2106 and the subtiling 2108, the subtiling combination 2104c is more asymmetric than the subtiling combination 2104a. Stated differently, because two-fourths (i.e., one-half) is greater than one-third, the subtiling combination 2104c is more asymmetric than the subtiling combination 2104a. Therefore, the subtiling penalty value corresponding to asymmetric subtiles is less for the subtiling combination 2104a than the penalty assessed to the subtiling combination 2104c. Furthermore, the subtiling penalty value corresponding to asymmetric subtiles assessed to the subtiling combination 2104b is less than the subtiling penalty value assessed to the subtiling combination 2104a. For example, the subtiling penalty value corresponding to asymmetric subtiles to the subtiling combination 2104c may have a value of 70, the subtiling penalty value corresponding to asymmetric subtiles accessed to the subtiling combination 2104a may have a value of 30, and the subtiling penalty value corresponding to asymmetric subtiles applied to the subtiling combination 2104b may have a value of zero or 1. As noted above, whether and how the subtiling penalty value corresponding to asymmetric subtiles is assessed and/or weighted may be determined based on the video conferencing software application and/or the preset algorithms.

Furthermore, the cropping and grouping attributes used to determine the individual cropping and grouping loss values may be applied as subtiling attributes and used to generate corresponding subtiling penalty values for each subtiling combination in the same manner described above.

Algorithm Presets

As noted above, algorithm presets may be used to subjectively set how much each subtiling attribute is penalized (emphasized). Stated differently, the algorithm presets can be used to determine the value and/or difference between subtiling coefficients to achieve a subjective preference, changes to how subtiling penalty values are assessed, and/or determine a coefficient that the TSPVs are multiplied by. The algorithm presets are based on different subjective preferences of the video conferencing software (video conferencing application used) and/or user settings. Algorithm presets include, but are not limited to, preferring singular subtiles, optimize for a fixed composed grid, highlighting the most important people within the video conference, and/or separate people into separate streams algorithms. All, none, or any combination of algorithm presets may be used to the content provided from the system controller 102 during the video conference. This will be described in more detail below.

Figure 22A:
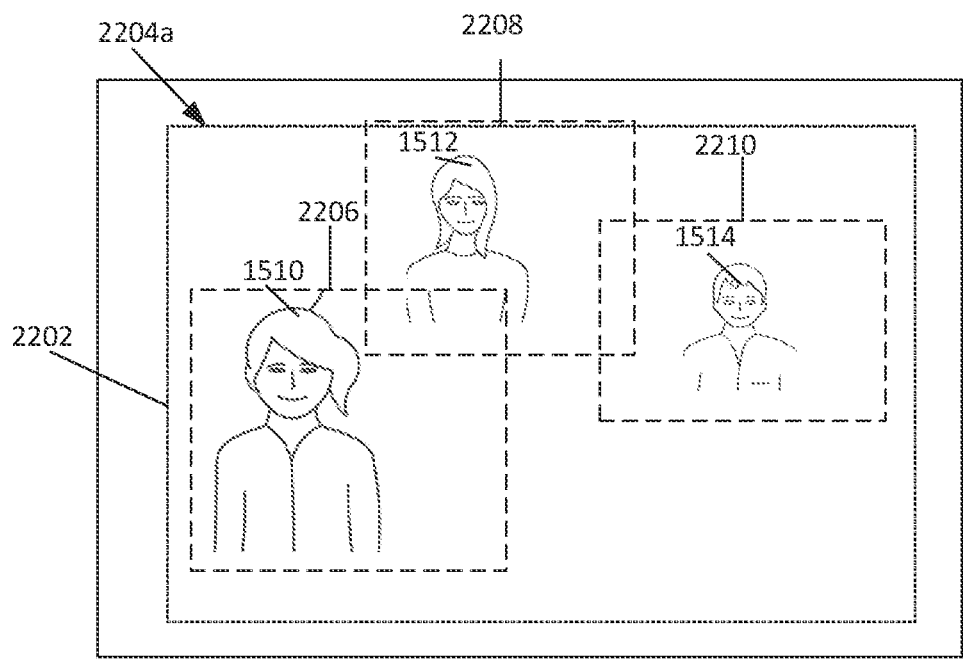
FIGS. 22A-22B illustrate an example of the preferring singular subtiles algorithm preset, according to one or more embodiments.
Figure 22B:
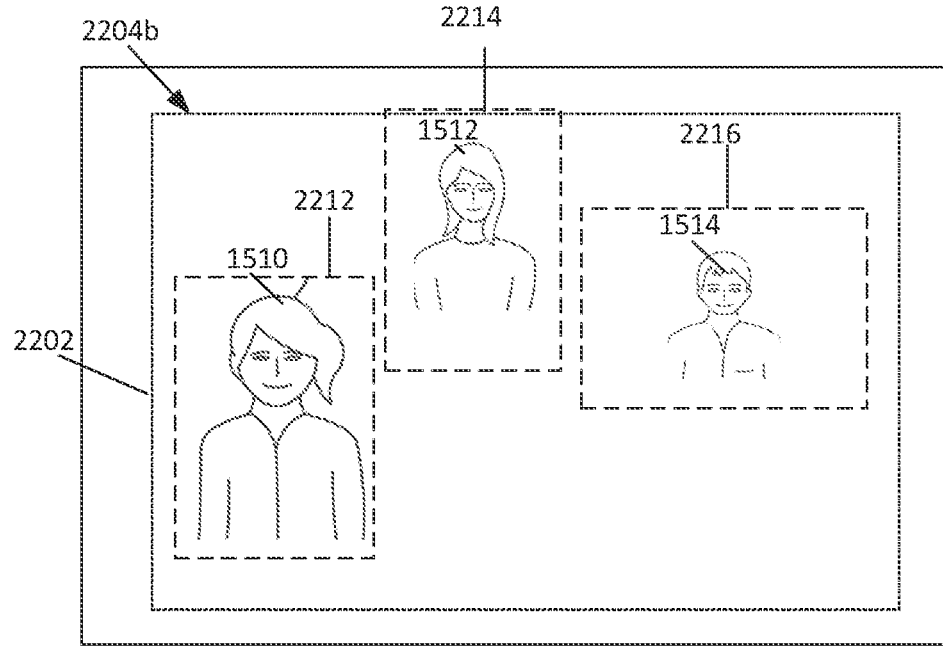

FIGS. 22A-22B illustrate an example of the preferring singular subtiles algorithm preset, according to one or more embodiments.

In one or more embodiments, the preferring singular subtiles algorithm is a preset algorithm stored in the memory that causes the system controller 102 to prefer to generate a separate subtile for each object (participant) within a cropping. Based on the preferring singular subtiles algorithm, the system controller 102 prefers to subtile a cropping that includes multiple participants and place each participant of a cropping in a separate subtile within the cropping, unless doing so makes the subtiling combination subjectively inappropriate. For example, if a participant is included in two different singular subtiles of a subtiling combination (i.e., is a hitchhiker in another participant's subtile), placing each person in different singular subtiles causes visible asymmetry between subtiles, or the like, a subtiling combination including a separate subtiling for each participant should not be used. Therefore, to further refine and/or adjust the penalty values to include the aspects of the preferred visual attributes defined by the algorithm preset(s), the algorithm presets are used to adjust the subtiling coefficient multiplied with the subtiling penalty value to adjust the overall penalty value. Therefore, the system controller will reduce the subtiling coefficient that is then multiplied by the subtiling penalty value corresponding to the single person penalty value to zero (or a value close to zero), which changes how the multi-person penalty is assessed, and increases the subtiling coefficient multiplied with the subtiling penalty value corresponding to asymmetric subtiles to prevent noticeable asymmetry. For example, the preferring singular subtiles algorithm changes how the multi-person penalty is assessed by increasing the subtiling penalty value corresponding to the multi-person penalty as subtiles including multiple participants become narrower. Stated differently, a higher subtiling penalty value corresponding to the multi-person penalty value is assessed for narrower subtiles that include multiple participants than wider subtiles that include multiple participants. Furthermore, the coefficient multiplied with the subtiling penalty value corresponding to asymmetric subtiles is increased because as more subtiles are included in a subtiling combination, asymmetric subtiles become more noticeable.

Referring to FIGS. 22A-22B in the frame 1500 within a video stream, a cropping 2202 includes the first participant 1510 and the second participant 1512, and the third participant 1514. The subtiling combination 2204a includes a subtile 2206, a subtile 2208 and a subtile 2210. The subtile 2206 includes the first participant 1510 and a portion of the second participant 1512 (a hitchhiker). The subtile 2208 includes the second participant 1512 and a portion of the first participant 1510 (a hitchhiker). The subtile 2210 includes the third participant 1514. Based on the preferring singular subtiles algorithm preset the subtiling combination 2204a will have a higher TSPV because subtile 2206 and subtile 2208 include multiple people (multi-person penalty) and each of the subtiles are asymmetrical because the difference in aspect ratios between the subtiles in subtiling combination 2204b is less than the difference in subtiling combination 2204a. Stated differently, the subtiling penalty value corresponding to asymmetric subtiles will be higher for subtiling combination 2204*a*. The preferring singular subtiles algorithm also increases the subtiling coefficient multiplied with the subtiling penalty value corresponding to asymmetric subtiles, which will also cause the TSPV of subtiling combination 2204*a* to be higher than the TSPV of subtiling combination 2204*b*.

On the other hand, based on the preferring singular subtiles algorithm preset, the subtiling combination 2204*b* will have a lower TSPV than the subtiling combination 2204*a*. The subtiling combination 2204*a* includes a subtile 2212, a subtile 2214 and a subtile 2216. The subtile 2212 includes the first participant 1510. The subtile 2214 includes the second participant 1512. The subtile 2210 includes the third participant 1514. The subtiling combination 2204*b* does include any multiple participant subtiles.

Because the preferring singular subtiles algorithm preset reduces the subtiling coefficient multiplied with the subtiling penalty value corresponding to the single person tile penalty value to zero (or a value close to zero), and the subtiling combination 2204*b* will not be assessed any multiple person penalties, the TSPV of the subtiling combination 2204*b* will be less than the TSPV assessed to subtiling combination 2204*a*.

In one or more embodiments, an optimize for a fixed composed grid algorithm preset is used, where the optimize for a fixed composed grid algorithm preset is an algorithm stored in the memory that causes the system controller 102 to include a specific quantity of subtiles in a grid in a specific array. For example, the fixed composed grid algorithm penalizes an entire subtiling combination for not including the desired quantity of subtiles because it would prevent the system controller 102 from arranging the subtiles of the subtiling combination in the desired presentation format. The presentation format can include an array of subtiles that may have sub-optimal views that includes empty (black) space within the cropping. Stated differently the optimize for a fixed composed grid algorithm preset generates a quantity of subtiles weight or coefficient (r) that is multiplied by the TSPV. The "r" value is based on how many subtiles are present in a subtiling configuration.

Figure 23A:
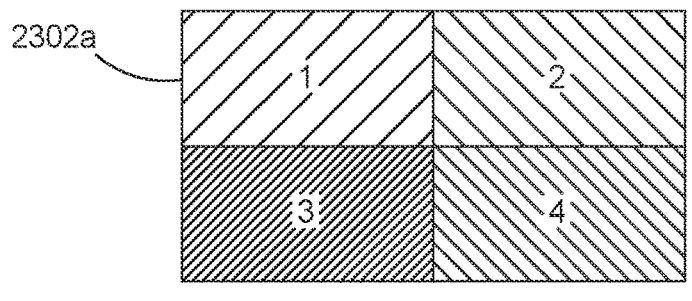
FIGS. 23A-23D illustrate example(s) of the optimize for a fixed composed grid algorithm preset, according to one or more examples.
Figure 23B:
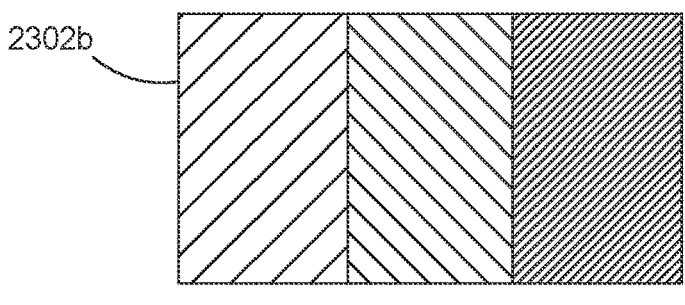
Figure 23C:
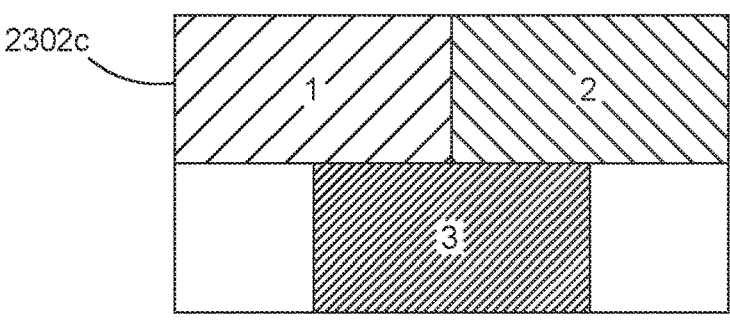
Figure 23D:
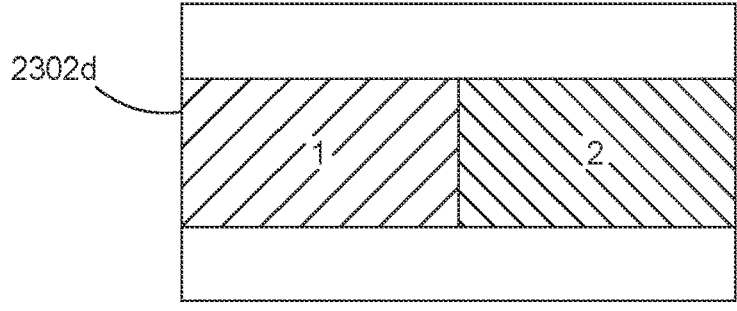

In some embodiments, based on the separate people into separate streams algorithm preset, it is preferred to have each participant in a single subtile as shown in FIG. 22B and each person can be transmitted in a single video stream FIGS. 23A-23D illustrate example(s) of the optimize for a fixed composed grid algorithm preset, according to one or more examples. In one example, the subjective desired presentation format may favor FIG. 23A since there is not any empty space in the subtiling combination 2302*a*. For example in FIG. 23A, the subtiling combination 2302*a* includes four subtiles, such as subtiles 1, 2, 3, and 4. In one example, FIG. 23A is favored over FIG. 23B because the subtiling combination 2302*b* includes subtiles 1, 2, and 3, but does not include subtile 4 and is not formed in a grid. FIG. 23A is favored over FIG. 23C because the subtiling combination 2302*c* includes subtiles 1, 2, and 3 that are arranged in a manner such that empty space is included in the subtiling combination 2302*c*. Stated differently, FIG. 23A is favored over FIG. 23C because the subtiling combination 2302*c* does not include the desired quantity of subtiles and includes empty space. For the same reasons, FIG. 23A is favored over FIG. 23D because the subtiling combination 2302*d* includes subtiles 1 and 2 along with empty space. In some cases where a side-by-side format is preferred, FIG. 23B may be preferred over FIG. 23A and over FIG. 23C because the subtiling combination 2302*c* does not include any empty space. In some embodiments, FIG. 23C may be subjectively preferred over FIG. 23B.

However in one example, where FIG. 23A is preferred over the other configurations, the value of r corresponding to the subtiling combination 2302*a* is a low value close to zero. On the other hand, the value of r for the subtiling combination 2302*d* is higher than the value of r for the subtiling combinations 2302*b* and 2302*c* because the subtiling combination 2302*d* includes more empty space and less subtiles than the subtiling combinations 2302*b* and 2302*c*. In one example, the value of r for the subtiling combination 2302*d* is 150% higher than the value of r for the subtiling combination 2302*a*, and the value of r for the subtiling combinations 2302*b* and 2302*c* are 120% higher than the value of r for the subtiling combination 2302*a*.

In one example, if the optimize for a fixed composed grid algorithm is used, the TSPV for each subtiling combination of each cropping is determined by the equation $$TSPV = r(S_1(P_1) + S_2(P_2) + S_3(P_3)).$$

In one or more embodiments, the maximum number of the most important people only algorithm stored in the memory causes the system controller 102 to prefer a subtiling combination that includes the most important people in a scene (i.e., the conference room) in a grid. For example, the maximum number of the most important people only algorithm penalizes an entire subtiling combination for not including the desired quantity of most important people (participants) in a grid with each subtiling having equal fractional aspect ratios. In one or more examples, the most important people are the participants that speak the most during a meeting. For example, the importance of participants in the scene may be determined based on the speaking rate of each participant and whether a participant was rendered before. In one example, the maximum number of the most important people only algorithm generates a most important people weight or coefficient (q) that is multiplied by the TSPV. The q value is based on whether the desired amount of the most important people are included in a grid (i.e., a subtiling combination) that includes subtiles of equal fractional aspect ratios.

Figure 24A:
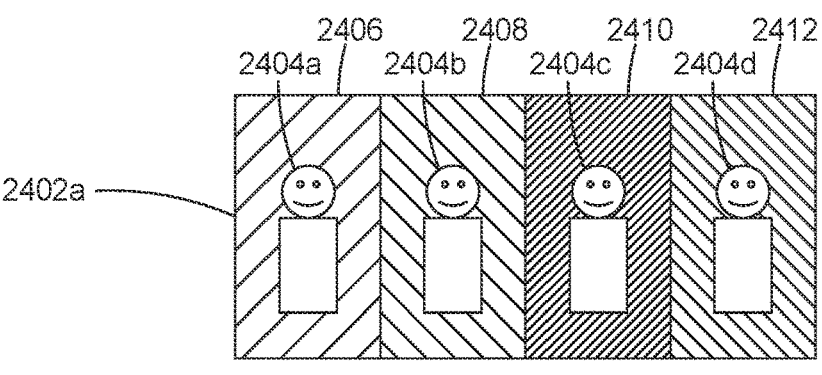
FIGS. 24A-24D illustrate an example of the maximum number of the most important people only algorithm preset, according to one or more examples.
Figure 24B:
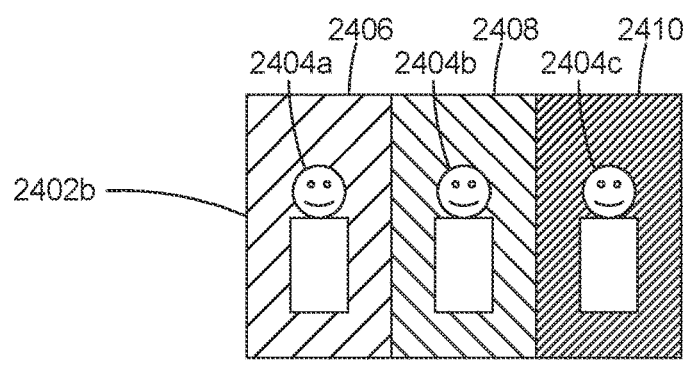
Figure 24C:
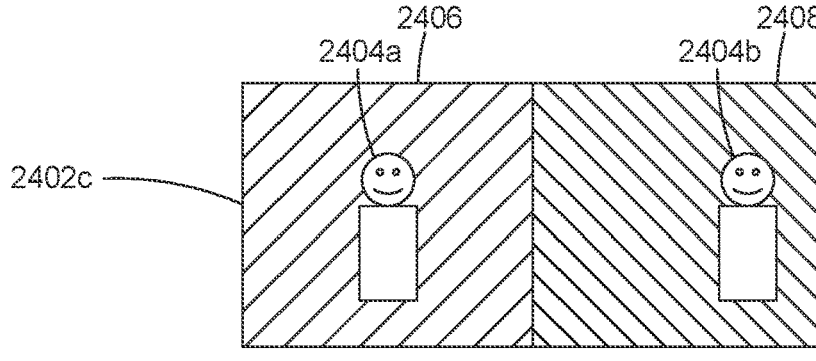
Figure 24D:
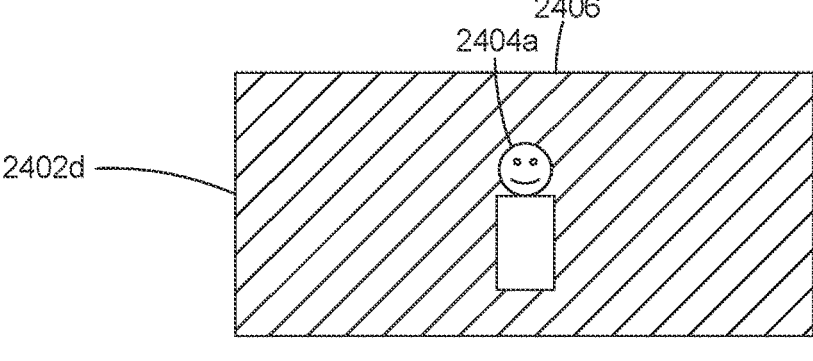

FIGS. 24A-24D illustrate an example of the maximum number of the most important people only algorithm preset, according to one or more examples. In one example, the subjective desired presentation format may favor FIG. 24A because the desired number of the most important people is 4 and the subtiling combination 2402*a* includes four subtiles each having an equal aspect ratio that include the four most important participants in a grid. For example, the subtiling combination 2402*a* includes a subtile 2406 which includes the first most important participant 2404*a*, a subtile 2408 which includes the second most important participant 2404*b*, a subtile 2408 which includes the third most important participant 2404*c*, and a subtile 2410 which includes the fourth most important participant 2404*d*. The presentation format in FIG. 24A, is preferred over the subtiling combination 2402*b* of FIG. 24B because the subtiling combination 2402*b* includes the subtiles 2404*a*-2404*c*. The presentation format in FIG. 24B, is preferred over the subtiling combination 2402*c* of FIG. 24C because the subtiling combination 2402*c* includes the subtiles 2406 and 2408. The presentation format in FIG. 24C, is preferred over the subtiling combination 2402*d* of FIG. 24D because the subtiling combination 2402*d* includes subtile 2406.

However, in one example where FIG. 24A is preferred over the other configurations the value of q corresponding to the subtiling combination 2402a is a low value close to zero. On the other hand the value of q for the subtiling combination 2402b is lower than the value of q corresponding to the subtiling combination 2402a because it does not include the desired quantity of important people. The value of q for the subtiling combination 2402c is lower than the value of q for subtiling combination 2402b because the subtiling combination 2402b includes a quantity of the most important people closer to the desired value of the most important people than the subtiling combination 2402c. The value of q for the subtiling combination 2402d is lower than the value of q for the subtiling combination 2402c because the subtiling combination 2402c includes a quantity of the most important people closer to the desired value of the most important people than the subtiling combination 2402d. Furthermore, the maximum number of the most important people only algorithm prunes any subtiling combinations that include subtiles that do not have equal fractional aspect ratios.

In other examples, the subtiling combinations 2402b-d may be preferred over the subtiling combination 2402a based on the quantity of people that are more important than others. For example, if only two participants speak during a meeting then those two participants are the first and second most important participants and all the remaining participants are equally unimportant. Therefore, the subtiling combination 2402c would be the preferred subtiling combination and have the highest value of q.

In one example, if the maximum number of the most important people only algorithm is used, the TSPV for each subtiling combination of each cropping is determined by the equation $$TSPV = q(S_1(P_1) + S_2(P_2) + S_3(P_3)).$$

As described above, one or all of the algorithm presets may be used. For example if the optimize for a fixed composed grid algorithm and the maximum number of the most important people only algorithm are both used, the TSPV for each subtiling combination of each cropping is determined by the equation $$TSPV = rq(S_1(P_1) + S_2(P_2) + S_3(P_3)).$$

At activity 1410, the grouping including the subjectively preferred subtiled croppings (i.e., a preferred subtiled grouping combination) is determined. To determine the grouping including the subjectively preferred subtiled croppings the TSPVs of each subtiling combination for each grouping are added to one another to determine grouping TSPVs (GTSPVs). Because each cropping of each combination of croppings can be subtiled into multiple subtiling combinations, each grouping will include multiple GTSPVs. The GTSPVs of each grouping is added to each total combined grouping loss value to determine total subtiled group loss values (TSGLVs) for each grouping. As described in method 900, a total combined grouping value (i.e., 861-864) is determined for each combination of groupings. For the same reasons described above, each grouping will have multiple TSGLVs. The grouping with subtitled croppings having the lowest TSGLV is selected as the grouping including the subjectively preferred subtiled croppings.

At activity 1412, the grouping including the subjectively preferred subtiled croppings is transmitted (sent) to the video conferencing software application. In one or more examples, the grouping including the subjectively preferred subtiled croppings is transmitted by the system controller 102 to the video conferencing software application.

In addition to the individual cropping loss values 702 described above, additional individual cropping loss values 702 can be used to further adjust the WICLVs (i.e., 751-753), of each cropping. For example, subtiling combinations can be used to determine additional individual cropping loss values 702 corresponding to aspect ratio loss and difference in vertical alignment loss.

For example, an individual cropping loss value 702 corresponding to aspect ratio loss can be determined based on the difference between an aspect ratio of a cropping and a subtiling combination of a cropping. For example, an individual cropping loss value 702 corresponding to aspect ratio loss is determined by comparing the difference between aspect ratios of the subtiles in each subtiling combination with the aspect ratio of rectangle around people in subtile. The greater the difference between the aspect ratios of the subtiles with the aspect ratio of rectangle around people, the greater the individual cropping loss value 702 corresponding to aspect ratio loss. In one embodiment, the aspect ratio of a first subtile is compared to the cropping aspect ratio of rectangle around people and has a difference equal to 0.78, and a second subtile is compared to the cropping aspect ratio of the rectangle around people and has a difference equal to 0.5, therefore, the second subtile is preferred and the individual cropping loss value 702 added to the WICLV is less for the second subtile than the first subtile.

Figure 25A:
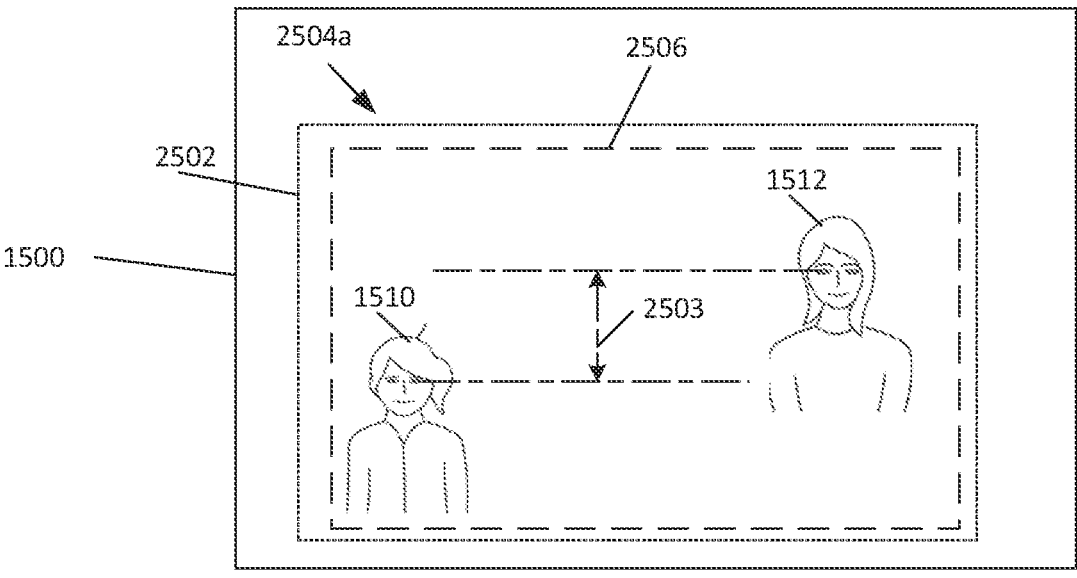
FIGS. 25A-25B are schematic representations of examples of determining an individual cropping loss value corresponding to a difference in vertical alignment between participants in a subtile, according to one or more embodiments.
Figure 25B:
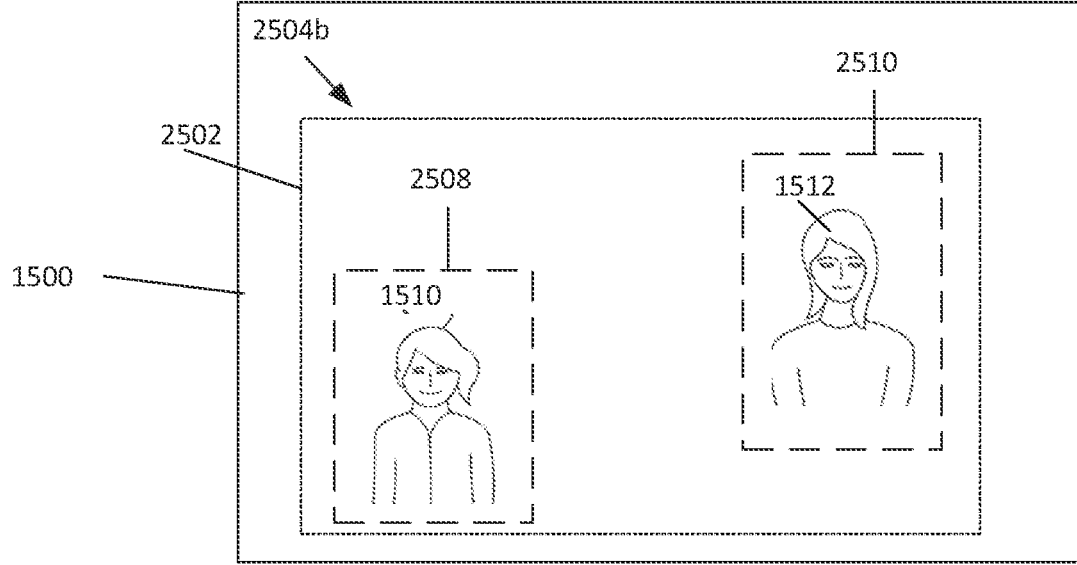

FIGS. 25A-25B are schematic representations of examples of determining an individual cropping loss value 702 corresponding to a difference in vertical alignment between participants (objects) in a subtile, according to one or more embodiments. In various embodiments, it is preferable to split participants into separate subtiles if there is a difference in vertical alignment between participants. A difference in vertical alignment between participants can be determined if there is a vertical distance (i.e., a distance along the y-axis) between the eyes of participants. The greater the difference in vertical alignment in a subtile, the greater the individual cropping loss value 702 corresponding to the difference in vertical alignment.

Referring to FIGS. 25A-25B cropping 2502 includes the first participant 1510 and the second participant 1512. As described above the greater the vertical distance between the eyes of participants is in a subtile, the greater the individual cropping loss value 702 corresponding to the difference in vertical alignment. Therefore, subtiling combination 2504a will cause a greater individual cropping loss value 702 corresponding to the difference in vertical alignment than subtiling combination 2504b. Subtiling combination 2504a includes a single subtile 2506 that includes both participants. Thus, there is a difference in vertical alignment present between the first participant 1510 and the second participant 1512 because there is a vertical distance 2503 between the eyes of the first participant 1510 and the second participant 1512. Subtiling combination 2504b includes a subtile 2508 that includes the first participant 1510 and a subtile 2510 that includes the second participant 1512. Even though the eye levels of the participants are unequal, in subtiling combination 2504b the participants are in separate subtiles. Therefore, there is no difference in vertical alignment in subtiling combination 2504*b*. Thus, the individual cropping loss value 702 corresponding to the difference in vertical alignment for subtiling combination 2504*a* will be greater than the individual cropping loss value 702 corresponding to the difference in vertical alignment for subtiling combination 2504*b*. In one example, the individual cropping loss value 702 corresponding to the difference in vertical alignment loss for subtiling combination 2504*b* is 1 or zero versus the individual cropping loss value 702 for the subtiling combination 2504*a* may have a value of 70. Thus, the subtiling combination 2504*b* is preferred and the individual cropping loss value 702 corresponding to the difference in vertical alignment loss added to the WICLV for each cropping combination is less for subtiling combination 2504*b* than subtiling combination 2504*a*.

While the foregoing is directed to embodiments of the present disclosure, other and further embodiments of the disclosure may be devised without departing from the basic scope thereof, and the scope thereof is determined by the claims that follow.

What is claimed is:

1. A computer implemented method, comprising:
generating, by a sensor, a video stream that comprises a series of frames that each include a plurality of objects positioned within an environment;
determining the objects captured within at least one frame of the video stream;
determining one or more croppings for each of the objects in the at least one frame of the video stream;
determining a ranking of the determined one or more croppings based on a determined total combined loss value for each the one or more croppings;
determining each subtiling combination for each of the one or more croppings, each subtiling combination comprising at least one subtile that includes at least one object;
determining a total subtiling penalty value (TSPV) for each subtiling combination; and
determining a preferred subtiled combination based on the total combined loss value of each the one or more croppings and the TSPV of each subtiling combination.

2. The method of claim 1, further comprising:
adjusting each subtiling combination based on the TSPV of each subtiling combinations; and
pruning subtiling combinations from each of the subtiling combinations prior to adjusting each of the subtiling combinations.

3. The method of claim 2, wherein subtiling combinations that comprise subtiles that do not have a fractional aspect ratio of an aspect ratio of a corresponding cropping are pruned.

4. The method of claim 2, wherein subtiling combinations that comprise subtiles that extend outside of the at least one frame are pruned.

5. The method of claim 2, wherein subtiling combinations that comprise at least one subtile that includes a quantity of objects that is greater than a maximum quantity of objects are pruned.

6. The method of claim 1, further comprising:
adjusting each subtiling combination based on the TSPV of each subtiling combinations, wherein adjusting each subtiling combination comprises:
determining subtiling penalty values that each correspond to an attribute of each subtiling combination;
determining a total subtiling penalty value (TSPV) for each subtiling combination by adding the subtiling penalty values of each subtiling combination; and adjusting each of the subtiling combinations to minimize the TSPV.

7. The method of claim 1, wherein the subtiling penalty values for each subtiling combination are determined by at least one of the following:
analyzing a difference in head-size of objects positioned in each subtile of each subtiling combination;
analyzing whether each subtiling combination includes subtiles that include a single object;
analyzing whether each subtiling combination includes subtiles that include multiple objects;
analyzing an amount of asymmetry between subtiles in each subtiling combination; and
analyzing a difference in vertical alignment between objects in a same subtile in each subtiling combination.

8. The method of claim 1, wherein determining a TSPV for each subtiling combination comprises:
determining a subtiling coefficient corresponding to each subtiling penalty value;
multiplying each subtiling penalty value with the corresponding subtiling coefficient; and
computing a sum of each subtiling penalty that is multiplied by each subtiling penalty for each subtiling combination.

9. The method of claim 8, wherein the subtiling coefficients and the subtiling penalty values are determined based on at least one of: algorithm presets, a video conferencing application, and user preferences.

10. The method of claim 9, wherein the algorithm presets include at least one of: preferring singular subtiles, optimize for a fixed composed grid, maximum number of the most important people only, and separate people into separate streams algorithm presets.

11. The method of claim 1, wherein determining the preferred subtiled combination comprises:
summing the TSPVs of each subtiling combination that correspond to each grouping to determine grouping TSPVs (GTSPVs) for each grouping;
adding each of the GTSPVs for each combination of groupings to the corresponding total combined grouping loss value for each combination of groupings to determine total subtiled group loss values (TSGLVs) for each combination of groupings; and
selecting a grouping from the combination of groupings with subtitled croppings having the lowest TSGLV as the preferred subtiled grouping combination.

12. A video conferencing system comprising:
a sensor configured to generate a video stream that comprises a series of frames; and
a controller that comprises a processor and instructions stored in memory, the instructions, when executed by the processor causes the controller to perform a method comprising:
generating, by the sensor, a video stream that comprises a series of frames that each include a plurality of objects positioned within a conference environment;
determining the objects captured within at least one frame of the video stream;
determining one or more croppings for each of the objects in the at least one frame of the video stream;
determining each combination of groupings of objects within the at least one frame of the series of frames;
determining a total combined grouping loss value for each of the combination of groupings;
determining each subtiling combination for each combination of groupings, each subtiling combination comprising at least one subtile;

determining a total subtiling penalty value (TSPV) for each subtiling combination;

adjusting each subtiling combination based on the TSPV of each subtiling combinations; and determining a preferred subtiled grouping combination based on the total combined grouping loss value of each combination of groupings and the TSPV of each subtiling combination.

13. The video conferencing system of claim 12, wherein the instructions further comprise instructions to prune subtiling combinations from each of the subtiling combinations prior to adjusting each of the subtiling combinations, wherein subtiling combinations that are pruned comprise subtiling combinations that include subtiles that do not have a fractional aspect ratio of an aspect ratio of a corresponding cropping, subtiling combinations that include subtiles that extend outside of the at least one frame, and subtiling combinations that include at least one subtile that includes a quantity of objects that is greater than a maximum quantity of objects.

14. The video conferencing system of claim 12, wherein the instructions for adjusting each subtiling combination comprise instructions for:

determining subtiling penalty values that each correspond to an attribute of each subtiling combination;

determining a total subtiling penalty value (TSPV) for each subtiling combination by adding the subtiling penalty values of each subtiling combination; and adjusting each of the subtiling combinations to minimize the TSPV.

15. The video conferencing system of claim 12, wherein the subtiling penalty values for each subtiling combination are determined by at least the following:

analyzing a difference in head-size of objects positioned in each subtile of each subtiling combination;

analyzing whether each subtiling combination includes subtiles that include a single object;

analyzing whether each subtiling combination includes subtiles that include multiple objects;

analyzing an amount of asymmetry between subtiles in each subtiling combination; and analyzing a difference in vertical alignment between objects in a same subtile in each subtiling combination.

16. The video conferencing system of claim 12, wherein the instructions for determining a TSPV for each subtiling combination comprise instructions for:

determining a subtiling coefficient corresponding to each subtiling penalty value;

multiplying each subtiling penalty value with the corresponding subtiling coefficient; and computing a sum of each subtiling penalty that is multiplied by each subtiling penalty for each subtiling combination.

17. The video conferencing system of claim 16, wherein the subtiling coefficients and the subtiling penalty values are determined based on at least one of: algorithm presets, a video conferencing application, and a user preferences.

18. The video conferencing system of claim 17, wherein the algorithm presets include at least one of: preferring singular subtiles, optimize for a fixed composed grid, maximum number of the most important people only, and separate people into separate streams algorithm presets.

19. The video conferencing system of claim 12, wherein the instructions for determining the preferred subtiled grouping combination comprise instructions for:

summing the TSPVs of each subtiling combination that correspond to each combination of groupings to determine grouping TSPVs (GTSPVs) for each combination of groupings;

adding each of the GTSPVs for each combination of groupings to the corresponding total combined grouping loss value for each combination of groupings to determine total subtiled group loss values (TSGLVs) for each combination of groupings; and selecting a grouping from the combination of groupings with subtitled croppings having the lowest TSGLV as the preferred subtiled grouping combination.

20. A method comprising:

determining a quantity of objects in a field of view (FOV) of a sensor;

determining each combination of croppings for objects and object groups in the FOV of the sensor;

determining each combination of groupings for the objects and object groups in the FOV of the sensor;

determining each subtiling combination for each combination of croppings;

pruning at least one subtiling combination, wherein pruning at least one subtiling combination comprises removing subtiling combinations that comprise at least one subtile that does not have a fractional aspect ratio of an aspect ratio of a corresponding cropping, subtiling combinations that comprise at least one subtile that extends outside of the at least one frame, or subtiling combinations that comprise at least one subtile that includes a quantity of objects that is greater than a maximum quantity of objects;

adjusting each reaming subtiling combinations based on subtiling penalty values determined based on attributes of each subtiling combination; and determining a preferred subtiled grouping combination based on a total combined grouping loss value corresponding to each grouping of the combination of groupings and the subtiling penalty values.

* * * * *